(12) United States Patent
Adjakple et al.

(10) Patent No.: US 9,681,480 B2
(45) Date of Patent: Jun. 13, 2017

(54) METHOD AND APPARATUS FOR USING NON-ACCESS STRATUM PROCEDURES IN A MOBILE STATION TO ACCESS RESOURCES OF COMPONENT CARRIERS BELONGING TO DIFFERENT RADIO ACCESS TECHNOLOGIES

(75) Inventors: Pascal M. Adjakple, Great Neck, NY (US); Mahmoud Watfa, Saint Leonard (CA); Ulises Olvera-Hernandez, Kirkland (CA); Peter S. Wang, E. Setauket, NY (US); Kai Liu, S. Huntington, NY (US); Saad Ahmad, Montreal (CA); Ghyslain Pelletier, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 287 days.

(21) Appl. No.: 13/588,901

(22) Filed: Aug. 17, 2012

(65) Prior Publication Data

US 2013/0044709 A1 Feb. 21, 2013

Related U.S. Application Data

(60) Provisional application No. 61/525,432, filed on Aug. 19, 2011.

(51) Int. Cl.
*H04L 12/28* (2006.01)
*H04W 76/02* (2009.01)
*H04J 1/16* (2006.01)

(52) U.S. Cl.
CPC .................. *H04W 76/025* (2013.01)

(58) Field of Classification Search
CPC ........... H04W 36/0066; H04W 76/025; H04W 76/026; H04W 88/06

(Continued)

(56) References Cited

U.S. PATENT DOCUMENTS 8,509,843 B2  8/2013 Takahashi et al.
8,566,455 B1 * 10/2013 Zhao et al. ................... 709/227

(Continued)

FOREIGN PATENT DOCUMENTS

CN     101500281 A     8/2009
CN     101600190 A    12/2009

(Continued)

OTHER PUBLICATIONS

Ericsson et al., "Spectrum migration from HSPA to LTE," 3GPP TSG-RAN WG1 Meeting #64, R1-111089, (Feb. 21-25, 2011).

(Continued)

*Primary Examiner* — John Pezzlo
(74) *Attorney, Agent, or Firm* — Volpe and Koenig, P.C.

(57) ABSTRACT

Methods and apparatus are disclosed for a wireless transmit/receive unit (WTRU) to perform a multi-radio access technology (RAT) access (MRA) operation. The apparatus may include a WTRU non-access stratum (NAS) entity to communicate with a first and second NAS entity of a first and second core network (CN). Alternatively, the first WTRU NAS entity communicates with a first NAS entity of a first CN, and a second WTRU NAS entity communicates with a second NAS entity of a second CN. The apparatus may include a radio resource control (RRC) entity which controls a first RAT connected to the first CN and a second RAT connected to the second CN. Alternatively, the apparatus includes an RRC entity which controls a first connection using a first RAT connected to the first CN and a second connection using a second RAT connected to a second CN.

11 Claims, 42 Drawing Sheets

(58) Field of Classification Search
USPC .............................. 370/252, 329, 419, 463
See application file for complete search history.

(56) References Cited

U.S. PATENT DOCUMENTS

| | | | |
|---|---|---|---|
| 8,718,653 B2 | 5/2014 | Hu et al. | |
| 2002/0024937 A1* | 2/2002 | Barnard et al. | 370/278 |
| 2002/0086670 A1 | 7/2002 | Rajaniemi | |
| 2007/0207806 A1 | 9/2007 | Shaheen | |
| 2007/0254666 A1* | 11/2007 | De Jong | H04W 36/14 455/436 |
| 2009/0232019 A1* | 9/2009 | Gupta et al. | 370/252 |
| 2009/0232097 A1* | 9/2009 | Taneja | H04W 36/02 370/331 |
| 2010/0041384 A1 | 2/2010 | Kazmi | |
| 2010/0112980 A1 | 5/2010 | Horn et al. | |
| 2010/0159919 A1* | 6/2010 | Wu | 455/424 |
| 2010/0234042 A1 | 9/2010 | Chan et al. | |
| 2010/0329243 A1* | 12/2010 | Buckley et al. | 370/352 |
| 2011/0021195 A1* | 1/2011 | Cormier et al. | 455/435.2 |
| 2011/0075605 A1 | 3/2011 | De Pasquale et al. | |
| 2011/0113157 A1* | 5/2011 | Kim et al. | 709/248 |
| 2011/0165875 A1 | 7/2011 | Wu | |
| 2011/0170517 A1 | 7/2011 | Bakker et al. | |
| 2011/0183670 A1 | 7/2011 | Wu | |
| 2011/0250910 A1* | 10/2011 | Lee et al. | 455/466 |
| 2011/0310850 A1 | 12/2011 | Klingenbrunn et al. | |
| 2012/0033563 A1* | 2/2012 | Jazra et al. | 370/252 |
| 2012/0071168 A1 | 3/2012 | Tomici et al. | |
| 2012/0127974 A1 | 5/2012 | Doppler et al. | |
| 2012/0140743 A1* | 6/2012 | Pelletier | H04W 72/0453 370/335 |
| 2012/0218971 A1* | 8/2012 | Chilla et al. | 370/331 |
| 2012/0257598 A1 | 10/2012 | Karampatsis et al. | |
| 2012/0314688 A1 | 12/2012 | Taleb et al. | |
| 2013/0016696 A1* | 1/2013 | Adjakple | H04W 76/025 370/331 |
| 2013/0028069 A1 | 1/2013 | Pelletier et al. | |
| 2013/0070656 A1* | 3/2013 | Chin et al. | 370/311 |
| 2013/0137423 A1* | 5/2013 | Das et al. | 455/426.1 |
| 2013/0143542 A1* | 6/2013 | Kovvali et al. | 455/418 |
| 2013/0288686 A1* | 10/2013 | Chou | 455/436 |
| 2014/0161002 A1* | 6/2014 | Gauvreau et al. | 370/280 |
| 2014/0161026 A1 | 6/2014 | Stojanovski et al. | |
| 2014/0161055 A1 | 6/2014 | Chitrapu et al. | |

FOREIGN PATENT DOCUMENTS

| | | |
|---|---|---|
| JP | 2010-109954 A2 | 5/2010 |
| WO | 2008/085908 | 7/2008 |
| WO | 10051873 A1 | 5/2010 |
| WO | 2010/092049 | 8/2010 |
| WO | 2010/092457 | 8/2010 |
| WO | 2011/069092 A1 | 6/2011 |
| WO | 2011/069096 | 6/2011 |
| WO | 11072747 A1 | 6/2011 |

OTHER PUBLICATIONS

Ericsson, "Impact of Carrier Aggregation on the L2 protocol architecture for LTE Rel-10," 3GPP TSG-RAN WG2 #66, R2-092957 (May 4-8, 2009).
Huawei et al., "Migration scenarios and possible aggregation between HSPA and LTE," 3GPP TSG RAN WG1 #64, R1-111126 (Feb. 21-25, 2011).
LG Electronics et al., "WID for Operator Policies for IP Interface Selection (OPIIS)," 3GPP TSG SA WG2 Meeting #83, S2-110668 (Feb. 21-25, 2011).
Nokia Siemens Networks et al., "Aggregating HSDPA and LTE carriers," 3GPP TSG-RAN WG1 Meeting #64, R1-111060 (Feb. 21-25, 2011).
Teliasonera, "Equivalent PLMN Issues," SP-110391, 3GPP TSG-SA Meeting #52, Bratislava, Slovakia, Jun. 6-8, 2011.

Third Generation Partnership Project, "Technical Specification Group Services and System Aspects; General Packet Radio Service (GPRS); Service description; Stage 2 (Release 4)," 3GPP TS 23.060 V4.11.0 (Dec. 2006).
Third Generation Partnership Project, "Technical Specification Group Services and System Aspects; General Packet Radio Service (GPRS); Service description; Stage 2 (Release 5)," 3GPP TS 23.060 V5.13.0 (Dec. 2006).
Third Generation Partnership Project, "Technical Specification Group Services and System Aspects; General Packet Radio Service (GPRS); Service description; Stage 2 (Release 6)," 3GPP TS 23.060 V6.15.0 (Dec. 2006).
Third Generation Partnership Project, "Technical Specification Group Services and System Aspects; General Packet Radio Service (GPRS); Service description; Stage 2 (Release 8)," 3GPP TS 23.060 V8.15.0 (Mar. 2012).
Third Generation Partnership Project, "Technical Specification Group Services and System Aspects; General Packet Radio Service (GPRS); Service description; Stage 2 (Release 7)," 3GPP TS 23.060 V7.11.0 (Jun. 2011).
Third Generation Partnership Project, "Technical Specification Group Services and System Aspects; General Packet Radio Service (GPRS); Service description; Stage 2 (Release 9)," 3GPP TS 23.060 V9.12.0 (Mar. 2012).
Third Generation Partnership Project, "Technical Specification Group Services and System Aspects; General Packet Radio Service (GPRS); Service description; Stage 2 (Release 1999)," 3GPP TS 23.060 V3.17.0 (Dec. 2006).
Third Generation Partnership Project, "Technical Specification Group Services and System Aspects; General Packet Radio Service (GPRS); Service description; Stage 2 (Release 8)," 3GPP TS 23.060 V8.13.0 (Jun. 2011).
Third Generation Partnership Project, "Technical Specification Group Services and System Aspects; General Packet Radio Service (GPRS); Service description; Stage 2 (Release 9)," 3GPP TS 23.060 V9.9.0 (Jun. 2011).
Third Generation Partnership Project, "Technical Specification Group Services and System Aspects; General Packet Radio Service (GPRS); Service description; Stage 2 (Release 10)," 3GPP TS 23.060 V10.8.1 (Jun. 2012).
Third Generation Partnership Project, "Technical Specification Group Services and System Aspects; General Packet Radio Service (GPRS); Service description; Stage 2 (Release 10)," 3GPP TS 23.060 V10.4.0 (Jun. 2011).
Third Generation Partnership Project, "Technical Specification Group Services and System Aspects; General Packet Radio Service (GPRS); Service description; Stage 2 (Release 11)," 3GPP TS 23.060 V11.2.0 (Jun. 2012).
Third Generation Partnership Project, "Technical Specification Group Services and System Aspects; IP flow mobility and seamless Wireless Local Area Network (WLAN) offload; Stage 2 (Release 10)," 3GPP TS 23.261 V10.1.0 (Sep. 2010).
Third Generation Partnership Project, "Technical Specification Group Services and System Aspects; IP flow mobility and seamless Wireless Local Area Network (WLAN) offload; Stage 2 (Release 10)," 3GPP TS 23.261 V10.2.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.9.0 (Jun. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.4.0 (Jun. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.2.0 (Jun. 2012).
Third Generation Partnership Project, "Technical Specification Group Services and System Aspects; General Packet Radio Service

(56) References Cited

OTHER PUBLICATIONS (GPRS) enhancements for Evolved Universal Terrestrial Radio Access Network (E-UTRAN) access (Release 9)," 3GPP TS 23.401 V9.13.0 (Jun. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.8.0 (Jun. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.14.0 (Jun. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).
Third Generation Partnership Project, "Technical Specification Group Core Network and Terminals; Non-Access-Stratum (NAS) protocol for Evolved Packet System (EPS); Stage 3(Release 8)," 3GPP TS 24.301 V8.10.0 (Jun. 2011).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC); Protocol Specification (Release 4)," 3GPP TS 25.331 V4.20.0 (Dec. 2008).
Third Generation Partnership Project, "Technical Specification Group Radio Access Network; Radio Resource Control (RRC); Protocol Specification (Release 5)," 3GPP TS 25.331 V5.24.0 (Jun. 2009).
Third Generation Partnership Project, "Technical Specification Group Radio Access Network; Radio Resource Control (RRC); Protocol Specification (Release 6)," 3GPP TS 25.331 V6.25.0 (Mar. 2010).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.2.0 (Jun. 2011).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.3.0 (Jun. 2011).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.3.0 (Jun. 2012).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.10.0 (Jun. 2012).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.7.0 (Jun. 2011).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.7.0 (Jun. 2012).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.6.0 (Jun. 2012).
Third Generation Partnership Project, "Technical Specification Group Radio Access Network; Evolved Universal Terrestrial Radio Access (E-UTRA); Physical layer procedures (Release 10)," 3GPP TS 36.213 V10.6.0 (Jun. 2012).
Third Generation Partnership Project, "Technical Specification Group Radio Access Network; Evolved Universal Terrestrial Radio Access (E-UTRA); Physical layer procedures (Release 10)," 3GPP TS 36.213 V10.2.0 (Jun. 2011).
Third Generation Partnership Project, "Technical Specification Group Radio Access Network; Radio Resource Control (RRC); Protocol specification (Release 11)," 3GPP TS 25.331 V11.2.0 (Jun. 2012).
Third Generation Partnership Project, "Technical Specification Group Services and System Aspects; 3GPP System Architecture Evolution (SAE); Security architecture (Release 8)," 3GPP TS 33.401 V8.8.0 (Jun. 2011).
Third Generation Partnership Project, "Technical Specification Group Services and System Aspects; 3GPP System Architecture Evolution (SAE); Security architecture (Release 9)," 3GPP TS 33.401 V9.7.0 (Jun. 2011).
Third Generation Partnership Project, "Technical Specification Group Services and System Aspects; 3GPP System Architecture Evolution (SAE); Security architecture (Release 10)," 3GPP TS 33.401 V10.1.1 (Jun. 2011).
Third Generation Partnership Project, "Technical Specification Group Services and System Aspects; 3GPP System Architecture Evolution (SAE); Security architecture (Release 10)," 3GPP TS 33.401 V10.3.0 (Jun. 2012).
Third Generation Partnership Project, "Technical Specification Group Services and System Aspects; 3GPP System Architecture Evolution (SAE); Security architecture (Release 11)," 3GPP TS 33.401 V11.0.0 (Jun. 2011).

(56) References Cited

OTHER PUBLICATIONS

Third Generation Partnership Project, "Technical Specification Group Services and System Aspects; 3GPP System Architecture Evolution (SAE); Security architecture (Release 11)," 3GPP TS 33.401 V11.4.0 (Jun. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.2.0 (Jun. 2011).
Third Generation Partnership Project, "Technical Specification Group Radio Access Network; Radio Resource Control (RRC); Protocol Specification (Release 4)," 3GPP TS 25.331 v4.21.0, Jan. 2012.
Third Generation Partnership Project, "Technical Specification Group Radio Access Network; Radio Resource Control (RRC); Protocol Specification (Release 5)," 3GPP TS 25.331 v5.25.0, Jan. 2012.
Third Generation Partnership Project, "Technical Specification Group Radio Access Network; Radio Resource Control (RRC); Protocol Specification (Release 6)," 3GPP TS 25.331 v6.26.0, Jan. 2012.
Third Generation Partnership Project, "Technical Specification Group Radio Access Network; Radio Resource Control (RRC); Protocol Specification (Release 7)," 3GPP TS 25.331 v7.20.0, Jun. 2011.
Third Generation Partnership Project, "Technical Specification Group Radio Access Network; Radio Resource Control (RRC); Protocol Specification (Release 7)," 3GPP TS 25.331 v7.22.0, Mar. 2012.
Third Generation Partnership Project, "Technical Specification Group Radio Access Network; Radio Resource Control (RRC); Protocol Specification (Release 8)," 3GPP TS 25.331 v8.15.0, Jun. 2011.
Third Generation Partnership Project, "Technical Specification Group Radio Access Network; Radio Resource Control (RRC); Protocol Specification (Release 8)," 3GPP TS 25.331 v8.19.0, Jul. 2012.
Third Generation Partnership Project, "Technical Specification Group Radio Access Network; Radio Resource Control (RRC); Protocol Specification (Release 9)," 3GPP TS 25.331 v9.7.0, Jul. 2011.
Third Generation Partnership Project, "Technical Specification Group Radio Access Network; Radio Resource Control (RRC); Protocol Specification (Release 9)," 3GPP TS 25.331 v9.11.0, Jul. 2012.
Third Generation Partnership Project, "Technical Specification Group Radio Access Network; Radio Resource Control (RRC); Protocol Specification (Release 10)," 3GPP TS 25.331 v10.4.0, Jul. 2011.
Third Generation Partnership Project, "Technical Specification Group Radio Access Network; Radio Resource Control (RRC); Protocol Specification (Release 10)," 3GPP TS 25.331 v10.8.0, Jul. 2012.
Third Generation Partnership Project, "Technical Specification Group Services and System Aspects; 3G Security; Security Architecture (Release 99)," 3GPP TS 33.102 v3.13.0, Dec. 2002.
Third Generation Partnership Project, "Technical Specification Group Services and System Aspects; 3G Security; Security Architecture (Release 4)," 3GPP TS 33.102 v4.5.0, Dec. 2002.
Third Generation Partnership Project, "Technical Specification Group Services and System Aspects; 3G Security; Security Architecture (Release 5)," 3GPP TS 33.102 v5.7.0, Dec. 2005.
Third Generation Partnership Project, "Technical Specification Group Services and System Aspects; 3G Security; Security Architecture (Release 6)," 3GPP TS 33.102 v6.5.0, Dec. 2005.
Third Generation Partnership Project, "Technical Specification Group Services and System Aspects; 3G Security; Security Architecture (Release 7)," 3GPP TS 33.102 v7.1.0, Dec. 2006.
Third Generation Partnership Project, "Technical Specification Group Services and System Aspects; 3G Security; Security Architecture (Release 8)," 3GPP TS 33.102 v8.6.0, Apr. 2010.
Third Generation Partnership Project, "Technical Specification Group Services and System Aspects; 3G Security; Security Architecture (Release 9)," 3GPP TS 33.102 v9.4.0, Dec. 2010.
Third Generation Partnership Project, "Technical Specification Group Services and System Aspects; 3G Security; Security Architecture (Release 10)," 3GPP TS 33.102 v10.0.0, Dec. 2010.
Third Generation Partnership Project, "Technical Specification Group Services and System Aspects; 3G Security; Security Architecture (Release 11)," 3GPP TS 33.102 v11.3.0, Jun. 2012.
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.17.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.14.0 (Jun. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.7.0 (Jun. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.11.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.2.0 (Jun. 2011).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.6.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.0.0 (Jun. 2012).
Tomici et al., "Multi-Rat Traffic Offloading Solutions for the Bandwidth Crunch Problem," Systems, Applications and Technology Conference (LISAT), IEEE Long Island, May 6, 2011, pp. 1-6.
Zte, "Consideration on the aggregation of LTE and HSPA," 3GPP TSG-RAN WG1 Meeting #64, R1-111173 (Feb. 21-25, 2011).
Third Generation Partnership Project, "Technical Specification Group Services and System Aspects; Operator Policies for IP Interface Selection (OPIIS); (Release 11)," 3GPP TR 23.853 V0.3.1 (Aug. 2011).
Third Generation Partnership Project, "Technical Specification Group Services and System Aspects; Operator Policies for IP Interface Selection (OPIIS); (Release 12)," 3GPP TR 23.853 V0.4.0 (May 2012).
Nokia Corporation (Rapporteur), "Revised Carrier Aggregation for LTE WID—core part, " 3GPP TSG RAN#48, RP-100661, Seoul, South Korea (Jun. 1-4, 2010).
Nokia Corporation (Rapporteur), "Revised Carrier Aggregation for LTE WID—performance part," 3GPP TSG RAN#48, RP-100661, Seoul, South Korea (Jun. 1-4, 2010).
Nokia Corporation (Rapporteur), "Revised Carrier Aggregation for LTE WID," 3GPP TSG RAN#48, RP-100661, Seoul, South Korea (Jun. 1-4, 2010).
Third Generation Partnership Project, " Technical Specification Group Core Network and Terminals; Mobile radio interface Layer 3 specification; Core network protocols; Stage 3 (Release 4)," 3GPP TS 24.008 V4.17.0 (Sep. 2007).
Third Generation Partnership Project, " Technical Specification Group Core Network; Mobile radio interface layer 3 specification; Core Network Protocols; Stage 3 (Release 1999)," 3GPP TS 24.008 V3.20.0 (Dec. 2005).

(56) References Cited

OTHER PUBLICATIONS

Third Generation Partnership Project, " Technical Specification Group Core Network and Terminals; Mobile radio interface Layer 3 specification; Core network protocols; Stage 3 (Release 5)," 3GPP TS 24.008 V5.16.0 (Jun. 2006).
Third Generation Partnership Project, "Technical Specification Group Core Network and Terminals; Mobile radio interface Layer 3 specification; Core network protocols; Stage 3 (Release 6)," 3GPP TS 24.008 V6.20.0 (Mar. 2010).
Third Generation Partnership Project, "Technical Specification Group Core Network and Terminals; Mobile radio interface Layer 3 specification; Core network protocols; Stage 3 (Release 7)," 3GPP TS 24.008 V7.15.0 (Mar. 2010).
Third Generation Partnership Project, "Technical Specification Group Core Network and Terminals; Mobile radio interface Layer 3 specification; Core network protocols; Stage 3 (Release 8)," 3GPP TS 24.008 V8.14.0 (Jun. 2011).
Third Generation Partnership Project, "Technical Specification Group Core Network and Terminals; Mobile radio interface Layer 3 specification; Core network protocols; Stage 3 (Release 9)," 3GPP TS 24.008 V9.7.0 (Jun. 2011).
Third Generation Partnership Project, "Technical Specification Group Core Network and Terminals; Mobile radio interface Layer 3 specification; Core network protocols; Stage 3 (Release 10)," 3GPP TS 24.008 V10.3.0 (Jun. 2011).
Third Generation Partnership Project, "Technical Specification Group Core Network and Terminals; Mobile radio interface Layer 3 specification; Core network protocols; Stage 3 (Release 11)," 3GPP TS 24.008 V11.3.0 (Jun. 2012).
Third Generation Partnership Project, "Technical Specification Group Core Network and Terminals; Mobile radio interface Layer 3 specification; Core network protocols; Stage 3 (Release 10)," 3GPP TS 24.008 V10.7.0 (Jun. 2012).
Third Generation Partnership Project, "Technical Specification Group Core Network and Terminals; Mobile radio interface Layer 3 specification; Core network protocols; Stage 3 (Release 8)," 3GPP TS 24.008 V8.17.0 (Jun. 2012).
Third Generation Partnership Project, "Technical Specification Group Core Network and Terminals; Mobile radio interface Layer 3 specification; Core network protocols; Stage 3 (Release 9)," 3GPP TS 24.008 V9.11.0 (Jun. 2012).
Third Generation Partnership Project, "Technical Specification Group Core Network and Terminals; Access Network Discovery and Selection Function (ANDSF) Management Object (MO) (Release 9)," 3GPP TS 24.312 V9.1.0 (Mar. 2010).
Third Generation Partnership Project, "Technical Specification Group Core Network and Terminals; Access Network Discovery and Selection Function (ANDSF) Management Object (MO) (Release 8)," 3GPP TS 24.312 V8.5.0 (Mar. 2010).
Third Generation Partnership Project, "Technical Specification Group Core Network and Terminals; Access Network Discovery and Selection Function (ANDSF) Management Object (MO) (Release 10)," 3GPP TS 24.312 V10.6.0 (Jun. 2012).
Third Generation Partnership Project, "Technical Specification Group Core Network and Terminals; Access Network Discovery and Selection Function (ANDSF) Management Object (MO) (Release 8)," 3GPP TS 24.312 V8.6.0 (Jun. 2012).
Third Generation Partnership Project, "Technical Specification Group Core Network and Terminals; Access Network Discovery and Selection Function (ANDSF) Management Object (MO) (Release 9)," 3GPP TS 24.312 V9.3.0 (Jun. 2012).
Third Generation Partnership Project, "Technical Specification Group Core Network and Terminals; Access Network Discovery and Selection Function (ANDSF) Management Object (MO) (Release 11)," 3GPP TS 24.312 V11.3.0 (Jun. 2012).
Third Generation Partnership Project, "Technical Specification Group Core Network and Terminals; Access Network Discovery and Selection Function (ANDSF) Management Object (MO) (Release 10)," 3GPP TS 24.312 V10.3.0 (Jun. 2011).
Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.10.0 (Sep. 2011).
Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.7.0 (Sep. 2011).
Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.7.0 (Mar. 2012).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.3.0 (Jun. 2012).
Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.4.0 (Jun. 2011).
Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.6.0 (Jun. 2011).
Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.9.0 (Jun. 2011).
Third Generation Partnership Project, "Technical Specification Group Services and System Aspects; Architecture enhancements for non-3GPP accesses (Release 8)," 3GPP TS 23A02 V8.9.0 (Jun. 2010).
Third Generation Partnership Project, "Technical Specification Group Services and System Aspects; Architecture enhancements for non-3GPP accesses (Release 8)," 3GPP TS 23A02 V8.10.0 (Mar. 2012).
Third Generation Partnership Project, "Technical Specification Group Services and System Aspects; Architecture enhancements for non-3GPP accesses (Release 10)," 3GPP TS 23.402 V10.7.0 (Mar. 2012).
Third Generation Partnership Project, "Technical Specification Group Services and System Aspects; Architecture enhancements for non-3GPP accesses (Release 9)," 3GPP TS 23A02 V9.12.0 (Mar. 2012).
Third Generation Partnership Project, "Technical Specification Group Services and System Aspects; Architecture enhancements for non-3GPP accesses (Release 9)," 3GPP TS 23.402 V9.9.0 (Jun. 2011).
Third Generation Partnership Project, "Technical Specification Group Services and System Aspects; Architecture enhancements for non-3GPP accesses (Release 10)," 3GPP TS 23.402 V10.4.0 (Jun. 2011).
Third Generation Partnership Project, "Technical Specification Group Services and System Aspects; Architecture enhancements for non-3GPP accesses (Release 11)," 3GPP TS 23.402 V11.3.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio

(56) References Cited

OTHER PUBLICATIONS

Access (E-UTRA) and Evolved Universal Terrestrial Radio Access Network (E-UTRAN); Overall description; Stage 2 (Release 10)," 3GPP TS 36.300 V10.8.0 (Jun. 2012).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.4.0 (Jun. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.2.0 (Jun. 2012).

Third Generation Partnership Project, "Technical Specification Group Radio Access Network; Evolved Universal Terrestrial Radio Access (E-UTRA); Radio Link Control (RLC) protocol specification (Release 8)," 3GPP TS 36.322 V8.8.0 (Jun. 2010).

Third Generation Partnership Project, "Technical Specification Group Radio Access Network; Evolved Universal Terrestrial Radio Access (E-UTRA); Radio Link Control (RLC) protocol specification (Release 9)," 3GPP TS 36.322 V9.3.0 (Sep. 2010).

Third Generation Partnership Project, "Technical Specification Group Radio Access Network; Evolved Universal Terrestrial Radio Access (E-UTRA); Radio Link Control (RLC) protocol specification (Release 10)," 3GPP TS 36.322 V10.0.0 (Dec. 2010).

Third Generation Partnership Project, "Technical Specification Group Radio Access Network; Evolved Universal Terrestrial Radio Access (E-UTRA); Packet Data Convergence Protocol (PDCP) specification (Release 8)," 3GPP TS 36.323 V8.6.0 (Jun. 2009).

Third Generation Partnership Project, "Technical Specification Group Radio Access Network; Evolved Universal Terrestrial Radio Access (E-UTRA); Packet Data Convergence Protocol (PDCP) specification (Release 9)," 3GPP TS 36.323 V9.0.0 (Dec. 2009).

Third Generation Partnership Project, "Technical Specification Group Radio Access Network; Evolved Universal Terrestrial Radio Access (E-UTRA); Packet Data Convergence Protocol (PDCP) specification (Release 10)," 3GPP TS 36.323 V10.1.0 (Mar. 2011).

LG Electronics, "New WID for Operator Policies for IP Interface Selection," TSG SA Meeting #51, SP-110222, Kansas City, USA (Mar. 21-23, 2011).

* cited by examiner

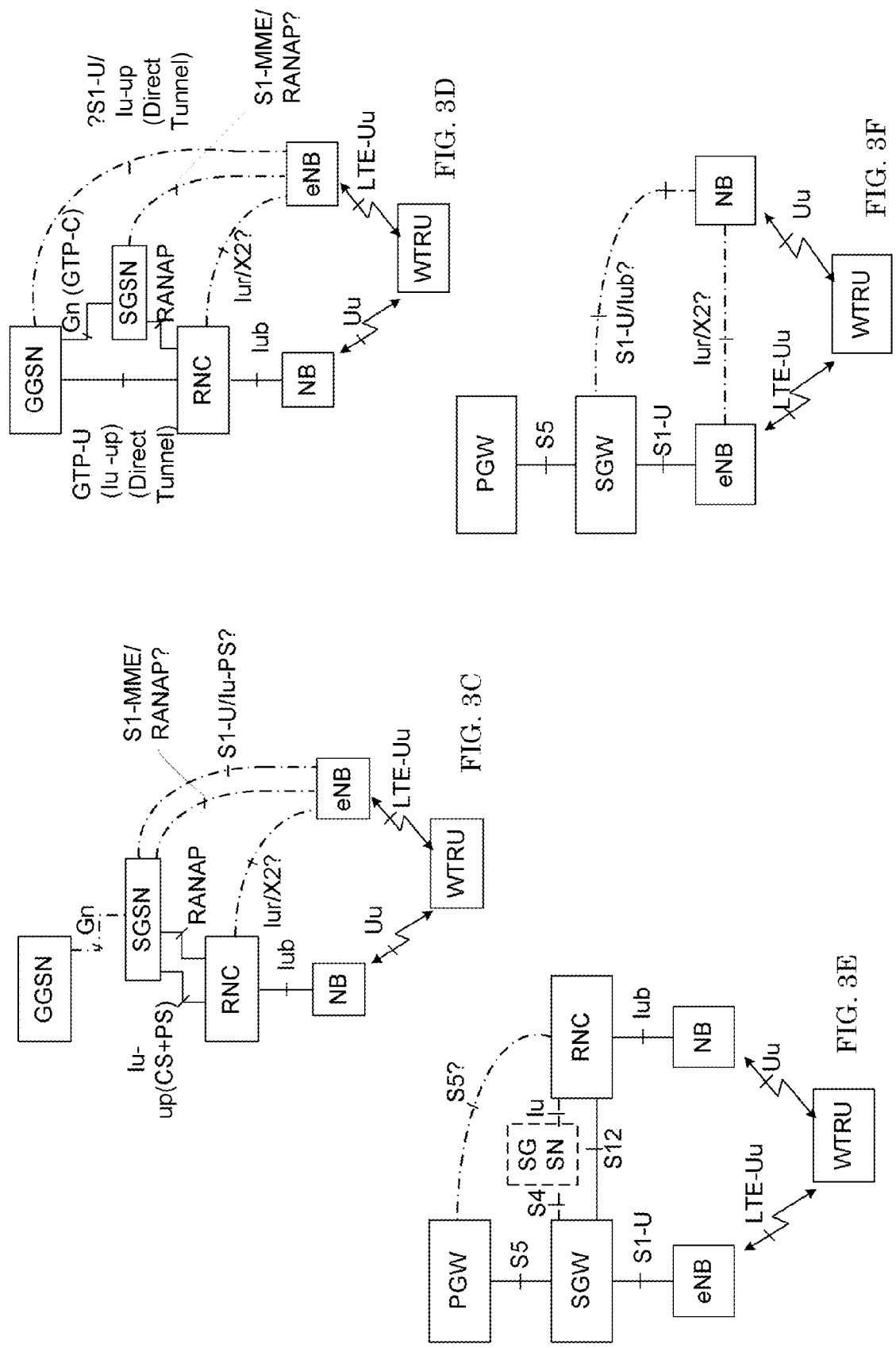

```
                                    2300
         ┌─────────────────────────────────────────────────────────────┐
         │ EPS attach type value (octet 1)                             │
         │ Bits                                                        │
         │ 3 2 1                                                       │
         │ 0 0 1    EPS attach                                         │
         │ 0 1 0    combined EPS/IMSI attach                           │
         │ 1 1 0    EPS emergency attach                               │
         │ 1 1 1    Reserved                                           │
2310 ──▶ │ 0 1 1    Combined EPS/GPRS/IMSI attach                      │
2320 ┄┄▶ │ 1 0 0    Combined EPS/GPRS attach                           │
         │ All other values are unused and shall be interpreted as "EPS attach", if │
         │ received by the network.                                    │
         │ Bit 4 of octet 1 is spare and shall be coded as zero.       │
         └─────────────────────────────────────────────────────────────┘
```

FIG. 23

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach accept message identity | Message type 9.8 | M | V | 1 |
| | EPS attach result | EPS attach result 9.9.3.10 | M | V | 1/2 |
| | Spare half octet | Spare half octet 9.9.2.9 | M | V | 1/2 |
| | T3412 value | GPRS timer 9.9.3.16 | M | V | 1 |
| | TAI list | Tracking area identity list 9.9.3.33 | M | LV | 7-97 |
| | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16a | O | TLV | 3 |
| | UTRAN Attach Status | | O | | |

2410    2400    FIG. 24

| IEI | Information Element | Type/Reference | Presence | Format | Length |
|---|---|---|---|---|---|
|  | Attach result | Attach result 10.5.5.1 | M | V | 1/2 |
|  | Force to standby | Force to standby 10.5.5.7 | M | V | 1/2 |
|  | Periodic RA update timer | GPRS Timer 10.5.7.3 | M | V | 1 |
|  | Radio priority for SMS | Radio priority 10.5.7.2 | M | V | 1/2 |
|  | Radio priority for TOM8 | Radio priority 2 10.5.7.5 | M | V | 1/2 |
|  | Routing area identification | Routing area identification 10.5.5.15 | M | V | 6 |
| 19 | P-TMSI signature | P-TMSI signature 10.5.5.8 | O | TV | 4 |
| 17 | Negotiated READY timer value | GPRS Timer 10.5.7.3 | O | TV | 2 |
| 18 | Allocated P-TMSI | Mobile identity 10.5.1.4 | O | TLV | 7 |
| 23 | MS identity | Mobile identity 10.5.1.4 | O | TLV | 7-10 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| B- | Network feature support | Network feature support 10.5.5.23 | O | TV | 1 |
| 34 | Emergency Number List | Emergency Number List 10.5.3.13 | O | TLV | 5-50 |
| A- | Requested MS Information | Requested MS Information 10.5.5.25 | O | TV | 1 |
| 37 | T3319 value | GPRS Timer 2 10.5.7.4 | O | TLV | 3 |
| 38 | T3323 value | GPRS Timer 2 10.5.7.4 | O | TLV | 3 |
| 39 | T3312 extended value | GPRS Timer 3 10.5.7.4a | O | TLV | 3 |

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach accept message identity | Message type 9.8 | M | V | 1 |
| | EPS attach result | EPS attach result 9.9.3.10 | M | V | 1/2 |
| | Spare half octet | Spare half octet 9.9.2.9 | M | V | 1/2 |
| | T3412 value | GPRS timer 9.9.3.16 | M | V | 1 |
| | TAI list | Tracking area identity list 9.9.3.33 | M | LV | 7-97 |
| | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16a | O | TLV | 3 |
| | UTRAN Attach Status | | O | | |
| | UTRAN activation of a PDP context | | O | | |

| IEI | Information Element | Type/Reference | Presence | Format | Length |
|---|---|---|---|---|---|
| | Negotiated LLC SAPI | LLC service access point identifier 10.5.6.9 | M | V | 1 |
| | Negotiated QoS | Quality of service 10.5.6.5 | M | LV | 13-17 |
| | Radio priority | Radio priority 10.5.7.2 | M | V | 1/2 |
| | Spare half octet | Spare half octet 10.5.1.8 | M | V | 1/2 |
| 2B | PDP address | Packet data protocol address 10.5.6.4 | O | TLV | 4-24 |
| 27 | Protocol configuration options | Protocol configuration options 10.5.6.3 | O | TLV | 3-253 |
| 34 | Packet Flow Identifier | Packet Flow Identifier 10.5.6.11 | O | TLV | 3 |
| 39 | SM cause | SM cause 2 10.5.6.6a | O | TLV | 3 |

| IEI | Information Element | Type/Reference | Presence | Format | Length |
|---|---|---|---|---|---|
| | Attach result | Attach result 10.5.5.1 | M | V | 1/2 |
| | Force to standby | Force to standby 10.5.5.7 | M | V | 1/2 |
| | Periodic RA update timer | GPRS Timer 10.5.7.3 | M | V | 1 |
| | Radio priority for SMS | Radio priority 10.5.7.2 | M | V | 1/2 |
| | Radio priority for TOM8 | Radio priority 2 10.5.7.5 | M | V | 1/2 |
| | Routing area identification | Routing area identification 10.5.5.15 | M | V | 6 |
| 19 | P-TMSI signature | P-TMSI signature 10.5.5.8 | O | TV | 4 |
| 17 | Negotiated READY timer value | GPRS Timer 10.5.7.3 | O | TV | 2 |
| 18 | Allocated P-TMSI | Mobile identity 10.5.1.4 | O | TLV | 7 |
| 23 | MS identity | Mobile identity 10.5.1.4 | O | TLV | 7-10 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| B- | Network feature support | Network feature support 10.5.5.23 | O | TV | 1 |
| 34 | Emergency Number List | Emergency Number List 10.5.3.13 | O | TLV | 5-50 |
| A- | Requested MS Information | Requested MS Information 10.5.5.25 | O | TV | 1 |
| 37 | T3319 value | GPRS Timer 2 10.5.7.4 | O | TLV | 3 |
| 38 | T3323 value | GPRS Timer 2 10.5.7.4 | O | TLV | 3 |
| 39 | T3312 extended value | GPRS Timer 3 10.5.7.4a | O | TLV | 3 |

```
DETType of detach (octet 1)

In the UE to network direction:
Bits
3 2 1
0 0 1    EPS detach
0 1 0    IMSI detach
0 1 1    combined EPS/IMSI detach
1 1 0    reserved
1 1 1    reserved
1 1 0    Combined EPS/GPRS detach        ← 2910
1 0 1    Combined EPS/GPRS/IMSI detach   ← 2920

All other values are interpreted as "combined EPS/IMSI detach" in this
version of the protocol.

In the network to UE direction:
Bits
3 2 1
0 0 1    re-attach required
0 1 0    re-attach not required
0 1 1    IMSI detach
1 1 0    reserved
1 1 1    Reserved
1 0 0    Combined EPS/GPRS detach        ← 2930
1 0 1    Combined EPS/GPRS/IMSI detach   ← 2940

All other values are interpreted as "re-attach not required" in this
version of the protocol.

Switch off (octet 1)

In the UE to network direction:
Bit
4
0        normal detach
1        switch off In the network to UE direction bit 4 is spare. The network shall set this
bit to zero.
```

Type of attach (octet 1, bit 1 to 3)
Bits
3 2 1
0 0 1    GPRS attach
0 1 0    Not used. This value was allocated in earlier versions of the protocol (Note1)
0 1 1    Combined GPRS/IMSI attach
1 0 0    Emergency attach
3010 → 1 1 0    Combined GPRS/EPS attach
3020 → 1 1 1    Combined GPRS/IMSI/EPS attach
3030 → 1 0 1    Combined IMSI/EPS attach All other values are interpreted as *GPRS attach in* this version of the protocol.

Follow-on request (octet 1, bit 4)
Bits
4
0    No follow-on request pending
1    Follow-on request pending
Follow-on request pending is applicable only in Iu mode.

NOTE 1:    The code point "010" if received by the network, may be interpreted as "Combined GPRS/IMSI attach".

| IEI | Information Element | Type/Reference | Presence | Format | Length |
|---|---|---|---|---|---|
| | Protocol discriminator | Protocol discriminator 10.2 | M | V | 1/2 |
| | Skip indicator | Skip indicator 10.3.1 | M | V | 1/2 |
| | Attach accept message identity | Message type 10.4 | M | V | 1 |
| | Attach result | Attach result 10.5.5.1 | M | V | 1/2 |
| | Force to standby | Force to standby 10.5.5.7 | M | V | 1/2 |
| | Periodic RA update timer | GPRS Timer 10.5.7.3 | M | V | 1 |
| | Radio priority for SMS | Radio priority 10.5.7.2 | M | V | 1/2 |
| | Radio priority for TOM8 | Radio priority 2 10.5.7.5 | M | V | 1/2 |
| | Routing area identification | Routing area identification 10.5.5.15 | M | V | 6 |
| 19 | P-TMSI signature | P-TMSI signature 10.5.5.8 | O | TV | 4 |
| 17 | Negotiated READY timer value | GPRS Timer 10.5.7.3 | O | TV | 2 |
| 18 | Allocated P-TMSI | Mobile identity 10.5.1.4 | O | TLV | 7 |
| 23 | MS identity | Mobile identity 10.5.1.4 | O | TLV | 7-10 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| B- | Network feature support | Network feature support 10.5.5.23 | O | TV | 1 |
| 34 | Emergency Number List | Emergency Number List 10.5.3.13 | O | TLV | 5-50 |
| A- | Requested MS Information | Requested MS Information 10.5.5.25 | O | TV | 1 |
| | EUTRAN Attach Accept | | | | |
| | NONCE | Bit string (128) | O | | |

| IEI | Information Element | Type/Reference | Presence | Format | Length |
|---|---|---|---|---|---|
| | EPS attach result | EPS attach result 9.9.3.10 | M | V | 1/2 |
| | Spare half octet | Spare half octet 9.9.2.9 | M | V | 1/2 |
| | T3412 value | GPRS timer 9.9.3.16 | M | V | 1 |
| | TAI list | Tracking area identity list 9.9.3.33 | M | LV | 7-97 |
| | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16a | O | TLV | 3 |

| IEI | Information Element | Type/Reference | Presence | Format | Length |
|---|---|---|---|---|---|
| | Protocol discriminator | Protocol discriminator 10.2 | M | V | 1/2 |
| | Skip indicator | Skip indicator 10.3.1 | M | V | 1/2 |
| | Attach accept message identity | Message type 10.4 | M | V | 1 |
| | Attach result | Attach result 10.5.5.1 | M | V | 1/2 |
| | Force to standby | Force to standby 10.5.5.7 | M | V | 1/2 |
| | Periodic RA update timer | GPRS Timer 10.5.7.3 | M | V | 1 |
| | Radio priority for SMS | Radio priority 10.5.7.2 | M | V | 1/2 |
| | Radio priority for TOM8 | Radio priority 2 10.5.7.5 | M | V | 1/2 |
| | Routing area identification | Routing area identification 10.5.5.15 | M | V | 6 |
| 19 | P-TMSI signature | P-TMSI signature 10.5.5.8 | O | TV | 4 |
| 17 | Negotiated READY timer value | GPRS Timer 10.5.7.3 | O | TV | 2 |
| 18 | Allocated P-TMSI | Mobile identity 10.5.1.4 | O | TLV | 7 |
| 23 | MS identity | Mobile identity 10.5.1.4 | O | TLV | 7-10 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| B- | Network feature support | Network feature support 10.5.5.23 | O | TV | 1 |
| 34 | Emergency Number List | Emergency Number List 10.5.3.13 | O | TLV | 5-50 |
| A- | Requested MS Information | Requested MS Information 10.5.5.25 | O | TV | 1 |
| | UTRAN Activate PDP Context Accept | | | | |
| | EUTRAN Attach Accept | | | | |
| | NONCE | Bit string (128) | O | | |

| IEI | Information Element | Type/Reference | Presence | Format | Length |
|---|---|---|---|---|---|
| | Negotiated LLC SAPI | LLC service access point identifier 10.5.6.9 | M | V | 1 |
| | Negotiated QoS | Quality of service 10.5.6.5 | M | LV | 13-17 |
| | Radio priority | Radio priority 10.5.7.2 | M | V | 1/2 |
| | Spare half octet | Spare half octet 10.5.1.8 | M | V | 1/2 |
| 2B | PDP address | Packet data protocol address 10.5.6.4 | O | TLV | 4-24 |
| 27 | Protocol configuration options | Protocol configuration options 10.5.6.3 | O | TLV | 3-253 |
| 34 | Packet Flow Identifier | Packet Flow Identifier 10.5.6.11 | O | TLV | 3 |
| 39 | SM cause | SM cause 2 10.5.6.6a | O | TLV | 3 |

| IEI | Information Element | Type/Reference | Presence | Format | Length |
|---|---|---|---|---|---|
| | EPS attach result | EPS attach result 9.9.3.10 | M | V | 1/2 |
| | Spare half octet | Spare half octet 9.9.2.9 | M | V | 1/2 |
| | T3412 value | GPRS timer 9.9.3.16 | M | V | 1 |
| | TAI list | Tracking area identity list 9.9.3.33 | M | LV | 7-97 |
| | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16a | O | TLV | 3 |

FIG. 35

```
DType of detach (octet 1)

In the MS to network direction:
Bits
3 2 1
0 0 1    GPRS detach
0 1 0    IMSI detach
0 1 1    Combined GPRS/IMSI detach
1 0 1    Combined EPS/GPRS detach
1 1 0    Combined EPS/IMSI detach
1 1 1    Combined EPS/GPRS/IMSI detach All other values are interpreted as *Combined GPRS/IMSI detach* by this version of the protocol.

In the network to MS direction:
Bits
3 2 1
0 0 1    re-attach required
0 1 0    re-attach not required
0 1 1    IMSI detach (after VLR failure)
1 0 1    Combined EPS/GPRS detach
1 1 0    Combined EPS/IMSI detach
1 1 1    Combined EPS/GPRS/IMSI detach All other values are interpreted as *re-attach not required* by this version of the protocol.

Power off (octet 1)

In the MS to network direction:
Bit
4
0    normal detach
1    power switched off In the network to MS direction the *Power off* bit shall be spare and set to zero.
```

3610 → Combined EPS/GPRS detach (MS to network)
3620 → Combined EPS/IMSI detach (MS to network)
3630 → Combined EPS/GPRS/IMSI detach (MS to network)
3640 → Combined EPS/GPRS detach (network to MS)
3650 → Combined EPS/IMSI detach (network to MS)
3660 → Combined EPS/GPRS/IMSI detach (network to MS)

METHOD AND APPARATUS FOR USING
NON-ACCESS STRATUM PROCEDURES IN
A MOBILE STATION TO ACCESS
RESOURCES OF COMPONENT CARRIERS
BELONGING TO DIFFERENT RADIO
ACCESS TECHNOLOGIES

CROSS REFERENCE TO RELATED
APPLICATIONS

This application claims the benefit of U.S. Provisional Application No. 61/525,432 filed Aug. 19, 2011, the contents of which are hereby incorporated by reference herein.

BACKGROUND

The demand for improved network coverage, improved capacity and increasing bandwidth for both voice and data services in wireless systems has led to continuous development of a number of radio access technologies (RATs) including, for example, wideband channel division multiple access (WCDMA) and long term evolution (LTE). WCDMA may support the simultaneous use of two high speed downlink packet access (HSDPA) downlink component carriers (2C-HSDPA). LTE may support simultaneous transmission and/or reception using the radio resources of a plurality of component carriers between a network node, for example between an evolved Node-B (eNodeB), and a wireless transmit/receive unit (WTRU) within the same transmission interval.

Some operators may deploy both WCDMA/high speed packet access (HSPA) and LTE in the same coverage areas, with LTE as a data enhancement overlay. LTE deployments may have a coverage that is similar to existing WCDMA/HSPA deployments, and multi-mode WTRUs, (e.g., supporting both WCDMA/HSPA and LTE accesses), may be widely deployed.

Spectrum is a costly resource and not all frequency bands may be available to all operators, although it may be expected that many operators may offer support for both HSPA and LTE services. Carrier aggregation scenarios may typically be limited to at most 2-3 component carriers per RAT for a given operator. In addition, legacy deployments may be maintained for a foreseeable future while LTE is being deployed, which may lead to a situation where operators may see periods of underutilization of radio resources, spectrum and capacity in one of their RATs.

Therefore, there is a need in the art for a WTRU to operate simultaneously on multiple frequencies, where the WTRU operates on at least one of the frequencies according to a different RAT.

SUMMARY

Described herein are methods related to how a WTRU may concurrently operate on a plurality of radio access technologies (RAT), using radio resources of at least one cell on which the WTRU operates according to a first RAT and radio resources of at least one cell on which the WTRU operates according to a second RAT. Methods described herein may be applicable, without limitation, to this type of operation. The methods described herein may also possibly be applied in any combination thereof, including any combinations of the embodiments provided as example.

A wireless transmit/receive unit (WTRU) to perform a multi-radio access technology (RAT) access (MRA) operation is disclosed. The WTRU may include a WTRU non-access stratum (NAS) entity configured to communicate with a first NAS entity of a first core network and a second NAS entity of a second core network; and a radio resource control (RRC) entity configured to control a first connection using a first RAT and a second connection using a second RAT, wherein the first RAT is connected to the first core network and the second RAT is connected to the second core network.

A wireless transmit/receive unit (WTRU) to perform a multi-radio access technology (RAT) access (MRA) operation is disclosed. The WTRU may include a WTRU non-access stratum (NAS) entity configured to communicate with a first NAS entity of a first core network and a second NAS entity of a second core network; a first radio resource control (RRC) entity configured to control a first connection using a first RAT; and a second RRC entity configured to control a second connection using a second RAT, wherein the first RAT is connected to the first core network and the second RAT is connected to the second core network.

A wireless transmit/receive unit (WTRU) to perform a multi-radio access technology (RAT) access (MRA) operation is disclosed. The WTRU may include a first WTRU non-access stratum (NAS) entity configured to communicate with a first NAS entity of a first core network; a second WTRU NAS entity configured to communicate with a second NAS entity of a second core network; and a radio resource control (RRC) entity configured to control a first connection using a first RAT and a second connection using a second RAT, wherein the first RAT is connected to the first core network and the second RAT is connected to the second core network.

A wireless transmit/receive unit (WTRU) to perform a multi-radio access technology (RAT) access (MRA) operation is disclosed. The WTRU may include a first WTRU non-access stratum (NAS) entity configured to communicate with a first NAS entity of a first core network; a second WTRU NAS entity configured to communicate with a second NAS entity of a second core network; and a radio resource control (RRC) entity configured to control a first connection using a first RAT; and a second RRC entity configured to control a second connection using a second RAT, wherein the first RAT is connected to the first core network and the second RAT is connected to the second core network.

A method of a wireless transmit/receive unit (WTRU) performing a multi-radio access technology (RAT) access (MRA) operation is disclosed. The method may include determining a first cell of a first RAT that supports MRA operation; attaching to a first NAS entity of a first core network via the first cell using a WTRU non-access stratum (NAS) entity configured to communicate with the first NAS entity of the first core network and a second NAS entity of a second core network, and using a radio resource control (RRC) entity configured to control a first connection using the first RAT and a second connection using a second RAT, wherein the first RAT is connected to the first core network and the second RAT is connected to the second core network; determining a second cell of the second RAT that supports MRA operation; and attaching to the second NAS entity using the WRTU NAS entity and the RRC entity.

A method of a wireless transmit/receive unit (WTRU) performing a multi-radio access technology (RAT) access (MRA) operation is disclosed. The method may include determining a first cell of a first RAT that supports MRA operation; attaching to a first NAS entity of a first core network via the first cell using a WTRU non-access stratum (NAS) entity configured to communicate with the first NAS entity of the first core network and a second NAS entity of a second core network, and using a first radio resource control (RRC) entity configured to control a first connection using the first RAT, wherein the first RAT is connected to the first core network; determining a second cell of a second RAT that supports MRA operation; and attaching to the second NAS entity via the second cell using the WRTU NAS entity and a second RRC entity configured to control a second connection using the second RAT, wherein the second RAT is connected to the second core network.

A method of a wireless transmit/receive unit (WTRU) performing a multi-radio access technology (RAT) access (MRA) operation is disclosed. The method may include determining a first cell of a first RAT that supports MRA operation; attaching to a first NAS entity of a first core network via the first cell using a first WTRU non-access stratum (NAS) entity configured to communicate with a first NAS entity of a first core network, and using a radio resource control (RRC) entity configured to control a first connection using the first RAT and a second connection using a second RAT, wherein the first RAT is connected to the first core network and the second RAT is connected to the second core network; determining a second cell of the second RAT that supports MRA operation; and attaching to the second NAS entity via the second cell using a second WTRU NAS entity configured to communicate with the second NAS entity of the second core network and the RRC entity.

A method of a wireless transmit/receive unit (WTRU) performing a multi-radio access technology (RAT) access (MRA) operation is disclosed. The method may include determining a first cell of a first RAT that supports MRA operation; attaching to a first NAS entity via the first cell using a first WTRU non-access stratum (NAS) entity configured to communicate with a first NAS entity of a first core network, and using a first radio resource control (RRC) entity configured to control a first connection using the first RAT, wherein the first RAT is connected to the first core network; determining a second cell of a second RAT that supports MRA operation; and attaching to a second NAS entity via the second cell using a second WRTU NAS entity and a second RRC entity configured to control a second connection using the second RAT, wherein the second RAT is connected to the second core network.

BRIEF DESCRIPTION OF THE DRAWINGS

A more detailed understanding may be had from the following description, given by way of example in conjunction with the accompanying drawings wherein:

FIGS. 3A, 3B, 3C, 3D, 3E, 3F, 3G, 3H, and 3I schematically illustrates different network architectures to facilitate MRA operation according to examples of WTRUs;

FIG. 23 schematically illustrates an example of a table that illustrates an EPS attach type information elements (IE) for Combined ATTACH Procedure with the introduction of two new Information Element (IE);

FIG. 24 illustrates an example of a table that illustrates an EPS attach type information elements (IE) for Combined DETACH Procedure;

FIG. 25 schematically illustrates an example of a table that illustrates a GPRS/UMTS Attach Status Information Element (IE) as introduced in the modified EPS attach accept message illustrated in FIG. 24;

FIG. 26 schematically illustrates an example of a table that illustrates another example of a modified EPS attach accept message content;

FIG. 27 schematically illustrates an example of a GPRS/UMTS PDP context message content as an example of the modified EPS attach accept message illustrated in FIG. 26;

FIG. 28 schematically illustrates an example table of GPRS/UMTS attach accept message content;

FIG. 29 schematically illustrates an example of a modified table of information elements (IE) for a detach type IE used in an EPS detach request message for a combined detach procedure;

FIG. 30 schematically illustrates an example of a table of GPRS/UMTS attach type IEs used in a GPRS/UMTS attach request message for a combined attach;

FIG. 31 schematically illustrates an example of a modified table of GPRS/UMTS attach accept message content for a combined attach procedure;

FIG. 32 schematically illustrates an example table for EPS attach accept message content;

FIG. 33 schematically illustrates an example of a modified table of GPRS/UMTS attach accept message content for a combined attach procedure;

FIG. 34 schematically illustrates an example table for GPTS/UMTS activate PDP context accept message content;

FIG. 35 schematically illustrates another example table for EPS attached accept message; and FIG. 36 schematically illustrates an example of a table for a GPRS/UMTS detach type of information element for a combined detach.

DETAILED DESCRIPTION

Figure 1A:
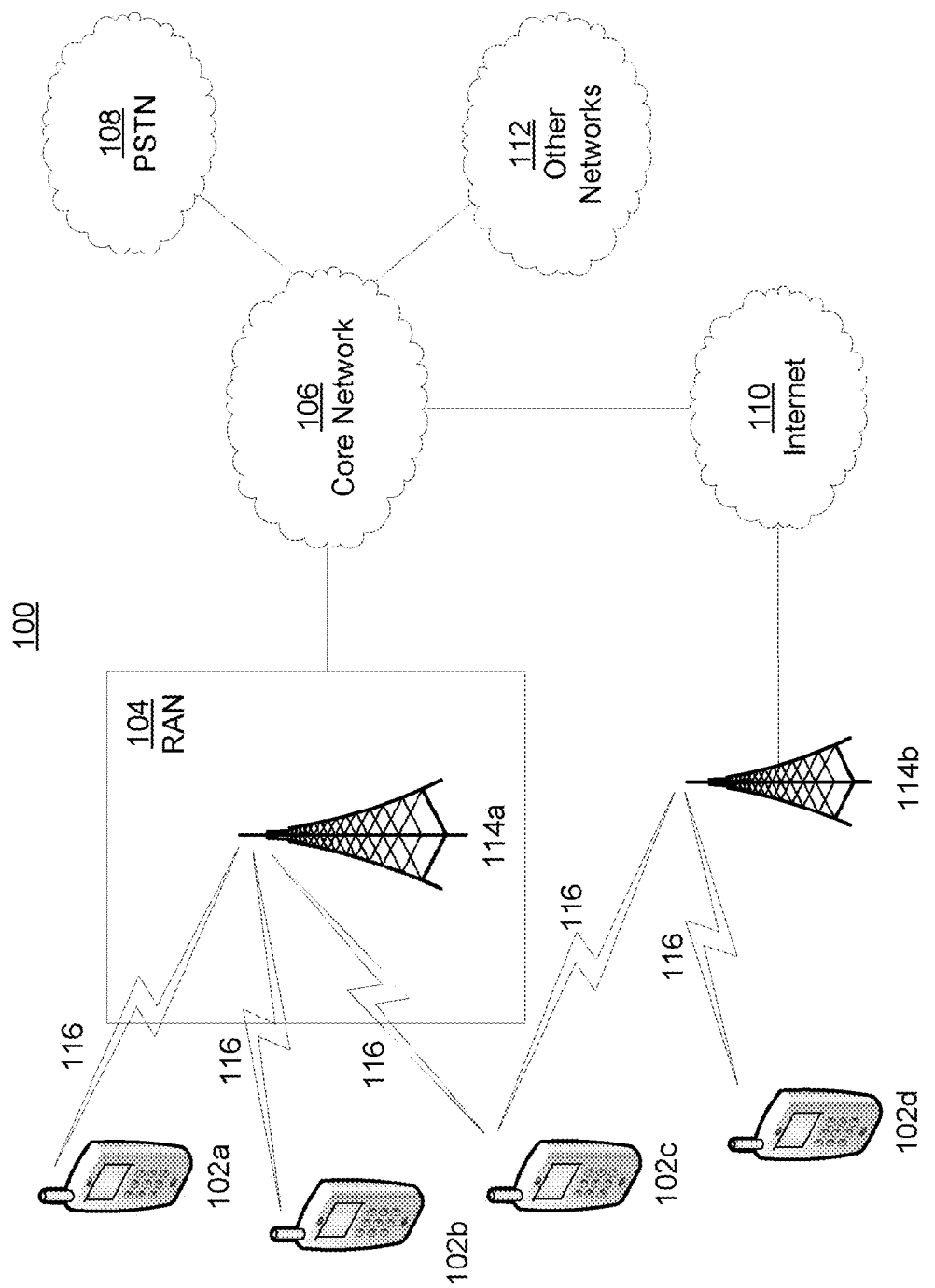
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a notebook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink (DL) packet access (HSDPA) and/or high-speed uplink (UL) packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over Internet protocol (VoIP) services to one or more of the WTRUs 102a, 102b, 102c, 102d. For example, the CN 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing an E-UTRA radio technology, the CN 106 may also be in communication with another RAN (not shown) employing a GSM radio technology.

The CN 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
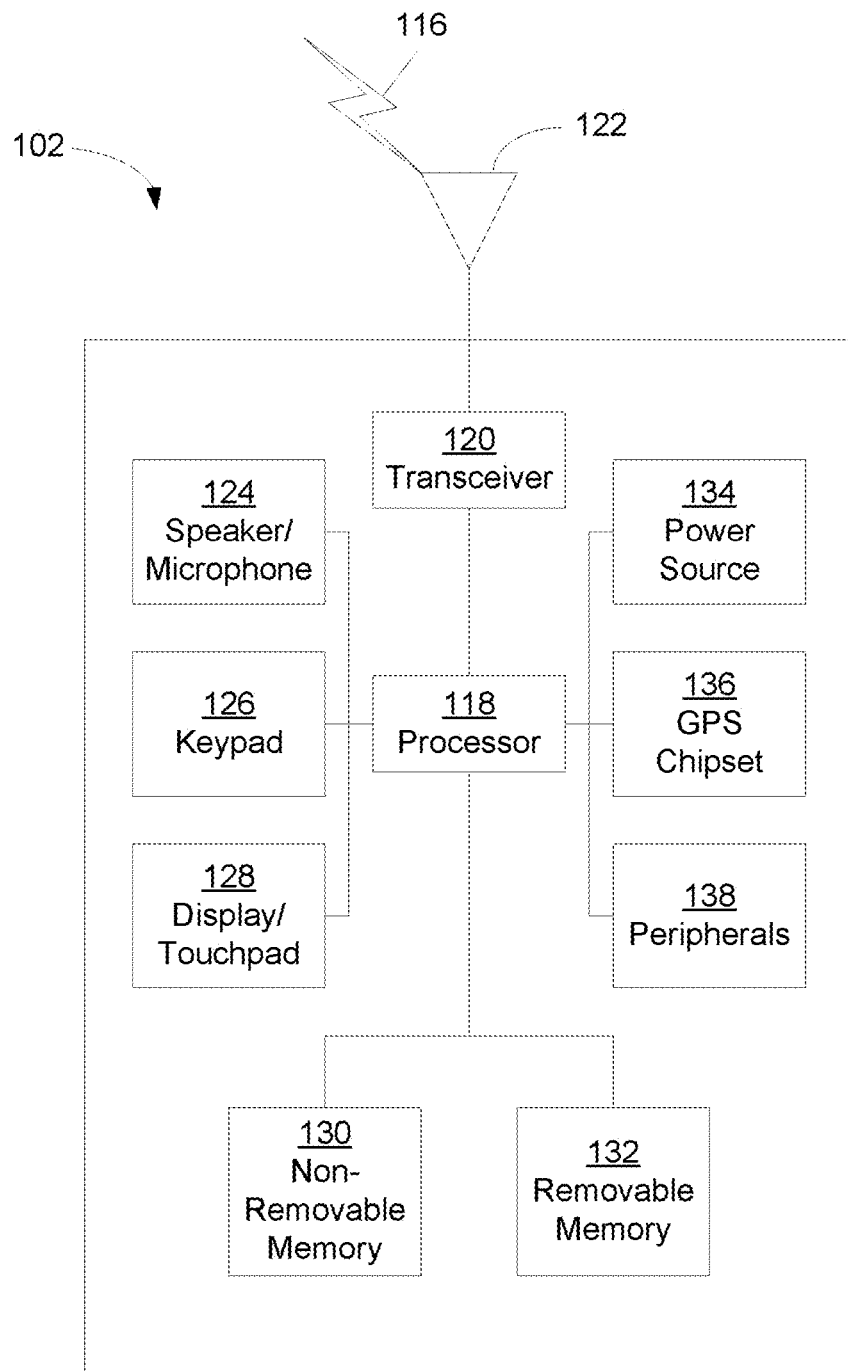
FIG. 1B shows an example WTRU that may be used within the communications system 100 shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include a sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals.

In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, or LTE and WCDMA/HSPA, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
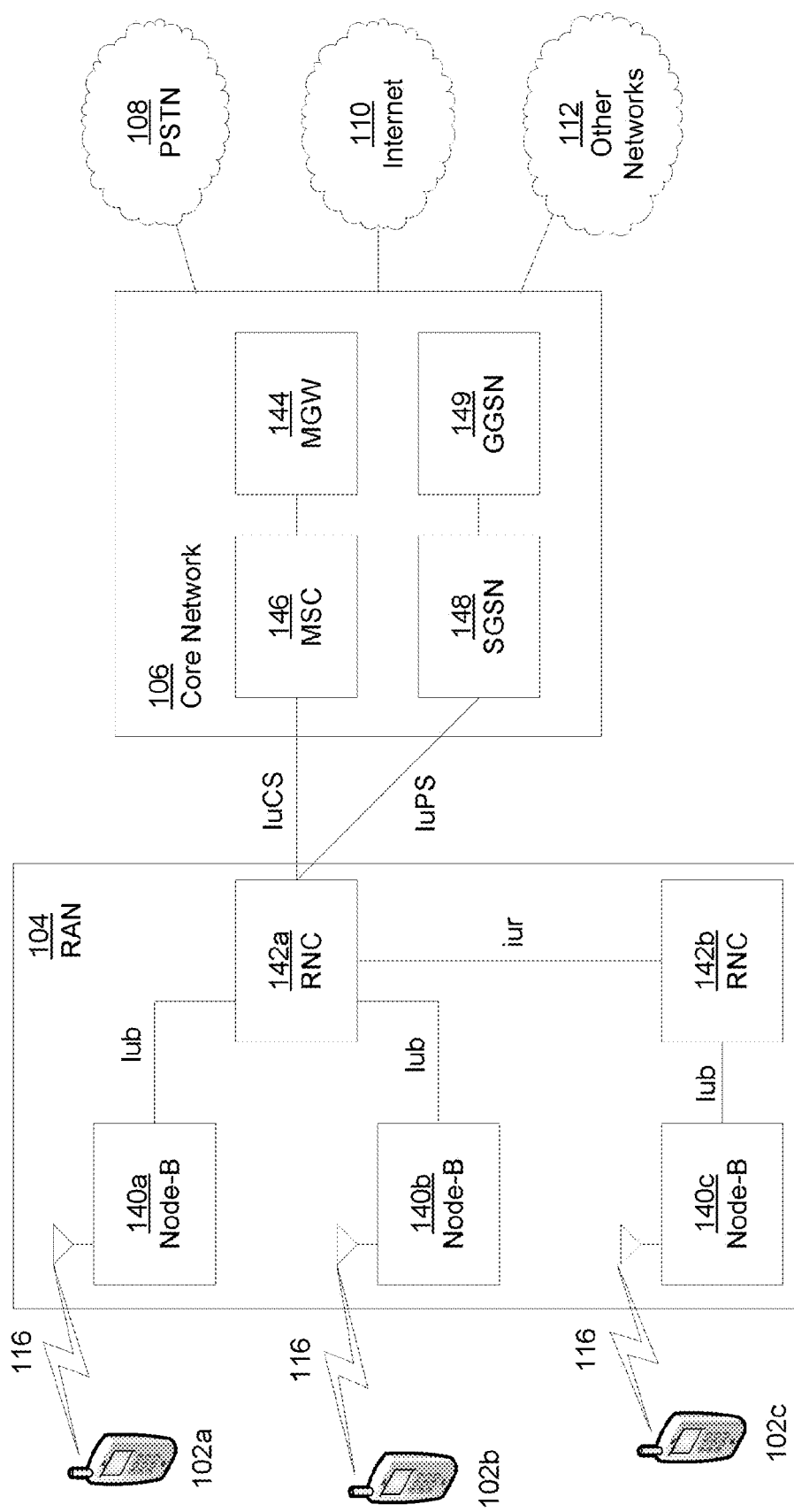
FIG. 1C is a system diagram of the RAN and the core network 106 according to an embodiment.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 149. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 149. The SGSN 148 and the GGSN 149 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

The CN 106 may include a home network subscriber node, which performs authentication, security context preservation and security key generation for WTRUs. The home network subscribers node may be referred to as a home location register (HLR) or home subscriber server (HSS).

Figure 1D:
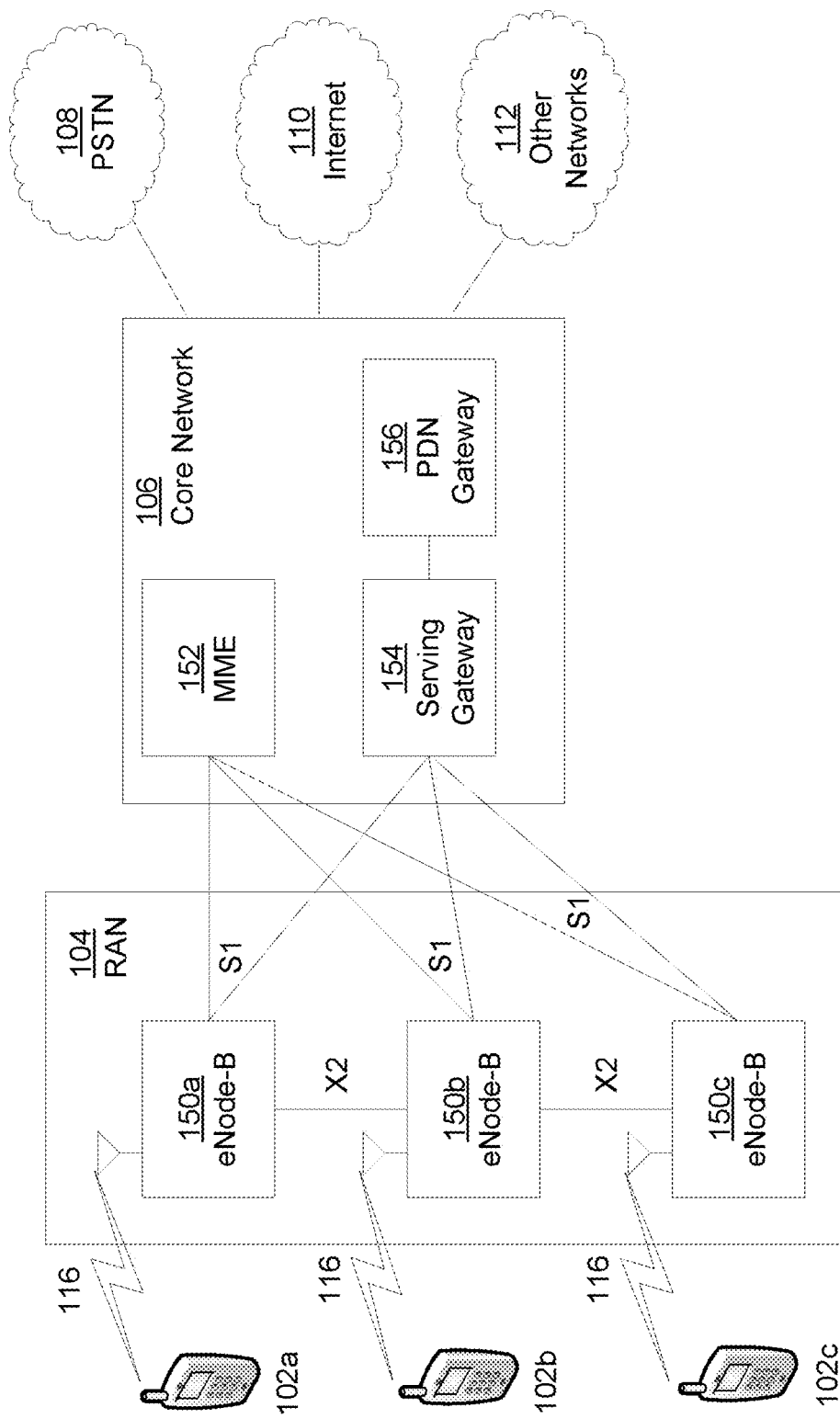
FIG. 1D shows another example RAN and another example CN 106 that may be used within the communications system shown in FIG. 1A.

FIG. 1D shows another example RAN 104 and another example CN 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-B's (eNBs) 150a, 150b, 150c, though it will be appreciated that the RAN 104 may include any number of eNBs while remaining consistent with an embodiment. The eNBs 150a, 150b, 150c may each include one or more transceivers for communicating with the WTRUs 102a, 102b, 102c over the air interface 116. In one embodiment, the eNBs 150a, 150b, 150c may implement MIMO technology. Thus, the eNB 150a, for example, may use multiple antennas to transmit wireless signals to, and receive wireless signals from, the WTRU 102a.

Each of the eNBs 150a, 150b, 150c may be associated with a particular cell (not shown) and may be configured to handle radio resource management decisions, handover decisions, scheduling of users in the UL and/or DL, and the like. As shown in FIG. 1D, the eNBs 150a, 150b, 150c may communicate with one another over an X2 interface.

The CN 106 shown in FIG. 1D may include a mobility management entity (MME) 152, a serving gateway 154, and a packet data network (PDN) gateway (GW) 156. While each of the foregoing elements is depicted as part of the CN 106, it will be appreciated that any one of these elements may be owned and/or operated by an entity other than the CN operator.

The MME 152 may be connected to each of the eNBs 150a, 150b, 150c in the RAN 104 via an S1 interface and may serve as a control node. For example, the MME 152 may be responsible for authenticating users of the WTRUs 102a, 102b, 102c, bearer activation/deactivation, selecting a particular serving gateway during an initial attach of the WTRUs 102a, 102b, 102c, and the like. The MME 152 may also provide a control plane function for switching between the RAN 104 and other RANs (not shown) that employ other radio technologies, such as GSM or WCDMA.

The serving gateway 154 may be connected to each of the eNBs 150a, 150b, 150c in the RAN 104 via the S1 interface. The serving gateway 154 may generally route and forward user data packets to/from the WTRUs 102a, 102b, 102c. The serving gateway 154 may also perform other functions, such as anchoring user planes during inter-eNB handovers, triggering paging when DL data is available for the WTRUs 102a, 102b, 102c, managing and storing contexts of the WTRUs 102a, 102b, 102c, and the like.

The serving gateway 154 may also be connected to the PDN gateway 156, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway, (e.g., an IP multimedia subsystem (IMS) server), that serves as an interface between the CN 106 and the PSTN 108. In addition, the CN 106 may provide the WTRUs 102a, 102b, 102c with access to other networks 112, which may include other wired or wireless networks that are owned and/or operated by other service providers.

The CN 106 may include a home network subscriber node, which performs authentication, security context preservation and security key generation for WTRUs. The home network subscribers node may be referred to as a home location register (HLR) or home subscriber server (HSS).

FIG. 1C described a UMTS/GPRS system. FIG. 1D described a LTE system. The system could be another type of system such as GERAN or WMAX.

In examples, LTE may include EPS and EPS may include LTE.

Figure 2A:
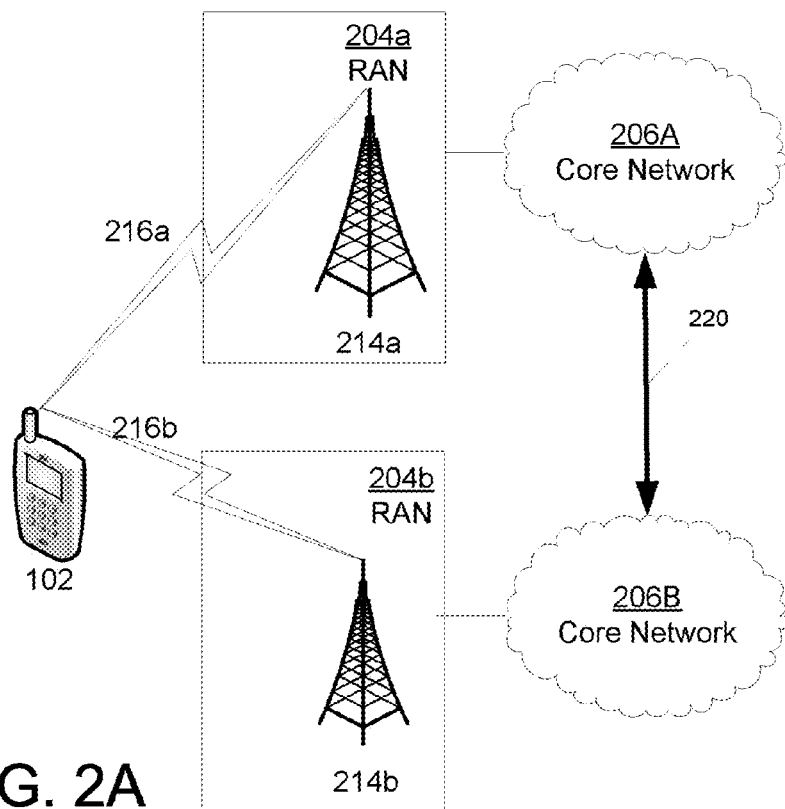
FIG. 2A shows a WRTU communicating with two different RANs 204a and 204b with two core networks 206a and 206b configured to communicate with one another.

FIG. 2A shows a WRTU communicating with two different RANs 204a and 204b with two core networks 206a and 206b configured to communicate with one another. Illustrated in FIG. 2A is a WRTU 102, two RANs 204a, 204b, two base stations 214a, 214b, and two core networks 206a, 206b. As illustrated in FIG. 1A, the core networks 206A and 206B may be configured to communicate with a PSTN 108, the Internet 110, and other networks 112.

The WRTU 102 may be a multi-mode WTRU 102. A multi-mode WTRU 102 is any mobile terminal supporting at least two different radio access technologies (RAT). For example, multi-mode WRTU 102 supports two or more of: GSM, WCDMA, HSPA, HSDPA, HSUPA and LTE, IEEE 802.11b/a/g/n, IEEE 802.16a/e and 802.20, as well as CDMA2000 1x and CDMA2000 EV-DO. As illustrated, the WTRU 102 may be communicating with two different base stations 214a and 214b, which may be part of two RANs 204a and 204b, respectively. The RAN 204a and core network 206a may be an EPS communication system and RAN 204b and core network 206b may be a UTMS/GPRS communication system. The two core networks 206a and 206b may communicate 220 with one another to assist in coordinating the communication between the WRTU 102 and the two core networks 206a, 206b, and between the WTRU 102 and the two base stations 214a and 214b. The communication 220 may include different entities communicating with one another within the core network 206a, 206b. For example, a MME entity in core network 206a may communicate with a SGSN entity in core network 206b. The two base stations 214a, 214b and two RANs 204a, 204b may be as described in conjunction with for FIG. 1.

Figure 2B:
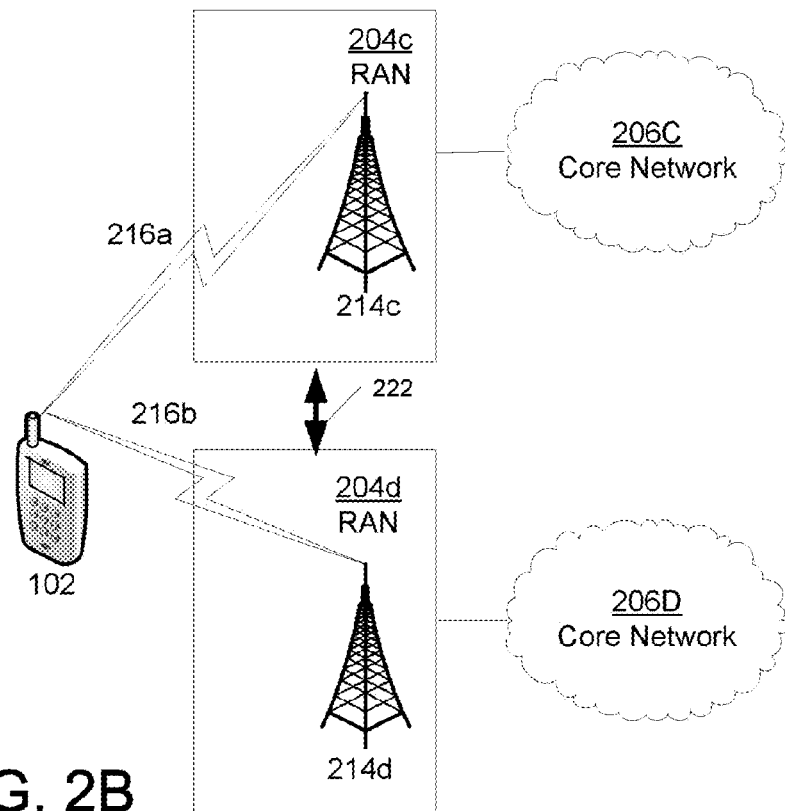
FIG. 2B shows a WRTU communicating with two different base stations with two RANs configured to communicate with one another.

FIG. 2B shows a WRTU communicating with two different base stations with two RANs configured to communicate with one another. Illustrated in FIG. 2A is a WRTU 102, two RANs 204c, 204d, two base stations 214c, 214d, and two core networks 206c, 206d. As illustrated in FIG. 1A, the core networks 206c and 206d may be configured to communicate with PSTN 108, the Internet 110, and other networks 112.

The WRTU 102 may be a multi-mode WTRU. As illustrated, the WTRU 102 may be communicating with two different base stations 214c and 214d, which may be part of two RANs 204c and 204d, respectively. The RAN 204c and core network 106c may be an EPS communication system and RAN 204d and core network 106d may be a UMTS/GPRS communication system. The two RANs 204c and 204d may communicate 222 with one another to assist in coordinating the communication between the WRTU 102 and the two base stations 214a and 214b. The communication 220 may include different entities communicating with one another within the RANs 204c, 204d. The two base stations 214c, 214d and two core networks 206c, 206d may be as described for FIG. 1.

A cell (not shown) that is served by a base station 214a, 214b, 214c, and 214d may be a primary cell (PCell), or a secondary cell (SCell), and when a cell is either a PCell or a SCell the cell may be considered a serving cell. PCell, SCell, and serving cell are discussed further below.

A component carrier (CC) may include a frequency on which the WTRU 102 operates the air interface 216. The air interface 216 may comprise one or more physical channels. For example, a WTRU 102 may receive transmissions on a down-link (DL) CC that may comprise a plurality of DL physical channels that comprise the air interface 216. As another example, a WTRU 102 may perform transmissions on a UL CC that may comprise of a plurality of UL physical channels that comprise the air interface 216.

For example, for LTE, the DL physical channels include the physical control format indicator channel (PCFICH), the physical HARQ indicator channel (PHICH), the physical data control channel (PDCCH), the physical multicast data channel (PMCH) and the physical data shared channel (PDSCH). On the PCFICH, the WTRU 102 may receive control data indicating the size of the control region of the DL CC. On the PHICH, the WTRU 102 may receive control data indicating HARQ positive acknowledgement (ACK)/ negative acknowledgement (NACK) feedback for a previous uplink transmission. On the PDCCH, the WTRU 102 may receive DL control information (DCIs) messages used for the purpose of scheduling of DL and UL resources. On the PDSCH, the WTRU 102 may receive user and/or control data. For example, a WTRU 102 may transmit on a UL CC.

For LTE, the UL physical channels include the physical UL control channel (PUCCH) and the physical UL shared channel (PUSCH). On the PUSCH, the WTRU 102 may transmit user and/or control data. On the PUCCH, and in some case on the PUSCH, the WTRU 102 may transmit UL control information. For example, the WTRU 102 may transmit channel quality indicator (CQI)/precoding matrix indicator (PMI)/rank indicator (RI) or scheduling request (SR) and/or HARQ ACK/NACK feedback. On a UL CC, the WTRU 102 may also be allocated dedicated resources for transmission of sounding and reference signals (SRS).

For example, for HSDPA, a shared channel may be used for downlink transmission: the high-speed downlink shared channel (HS-DSCH). The HS-DSCH may be a transport channel on which the WTRU 102 receives user data and/or control signaling from logical channels, such as a dedicated transport channel (DTCH), a dedicated control channel (hereafter DCCH), a common control channel (CCCH), or possibly also a broadcast control channel (BCCH). The WTRU 102 may receive the HS-DSCH on the high-speed DL shared channel (HS-PDSCH). The WTRU 102 may receive DL control signaling for scheduling of the HS-PDSCH, (e.g., transport format including channelization code, modulation scheme and transport block size), as well as other types of control signaling for, e.g., discontinuous reception (DRX)/discontinuous transmission (DTX) activation/deactivation, and/or activation/deactivation commands for additional HSPA cells on the high-speed shared control channel (HS-SCCH). The WTRU 102 may transmits UL feedback control information related to HS-PDSCH transmissions and/or related to HS-SCCH orders, which feedback consists of HARQ feedback, CQI, as well as pre-coding control information (PCI) if the WTRU 102 is configured for MIMO operation, on the high-speed dedicated physical control channel (HS-DPCCH), one for each configured HS-DSCH. Power control commands may be received by the WTRU 102 on the DPCH or on the fractional DPCH (F-DPCH). There is no soft-handover for HS-SCCH and HS-DPSCH.

For example, for HSUPA, fast scheduling and fast HARQ for soft combining may be supported, and the enhanced dedicated channel (E-DCH) may be used. Soft handover may be supported for HSUPA. The E-DCH may be mapped on the dedicated physical data channel (E-DPDCH). There may be zero, one or more E-DPDCH(s) on each radio link. The WTRU 102 may transmit control information associated with the E-DCH on the E-DCH dedicated physical control channel (E-DPCCH). There may be one E-DPCCH on each radio link. The dedicated physical downlink channels needed for UL transmissions may be the F-DPCH, the E-DCH relative grant channel (E-RGCH), the E-DCH absolute grant channel (E-AGCH) and the E-DCH HARQ indicator channel (E-HICH). The WTRU 102 may receive power control commands on the DPCH or on the fractional DPCH. The WTRU 102 may receive UL relative grants from the serving and non serving radio links, over the associated E-RGCH configured by higher layer signaling for each serving and non-serving radio link. The WTRU 102 may receive absolute grants for E-DCH from the serving E-DCH cell on the E-AGCH configured by higher layer signaling. The WTRU may receive HARQ ACK/NACK feedback on the E-HICH.

A cell may transmit information via a DL CC which may be linked to a UL CC based on system information (SI) received by the WTRU 102, either broadcasted on the DL CC or possibly using dedicated configuration signaling from the core network 206. For example, when broadcasted on the DL CC, the WTRU 102 may receive the uplink frequency and bandwidth of the linked UL CC as part of the system information element, (e.g., when in RRC_IDLE for LTE, or when in idle/CELL_FACH for WCDMA, i.e., when the WTRU 102 does not yet have a radio resource connection to the network).

A primary cell (PCell) may include, the cell operating on the primary frequency in which the WTRU 102 may perform the initial access to the communication system, e.g., in which it may either perform the initial connection establishment procedure, or initiate the connection re-establishment procedure, or the cell indicated as the PCell in a handover procedure. A cell may be considered a PCell as a result of a frequency being indicated as part of the radio resource connection (RRC) configuration procedure. Some functions may be only supported on the PCell. For example, the UL CC of the PCell may correspond to the CC whose physical uplink control channel resources are configured to carry all HARQ ACK/NACK feedback for a given WTRU 102.

For example, in LTE the WTRU 102 may use the PCell to derive the parameters for the security functions and for upper layer system information such as none access system (NAS) mobility information. Other functions that may be supported only on the PCell DL include system information (SI) acquisition and change monitoring procedures on the broadcast channel (BCCH), and paging. Additionally, in WCDMA the PCell may be similar to the PCell described above for LTE.

A secondary cell (SCell) may include the cell operating on a secondary frequency which may be configured once a radio resource control connection (RRC) is established and which may be used to provide additional radio resources. System information relevant for operation in the concerned SCell is typically provided using dedicated signaling when the SCell is added to the configuration of the WTRU 102. Although the parameters may have different values than those broadcasted on the downlink of the SCell using the system information (SI) signaling, this information is herein referred to as SI of the concerned SCell independently of the method used by the WTRU 102 to acquire this information.

PCell DL and PCell UL correspond to the DL CC and the UL CC of the PCell, respectively. SCell DL and SCell UL correspond to the DL CC and the UL CC of a SCell, respectively. A serving cell may be either a PCell or a SCell.

A WTRU 102 may be configured with one or more of a PCell DL, a PCell UL, a SCell DL and a SCell UL.

A WTRU 102 that uses multi-RAT access (MRA) may include any multi-mode WTRU 102 configured for operation with at least one CC with a first RAT for DL CC and UL CC, and with at least one CC of a second RAT for at least one of a DL CC or a UL CC. In addition, the WTRU 102 may operate on the different component carriers either simultaneously, or near-simultaneously in time. In embodiments, an MRA WTRU 102 may operate with two or more RATs sequentially operating on the same frequency band.

In examples, UTRAN/GERAN, UMTS/HSPA, UTRAN, UMTS, HSPA, and GPRS/UMTS/HSPA may be used interchangeably. In examples, LTE, EPS and EUTRAN may be used interchangeably.

Figure 3A:
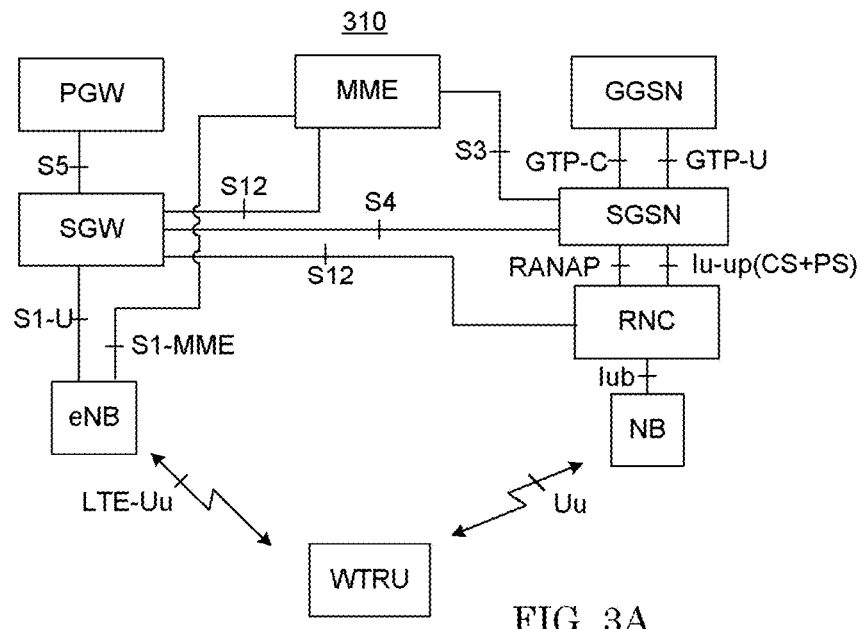

FIGS. 3A, 3B, 3C, 3D, 3E, 3F, 3G, 3H, and 3I schematically illustrates different network architectures to facilitate MRA operation according to examples of WTRUs. FIG. 3A schematically illustrates an existing architecture 310.

Figure 3B:
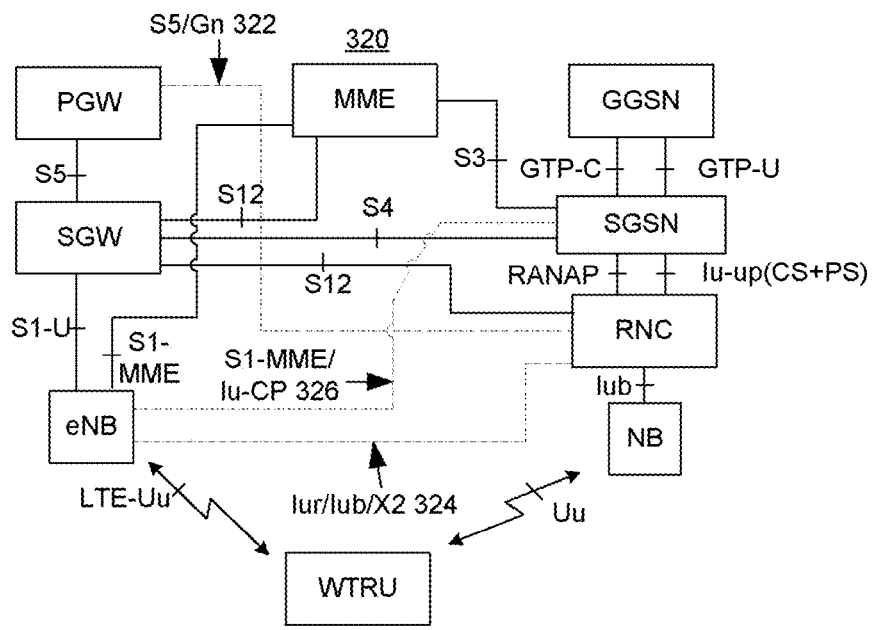

FIG. 3B schematically illustrates an example of a network architecture 320 that facilitates MRA operation according to examples of WTRUs disclosed herein. Illustrated in FIG. 3B is the architecture 310 with three new interfaces S5/Gn 322, 324 Iur/Iub/X2, and S1-MME/Iu-CP 326. S5/Gn 322 may be a new direct interface between PGW and RNC. S5/Gn 322 may be similar to the S5 interface, the S12 interface, or the Gn interface, or any combination of those interfaces to facilitate MRA operation of the WTRUs disclosed herein. S1-MME/Iu-CP 326 may be a direct interface between SGSN and the eNB. S1-MME/Iu-CP 326 may be similar to the S1-MME interface, the S1-U, the Iu-CP interface, or the Iu-UP, or any combination of those interfaces to facilitate MRA operation of the WTRUs disclosed herein. Iur/Iub/X2 324 may be an interface between RNC and eNB. Iur/Iub/X2 324 may be similar to the Iur interface, the Iub interface, or the X2 interface, or any combination of those interfaces to facilitate MRA operation of the WTRUs disclosed herein. For example, for the example WTRU with one NAS entity and two RRC entities, the PS traffic split may be done at the SGSN (or at the GGSN) where the SGSN (or GGSN) determines whether to route the data packets addressed to the WTRU through the RNC or through the eNB or through both the RNC and the eNB. As another example, for a WTRU with one NAS entity and two RRC entities, the traffic split may be done at the PGW (or at the SGW) where the PGW (or the SGW) determines to either route the data packets though the eNB, through the RNC, or through both RNC and eNB.

FIGS. 3C, 3D and 3E are different examples of FIG. 3B according to examples.

FIG. 3F is another network architecture option where there is a new direct interface between the SGW and the NodeB and a new direct interface between eNB and NodeB. For example in the scenario of a WTRU with one single NAS controlling entity and two RRC controlling entities, the traffic addressed to the UE may be split at the SGW where the SGW makes the decision to either route the data packets through the eNB or through the NodeB or through both eNB and Node B. In addition, the eNB may decide to route some or all of the data packets addressed to the UE via the Node B instead of a direct transmission to the UE over the Uu interface. Similarly, the NodeB may determine to route some or all of the data packets addressed to the UE via the eNB instead of a direct transmission to the UE over the Uu interface.

Figure 3G:
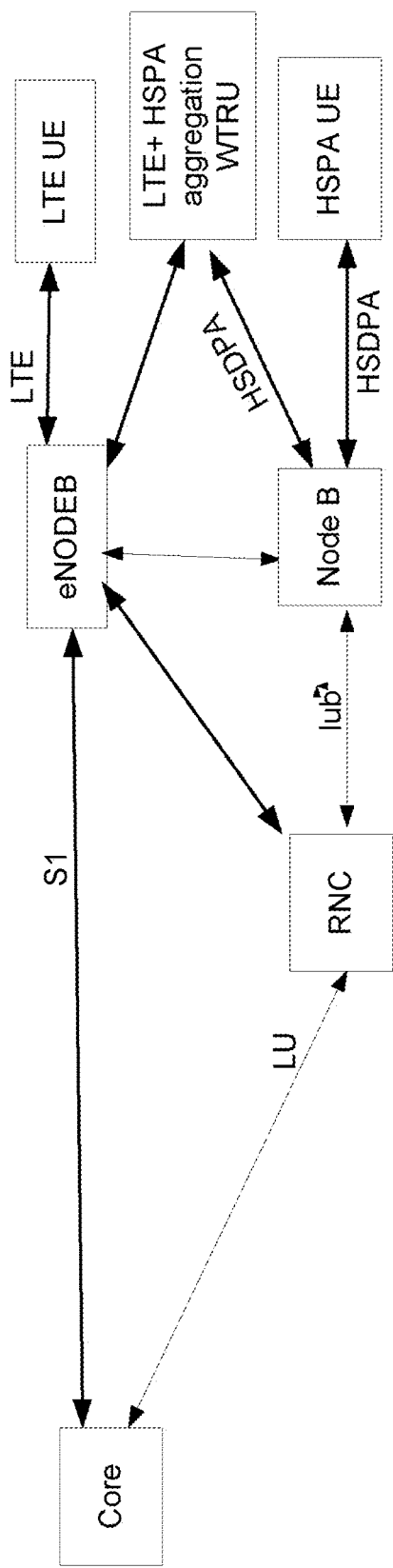
Figure 3H:
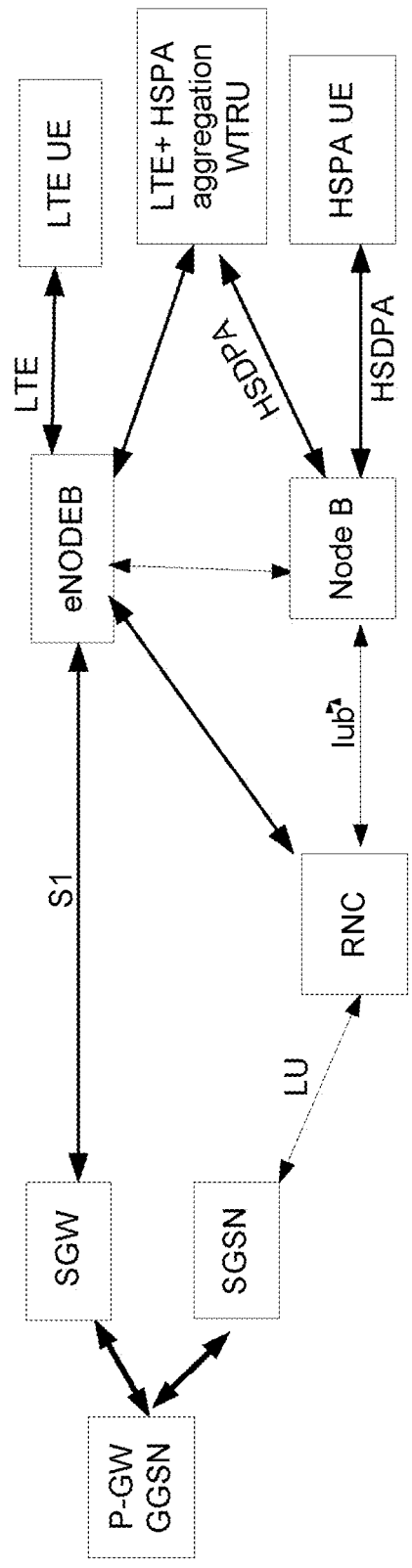
Figure 3I:
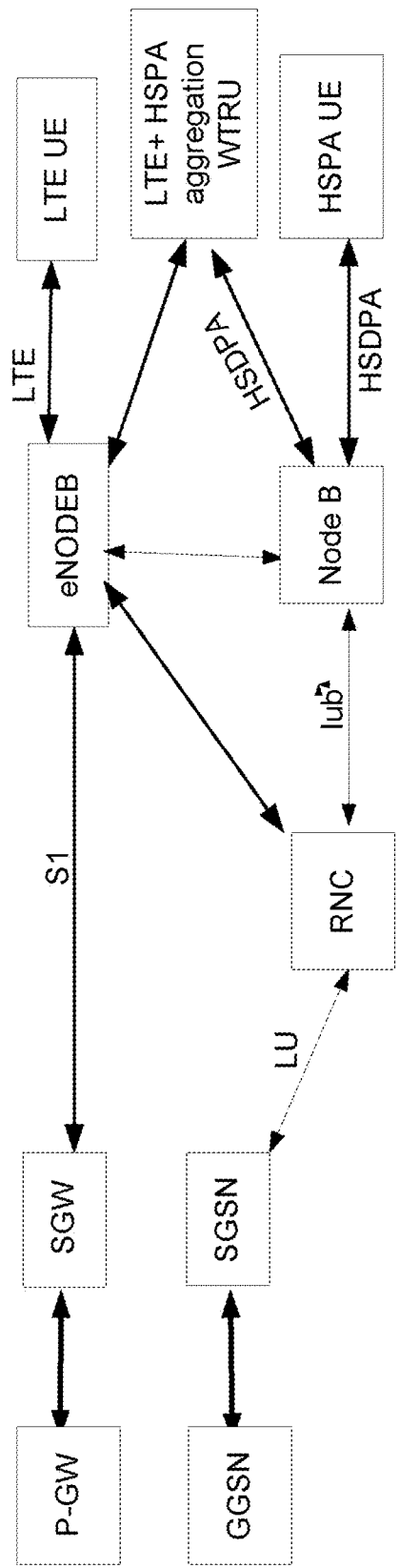

FIGS. 3G, 3H, and 3I illustrates a traffic split at the RNC toward NodeB and eNodeB or traffic aggregation from eNodeB and NodeB at the RNC for example in the scenario of a WTRU with one single NAS controlling entity and two RRC controlling entities with different core network configurations. In FIGS. 3G, 3H, and 3I the lines may indicate one or more of control paths or user data paths as well as other protocols.

Figure 4:
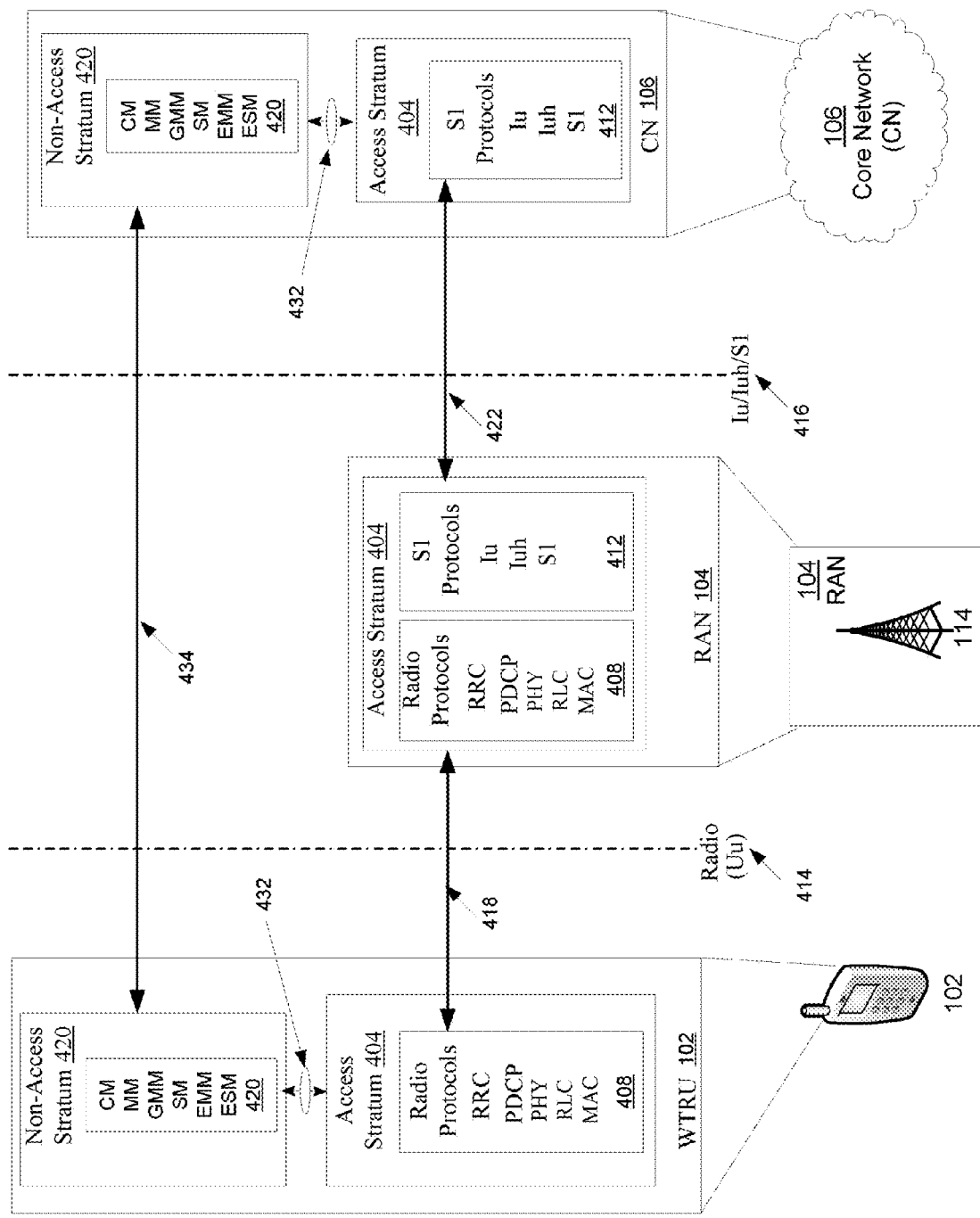
FIG. 4 schematically illustrates radio protocols, a non-access stratus (NAS) protocols, and an access stratus (AS) protocols.

FIG. 4 schematically illustrates a WTRU 102, RAN 104, and a CN 106, communication interface 414, communication interface 416, non-access stratum (NAS) protocol communication 434, radio protocol communication 418, and S1 protocol communication 422. The protocols used to communicate among the WTRU 102, RAN 104, and the CN 106 are classified into two types: access stratum (AS) protocols 404, which include radio protocols 408 and S1 protocols 412, and the NAS protocols 420. and radio protocols, a non-access stratus (NAS) protocols, and an access stratus (AS) protocols. The WTRU 102 communicates over the radio protocol communication 418 with the RAN 104 using radio protocols 408, which include RRC, PDCP, PHY, RLC, and MAC. The RAN 104 communicates with the CN 106 over the S1 protocol communication 422 using the S1 protocol, which may include Iuh, Iu, and S1.

The WTRU 102 and RAN 104 communicates with one another over the NAS protocol communication 434 using NAS protocols 420, which may include CM, MM, GMM, SM, EMM, and ESM. Communication indicator 432 indicates that the actual messages between the WTRU 102 and the CN 106 for the NAS protocols actually pass through the access stratum 404 for delivery.

The NAS 420 layer supports signaling and traffic between the CN 106 and the WTRU 102 or between the WTRU 102 and the CN 106. The NAS protocol may include the following: connection management (CM), mobility management (MM), general packet radio service (GPRS) mobility management (GMM), session management (SM), evolved packet system (EPS) mobility management (EMM), and EPS system session management (ESM), subscription management, security management and charging.

Figure 5A:
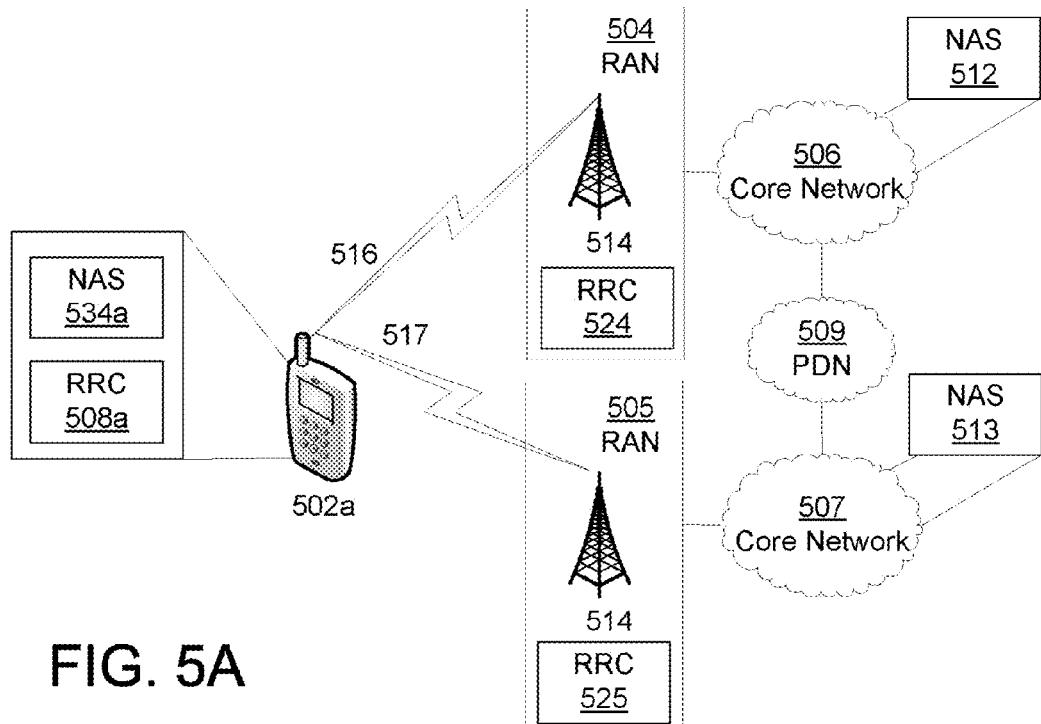
FIGS. 5A, 5B, 5C, and 5D schematically illustrate different examples of MRA WTRUs with different numbers of NAS entities and different numbers of RRC entities.

FIGS. 5A, 5B, 5C, and 5D schematically illustrate different examples of MRA WTRUs with different numbers of NAS entities and different numbers of RRC entities. FIG. 5A schematically illustrates an MRA WTRU 502a, a NAS entity 534a, an RRC 508a entity, air interfaces 516, 517, RANs 504, 505, core networks 506, 507, and PDN Network 509. The MRA WTRU 502a may be attached to the two core networks 506, 507, via the two RANs 504, 505, and the MRA WTRU 502a may be connected to PDN 509 via one or both of the core networks 506, 507. The core networks 506, 507 each have a NAS entity 512a, 513a, respectively. The NAS entities 512a, 513a may comprise more than one entity that resides in the various network components that comprise the core networks 506, 507.

A single NAS entity 534a controls the NAS layer protocols 402 between the MRA WTRU 502a and the NAS 512 entity of the core network 506 and the NAS entity 513 of the core network 507. The MRA WTRU 502a may be connected to PDN 509. The data traffic from the connection to the PDN 509 may be routed through either or both of the core networks 506, 507. The NAS entity 534a manages the protocol between the NAS entity 512 and the NAS entity 513.

The RRC 508a is an entity that controls one or more RATs which may be managed by a corresponding RRC of the RAN 504, 505. For example, RRC 508a may control the connection between MRA WTRU 502a and RRC 524 of RAN 504 and the connection between MRA WTRU 502a and RRC 525 of RAN 505. For example, the MRA WTRU 502a may use a single RRC 508a, which may manage the RRC 525 on an air interface 517 on at least one frequency where LTE is deployed and simultaneously mange an RRC 524 on an air interface 516 on at least one frequency used for a HSPA. In embodiments, the RRC 508a may control the one or more RRC connections between the MRA WTRU 502a and one or more RANs 504, 505, by using an RRC instance for each of the RANs 504, 505.

Figure 5B:
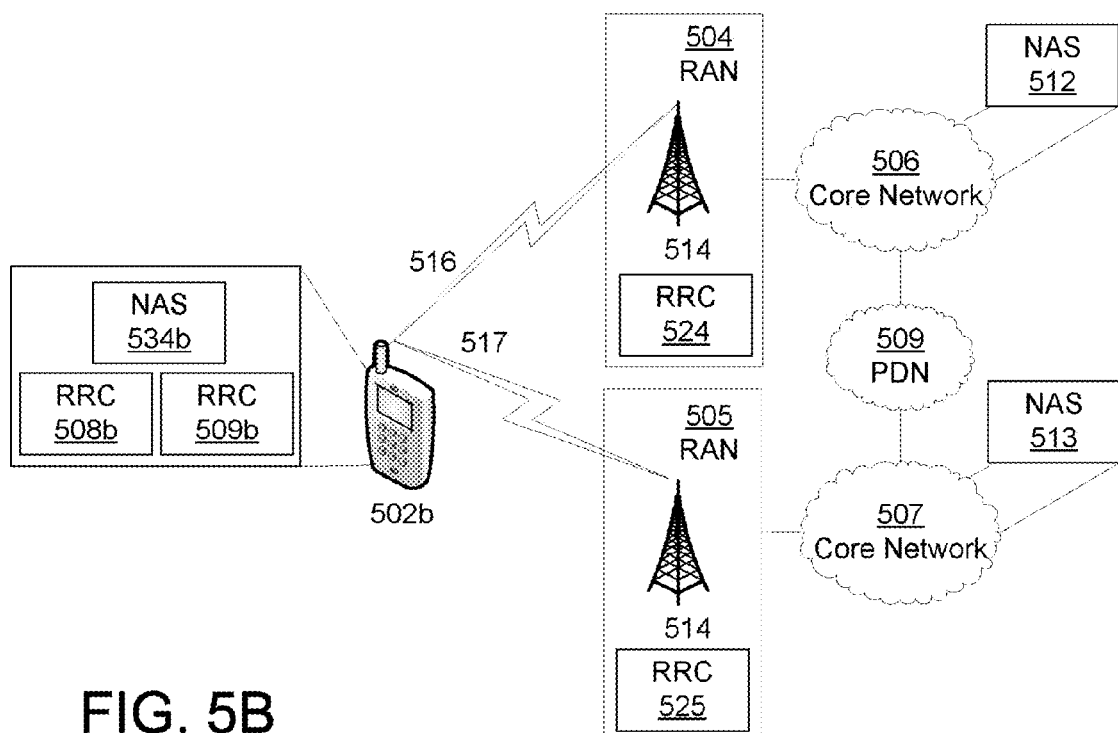

FIG. 5B schematically illustrates an MRA WTRU 502b, a NAS entity 534b, and two RRC entities 508b, 509b, air interfaces 516, 517, RANs 504, 505, core networks 506, 507, and PDN Network 509. The RRCs 508b, 509b are entities that control one or more RATs which may be managed by a corresponding RRC of the RAN 504, 505. The MRA WTRU 502b may have one RRC 508b, 509b per RAT, and a single NAS 534b for one or more core networks 506, 507. For example, RRC 508b may control the connection between MRA WTRU 502b and RRC 524 of RAN 504, where the RAT of RAN 504 may be LTE, and the RRC 509b may control the connection between MRA WTRU 502b and RRC 525 of RAN 505, where the RAT of RAN 505 may be part of a UMTS/GPRS.

Figure 5C:
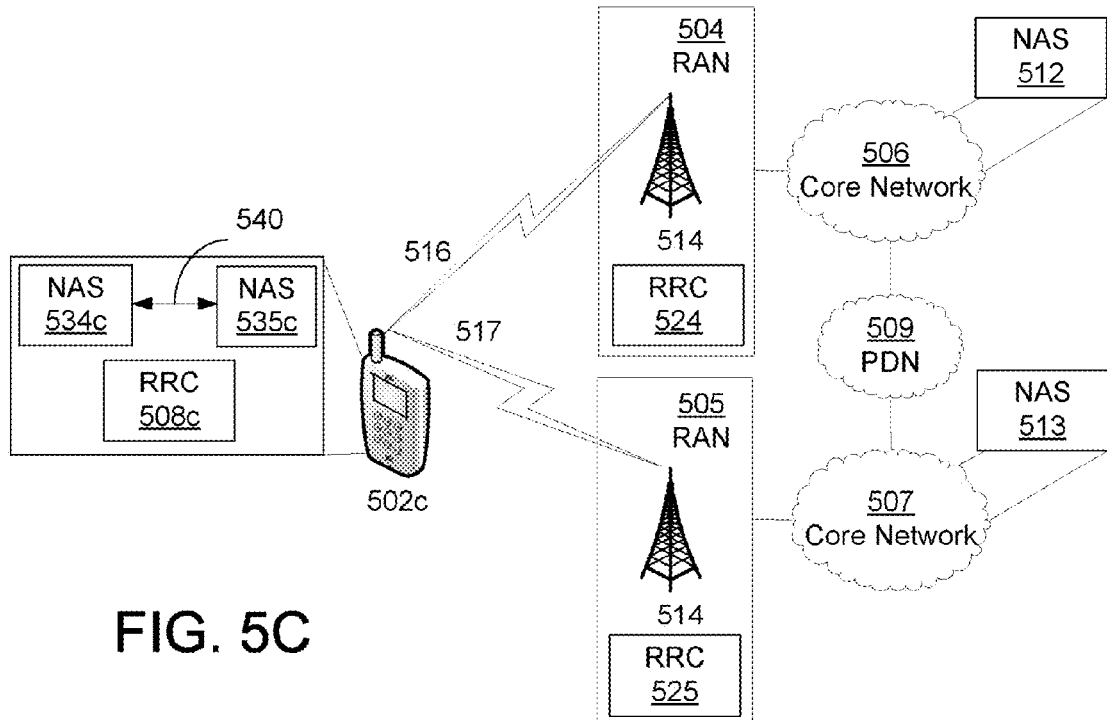

FIG. 5C schematically illustrates an MRA WTRU 502c, NAS entities 534c, 535c and RRC 508c, air interfaces 516, 517, RANs 504, 505, core networks 506, 507, and PDN Network 509. The RRC 508c is an entity that controls one or more RATs which may be managed by a corresponding RRC of the RAN 504, 505.

The NAS entities 534c, 535c are entities that control the NAS layer protocols 402. A single NAS entity 534 controls the NAS layer protocols 402 between the MRA WTRU 502c and a NAS entity of a single core network 506, 507. For example, NAS 534*c* may manage the NAS protocol between the MRA WTRU 502*c* and the NAS 512 of core network 506, and NAS 535*c* may manage the NAS protocol between the MRA WTRU 502*c* and the NAS 513 of core network 507. MRA WTRU 502*c* may have more than two NAS entities 534*c*, 535*c* with each NAS entity 534*c*, 535*c* managing a NAS layer protocol 402 between the MRA WTRU 502*c* and a core network 506, 507. The NAS entities 534*c*, 535*c* may communicate with one another via connection 540 to manage the multiple connections to different core networks 506, 507. For example, the MRA WTRU 502*c* may be connected to PDN 509. The data traffic from the connection to and from the PDN 509 may be routed through either or both of the core networks 506, 507. The NAS entity 534*c* may manage the traffic flow to and from the PDN 509 via core network 506 with NAS 512. The NAS entity 535*c* may mange the traffic flow to and from the PDN 509 via core network 507 with NAS 513. The NAS entities 534*c*, 535*c* may communicate with one another via connection 540 to coordinate the traffic to and from the PDN 509 via the two different core networks 506, 507. For example, the NAS entities 534*c*, 535*c* may interact and coordinate all or specific mobility and session management procedures. For example, the activation/modification/deactivation of an IP address/bearer by NAS entity 534*c*, which may be a LTE NAS 535*c* attached to core network 506 and communicating with NAS 512, may be signaled or communicated over connection 540 to NAS entity 535*c*, which may be part of a UMTS/GPRS system and attached to core network 507 and communicating with NAS 513. In this way, all the NAS entities 534*c*, 535*c*, may be updated with the current active IP addresses and bearers, or other mobility management parameters and security parameters.

Figure 5D:
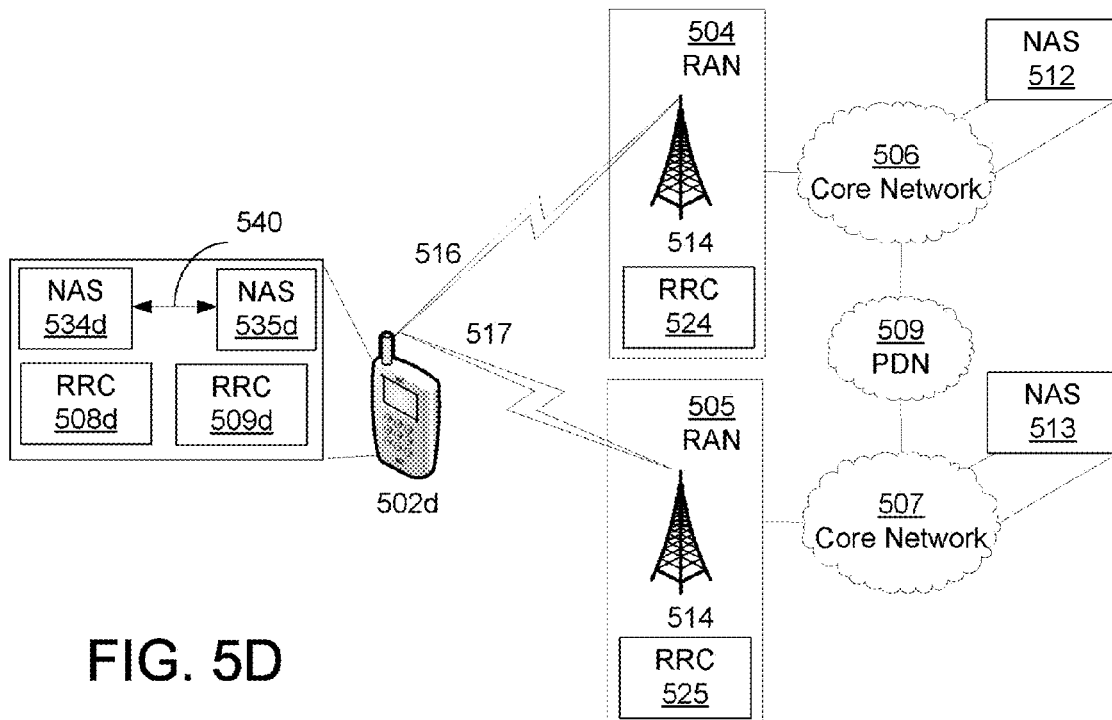

FIG. 5D schematically illustrates an MRA WTRU 502*d*, NAS entities 534*c*, 535*c* and RRC connections 508*d*, 509*d*, air interfaces 516, 517, RANs 504, 505, core networks 506, 507, and PDN Network 509. The NAS entities 534*d*, 535*d* are entities that control the NAS layer protocols 402. A single NAS entity 534 controls the NAS layer protocols 402 between the MRA WTRU 502*d* and a NAS entity of a single core network 506, 507. The RRCs 508*d*, 509*d* are entities that control one or more RATs which may be managed by a corresponding RRC 524, 525 of the RAN 504, 505.

Figure 6:
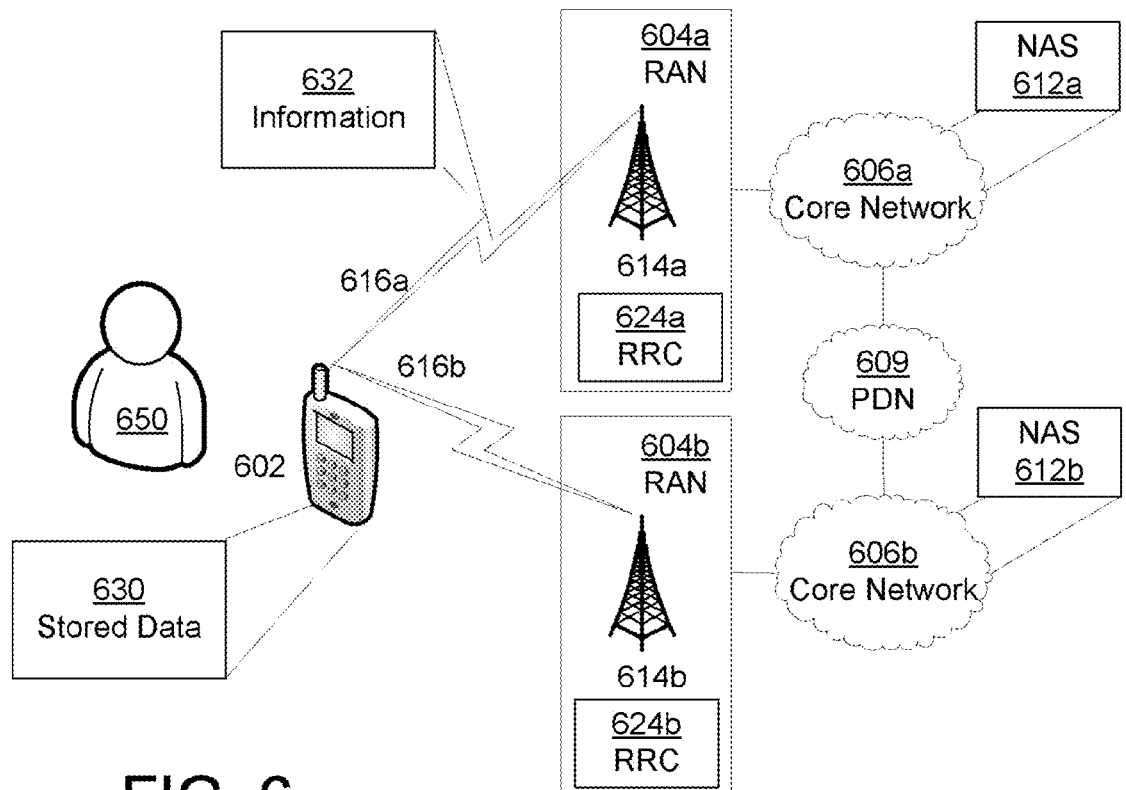
FIG. 6 schematically illustrates an MRA WTRU for determining which cell to access for MRA operation.

FIG. 6 schematically illustrates an MRA WTRU 602 for determining which cell to access for MRA operation. Illustrated in FIG. 6 is a MRA WTRU 602, a user 650, information 632, a stored data 630, RANs 604*a*, 604*b*, core networks 606*a*, 606*b*, and PDN 609. As discussed above, a cell is a geographic region that is served by one or more base stations 614*a*, 614*b*.

The MRA WTRU 602 may be configured as described above with a single NAS entity 534 or multiple NAS entities 534, with a single RRC 508 connection or multiple RRC 508 connections.

The MRA WTRU 602 may be configured to determine which cell to select for MRA operation. The MRA WTRU 602 may determine which cell to select for MRA operation prior to determining to initiate MRA operation or after determining to initiate MRA operation. The MRA WTRU 602 may determine a cell of a first RAT to establish a first connection for MRA operation, and may determine a cell of a second RAT to establish MRA operation, and may, optionally, establish a second connection for the second RAT.

The MRA WTRU 602 may use signaling received over the air interface 616 from the RAN 604, core network 606, PDN 609, or other network portion to determine which cell to select for MRA operation.

The MRA WTRU 602 may select which cell to select for MRA operation based on a public land mobile network (PLMN) that the cell is part of. For example, the MRA WTRU 602 may only select cells that are part of the PLMN that is part of a customer agreement between the user 650 and the PLMN.

The MRA WTRU 602 may select which cell to select for MRA operation based on stored data 630. The stored data 630 may be stored locally as part of the non-removable memory 130 or the removable memory 132 of the MRA WTRU 602, or the stored data 630 may be accessed by the MRA WTRU 602 over the air interface 616 where the stored data 630 is stored in a remote location such as data server (not illustrated), which may be part of the RAN 604, the core network 606, or other portion of the network.

The stored data 630 may be associated with a universal subscriber identity module (USIM). The stored data 630 may indicate which cells support MRA operation. The stored data 630 may indicate which PLMNs support MRA operation. The stored data 630 may include a list of PLMNs that support MRA operation; a list of area identities that support MRA operation; a list of closed group subscriber (CSG) identities that support MRA operation; a list of eNodeB and RNC identities or other network entities that support MRA operation; and a list of cell identities that support MRA operation. The stored data 630 may include an indication of whether or not MRA operation is supported across cells of different PLMNs, across cells of different area identifiers, across cells of different CSG identifiers, and across cells of different eNodeB and RNC identities, or across cells of other network entities.

The stored data 630 may include an indication of the RAT type and/or category of the RAT for PLMN identities, area identities, CSG identities, eNodeB/RNC identities, and cell identities. The stored data 630 may include an indication of whether or not a cell may be accessed to initiate and/or setup the MRA operation for PLMN identities, area identities, CSG identities, eNodeB/RNC identities, and cell identities. For example, the stored data 630 may include with a PLMN identity an indication of whether or not MRA operation is possible across cells of different PLMNs. As another example, the stored data 630 may include an indication of whether or not MRA support provided by a PLMN is based on a specific RAT type, and the stored data 630 may include an indication of which other PLMNs the PLMN may conduct MRA operations with. The stored data 630 may associate a RAT type for PLMN identities, area identities, CSG identities, eNodeB/RNC identities, and cell identities.

The MRA WTRU 602 may identify a cell for MRA operation by searching for cells that support MRA operation. The MRA WTRU 602 may determine whether or not a cell supports MRA operation based on information 632 received over the air interface 616, and may, optionally, use stored data 630 in the search. For example, the MRA WTRU 602 may exclude a cell based on information contained in the stored data 630 indicating that the cell does not support MRA operation. The information 632 may be System Information Broadcasting from a RAN 604 or core network 606 that indicates whether or not one or more cells support MRA operation.

The search may be part of an initial cell selection procedure the MRA WTRU 602 is performing, or part of a cell re-selection procedure. The MRA WTRU 602 may only search for cells that support MRA operation when the MRA WTRU 602 is in a particular mode such as idle. The MRA WTRU 602 may search over one or more RAT either sequentially or simultaneously. The MRA WTRU 602 may search over one or more cells either sequentially or simultaneously.

The MRA WTRU 602 may store the results of the search in stored data 630 and determine whether or not a cell supports MRA operation based on the stored search results. The MRA WTRU 602 may search for and find at least one cell that supports MRA operation for two or more RAT types before attempting to initiate MRA operation. The MRA WTRU 602 may attempt to initiate MRA operation either independently or based on a request received from over the air interface 616 from the RAN 604 or core network 606, or other network portion such as the PDN 609.

The MRA WTRU 602 may repeat the search one or more times to identify one or more cells for MRA operation. The MRA WTRU 602 may search and find one or more cells that support MRA operation and rank the found cells. For example, the cells may be ranked according to ranking data stored in the USIM configured stored in the stored data 630.

The MRA WTRU 602 may perform the search by monitoring messages from a cell, and determining whether or not the cell supports MRA operation based on the monitored messages. For example, a system information broadcasting message received from a cell may include a MRA indicator. In other examples, the MRA WTRU 602 may monitor information 632 to and from another MRA WTRU 602 and the cell to determine whether or not the cell supports MRA operation.

The MRA WTRU 602 may perform the search by attempting to initiate MRA operation on a cell and determine based on the response from the cell whether or not the cell supports MRA operation.

The MRA WTRU 602 may perform the search based on a USIM configuration in stored data 630. For example, the stored data 630 may indicate that only a finite set of cells should be searched, that the search should only be repeated a predetermined number of times, that a predetermined amount of time should occur between searches, or that the search should only be performed for a predetermined amount of time. In another example, the stored data 630 may indicate that a search should only be performed until the cells needed for the MRA operation are found.

The MRA WTRU 602 may perform the search by attaching to a core network 606 via a first cell 604a and then communicating with the communicating with network portions that indicate whether or not another cell supports MRA operation. For example, the MRA WTRU 602 may attach to NAS 612a of core network 606a via first cell 604a over a first RAT and receive an indication from NAS entity 612a which may be an MME, SGW, PGW, SGSN, or PCRF, or other core network 606a entity, that another cell with a different RAT supports MRA operation. The MRA WTRU 602 may perform the search by attaching to a NAS 612a via a cell that does not support MRA operation and requesting or receiving information 632 to aid in the search for cells that support MRA operation. The MRA WTRU 602 may perform the search by attaching to NAS 612a via a first cell over a first RAT that support MRA operation, and then search for a second cell over a second RAT that supports MRA operation. The MRA WTRU 602 may have preference for attaching via cells that support MRA operation, even though the MRA WTRU 602 does not at the time of attaching intend to initiate MRA operation.

The MRA WTRU 602 may receive information 632 from the network indicating support for MRA operation. The information 632 may be received from a broadcast signal such as System Information, BCCH, or System Information Block (SIB). The information 632 may be dedicated signaling such as from a NAS message or a RRC message. The following are some examples of dedicated signaling messages that may include the information 632: attach accept; session management messages such as bearer resource allocation, and bearer resource allocation modification procedures; and, PDN connectivity request messages such as activate default/dedicated bearer, and modify bearer context.

The information 632 may be received from a dedicated signaling message such as an RRC 624 message such as RRCConnectionReconfiguration message. The dedicated signaling message may be a request to configure to MRA operation. Other examples of messages that may include the information 632 are OMA DM, OTA, or ANDSF.

The information 632 may be received in a paging message. The information 632 may include an indication for support of MRA operation for PLMN identities, area identities, CSG identities, eNodeB/RNC identities, cell identities, for cells of the Tracking Area, for cells of the Routing Area, for cells of the Location Area, for a specific core network node such as an MME, SGSN, or MSC/VLR. For example, the information 632 may indicate that the current cell from which a system information broadcast is received by the MRA WTRU 602 supports MRA operation. Additionally, the information 632 may include an indication of whether or not MRA operation is supported for different PLMNs from the current PLMN.

The information 632 may indicate a preference or preferred order for the MRA WTRU 602 to use the cells that support MRA operation. The preference or preferred order may be indicated by the order that the cells that support MRA operation are sent to the MRA WTRU 602. The information 632 may not indicate whether or not the MRA WTRU 602 is permitted to use MRA on the cells that support MRA operation. The MRA WTRU 602 may receive an indication of whether the MRA WTRU 602 may use the cells that support MRA operation in different information 632 that may come from, for example, a network entity over a NAS protocol.

The MRA WTRU 602 may display one or more of the following to the user 650 whether MRA is supported for the currently attached cell, for the current PLMN, for neighboring cells, and whether or not MRA operation could be initiated. The MRA WTRU 602 may provide an interface to the user 650 that enables the user 650 to turn on or off the MRA WTRU 602 MRA operation. The MRA WTRU 602 may provide an interface to the user 650 that enables the user to turn on or off the MRA WTRU 602 searching for cells that support MRA operation. The MRA WTRU 602 may provide information relating to MRA operation to upper layers such as an ANDSF client that may require an indication of whether or not MRA operation is supported to apply some mobility policies.

The MRA WTRU 602 may either autonomous request MRA operation or the MRA WTRU 602 may initiate MRA operation in response to receiving a request from a network entity to enter MRA operation. For example, the MRA WTRU 602 may request a connection to an APN, which may then initiate MRA operation and request that the MRA WTRU 602 enter MRA operation. Other examples include the MRA WTRU 602 requesting a specific QoS, IP address, or service such as CS call, SMS, or SS, where in each of these cases a network entity may determine that the MRA WTRU 602 should enter MRA operation.

The MRA WTRU 602 may determine to enter MRA operation after having identified one or more cells that supports MRA operation for two or more different RATs.

The MRA WTRU 602 may determine to enter MRA operation based on any of the following: if the one or more cells are of the same PLMN; if the PLMN of the one or more cells is RAT-specific; if the CSG identity for the one or more cells indicates support for MRA; if the one or more cells are of different PLMNs, but the different PLMNs support inter PLMN support for MRA.

The MRA WTRU 602 may initiate MRA operation based data in the stored data 630, which may be a configuration. The MRA WTRU 602 may initiate MRA operation based on one or more of the following: always initiate request MRA operation; initiate MRA operation based on the MRA WTRU 602 being in MRA operation when the MRA WTRU 602 was last used; in response to a user 650 requesting MRA operation; in response to a user 650 changing a configuration of the MRA WTRU 602; and, in response to a new service being initiated in response to satisfying an action of a user 650.

The MRA WTRU 602 may initiate MRA operation by a network entity may refuse the MRA operation. For example, an HSS entity may deny MRA operation based on subscription information related to the MRA WTRU 602 in the core network 606. The MRA WTRU 602 may initiate MRA operation according to one or more of the following: in an ATTACH procedure to a first RAT indicating a second RAT; a dedicated NAS procedure such as mobility or session management; when requesting additional radio bearer resources; and, when requesting a service such as voice service and the first RAT does not support the CS Voice service.

The MRA WTRU 602 may initiate MRA operation during an RRC based request. For example, the MRA WTRU 602 may initiate a request to the network for MRA operation for a second RAT during the RRC connection establishment procedure on a first RAT. For example, upper layers of the MRA WTRU 602 may request routing of MRA-related messages such that a NAS message may include a MRA container destined to a core network entity associated with a second RAT (e.g., a DedicatedInfoNASOtherRAT information element).

For example, the MRA WTRU 602 may request the establishment of Default and Dedicated bearers which may trigger an RRC message that requests setup of MRA operation, e.g., when an Initial Context Setup/RAB and/or Setup/RAB Modify leads to a reconfiguration of the RRC connection.

The MRA WTRU 602 may transmit the request for MRA operation on an existing RRC and/or NAS connection. When the WTRU has transmitted a request for MRA, it may monitor paging in a cell of a second RAT. When paging is received from the cell of the second RAT, the MRA WTRU 602 may initiate an initial access to the second RAT for MRA operation using the radio resources of the concerned cell. In one example, the paging request from the second RAT may be for a CS voice service.

Figure 7:
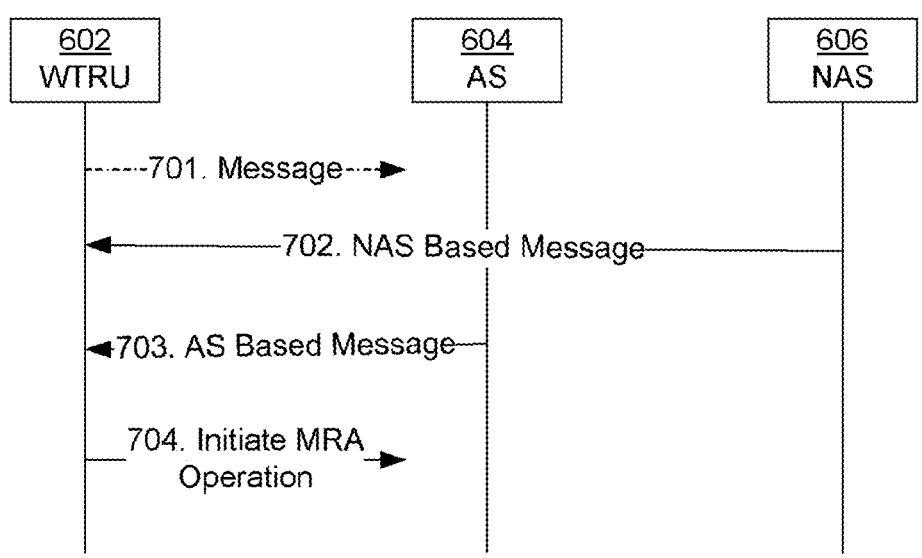
FIG. 7 schematically illustrates the WTRU receiving a message from the network to initiate MRA operation.

FIG. 7 schematically illustrates the WTRU 602 receiving a message from the network to initiate MRA operation. FIG. 7 illustrates an MRA WTRU 602, an AS 604, and a NAS 606. AS 604 represents that the message is originating from a network entity using an AS layer protocol 404 as discussed in conjunction with FIG. 4. NAS 606 represents that the message is originating from a network entity using a NAS layer protocol 406 as discussed in conjunction with FIG. 4.

The MRA WTRU 603 may initiate MRA operation 705 in response to receiving a message 702, 703 from the network to initiate MRA operation. The message 702, 703 from the network may be in response to a message 701 sent from the MRA WTRU 603 to the network. The message from the network may be either from an entity using an AS 604 layer protocol or a NAS 606 layer protocol.

For example, the MRA WTRU 603 may be attaching to a core network via a cell of a first RAT with message 701, and the network may then send a NAS based message 702 requesting that the MRA WTRU 603 initiate MRA operation on a second RAT. The NAS based message 702 may be from a core network 606 entity relating to mobility management or session management. The core network 606 entity may have received the message 701. The MRA WTRU 602 may then initiate MRA operation 704 in response to the NAS based message 702.

As another example, the MRA WTRU 603 may be in an RRC connection establishment or reconfiguration procedure for a cell of a first RAT with message 701 being part of the establishment or reconfiguration procedure, and the network may then send an AS based message 703 requesting that the MRA WTRU 603 initiate MRA operation on a second RAT. The MRA WTRU 602 may then initiate MRA operation 704 in response to the message 703.

As another example, the MRA WTRU 603 may have registered with the network and have indicated that the MRA WTRU 603 supports MRA operation. The MRA WTRU 603 may have received a configuration for MRA operation, or an indication from the network that MRA operation is supported. The network may then send an AS based message 703 that may be a paging message that indicates to the MRA WTRU 603 to enter MRA operation. The MRA WTRU 602 may then initiate MRA operation 704 in response to the message 703.

As another example, the MRA WTRU 602 may have registered with the network and have indicated that the MRA WTRU 602 supports MRA operation. The network may then send an AS based message 703 that may be a paging message that indicates to the MRA WTRU 602 to enter MRA operation. The paging message may have originated from a network entity over NAS 606 protocol. The MRA WTRU 602 may then initiate MRA operation 704 in response to the message 703.

In another example, the MRA WTRU 603 receives an AS based message 703 that may be a paging message 703 in the cell of a first RAT. When the MRA WTRU 602 receives the paging message 703, the MRA WTRU 602 may be registered with the core network 606, and may have indicated that the MRA WTRU 602 supports MRA operation. The MRA WTRU 603 may not have an active RRC connection. The MRA WTRU 602 may then initiate MRA operation 704 in the first cell in response to the message 703.

As another example, the MRA WTRU 603 receives an AS based message 703 that may be a paging message 703 in the cell of a second RAT. When the MRA WTRU 602 receives the paging message 703, the MRA WTRU 602 may be connected to at least a first RAT, or the MRA WTRU 602 may have received a paging message 703 in the first RAT, and not yet have connected to the first RAT. The MRA WTRU 602 may then initiate MRA operation 704 in the second cell in response to the message 703.

As another example, the MRA WTRU 602 may have an established RRC connection, e.g., using either a EUTRA cell or a UTRAN/GPRS cell. The message 701 may be part of the establishment of the RRC connection. The MRA WTRU 603 receives an AS based message 703 that may be initiated by a RAN entity such as eNodeB or NodeB, or RNC. The MRA WTRU 602 may then initiate MRA operation 704 in the second cell in response to the message 703.

As another example, the MRA WTRU 602 may indicate support for MRA operation, for example as part of the MRA WTRU 602 capability information exchange. The message 701 may be part of the indication of support for MRA. The MRA WTRU 603 receives an AS based message 703 that may be initiated by a RAN entity such as eNodeB or NodeB, or RNC. The MRA WTRU 602 may then initiate MRA operation 704 in the second cell in response to the message 703.

As another example, the MRA WTRU 602 may request an RRC connection and set the establishment cause to a value. For example, a new establishment cause may be defined to indicate request for MRA operation. This establishment cause may be provided by the upper layers (e.g., NAS) as a result of upper layer triggers to initiate MRA operation. The message 701 may be part of the request for an RRC connection. The MRA WTRU 603 receives an AS based message 703 that may be initiated by a RAN entity such as eNodeB or NodeB, or RNC. The MRA WTRU 602 may then initiate MRA operation 704 in the second cell in response to the message 703.

As another example, the MRA WTRU 602 may send an establishment cause as "mobile originated (MO) CS call", "mobile terminated (MT) CS call", "MO CS call with ongoing packet switched (PS)", or "MT CS call with ongoing PS." The message 701 may be part of the sending of the establishment cause. The MRA WTRU 603 receives an AS based message 703 that may be initiated by a RAN entity such as eNodeB or NodeB, or RNC. The MRA WTRU 602 may then initiate MRA operation 704 in the second cell in response to the message 703.

In examples, the MRA WTRU 602 may be camping in a second cell with a second RAT, and may receive an AS based message 703 as a paging message 703 from the second RAT. For example, the MRA WTRU 602 may be connected to a first RAT. The MRA WTRU 602 may then initiate MRA operation 704 in the second cell in response to the message 703 to initiate connection to the second RAT. In examples, the MRA WTRU 602 may receive a handover request to move to a different cell for the second RAT such as a cell that has a measurement report that indicates the connection should be good for the MRA WTRU 602.

As part of message 702 or message 703, or as a separate message, the MRA WTRU 602 may receive an RRC configuration that may include measurements (e.g., inter-RAT) related to a frequency for a second RAT on which the WTRU is not currently connected. In examples, the measurement report is associated with a prohibit timer. For example, a measurement report that is triggered by a concerned event may start the timer and, while the timer is running, the MRA WTRU 602 may not be allowed to trigger further measurement reports for the concerned event. In examples, the measurement report is associated with some rule to restrict its applicability, for example, it may trigger a measurement report only during periods for which the MRA WTRU 602 is actively scheduled. For example, a LTE eNodeB may configure inter-RAT measurements for UTRA frequencies.

In examples, as part of message 702 or message 703, the MRA WTRU 602 may receive a configuration for a procedure by which the MRA WTRU 602 may detect the proximity of a cell that supports MRA operation on a frequency of a second RAT.

In examples, the MRA WTRU 602 either before or after receiving message 702, 703 may transmit a measurement report that indicates that the radio link quality measured for a cell of a second RAT is suitable for MRA operation. In examples, the MRA WTRU 602 may only transmit the measure report if the MRA WTRU 602 has determined that the cell of a second RAT is suitable for MRA operation.

In examples, a RAN entity such as eNodeB or NodeB, or RNC, may determine that the MRA WTRU 602 should initiate MRA operation, and the RAN entity may initiate and/or request the core network association for MRA operation for example to the MME and/or to the SGSN. The core network association may be performed according to the principles described herein. So, even though an entity that may be part of the AS protocol determines the MRA WTRU 602 should initiate MRA, the message received by the MRA WTRU 602 may be a NAS based message 702.

In examples, after message 704, the MRA WTRU 602 may be configured by a NAS entity or RRC entity for MRA operation. For example, a combined attach procedure as described below may be used.

When the WTRU identifies at least one suitable EUTRAN cell that support MRA operation and possibly also at least one suitable UTRAN cell candidate. Possibly, during cell search/cell selection.

Figure 8:
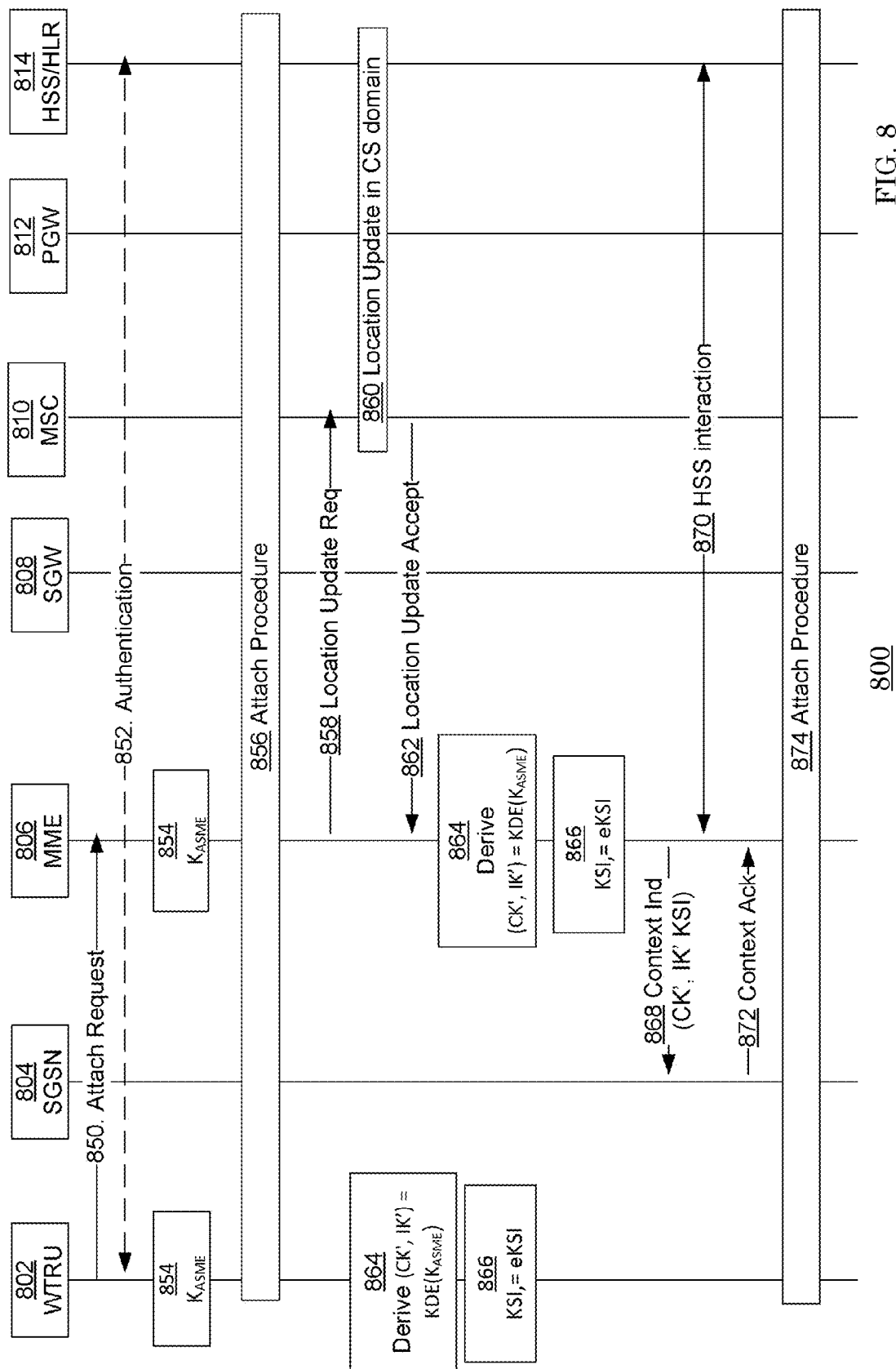
FIG. 8 is a flow diagram of an example combined attach procedure from an eUTRA (LTE/EPS) RAT.

FIG. 8 is a flow diagram of an example combined attach procedure 800 for an eUTRA (LTE) RAT. The WTRU 802 may initiate a combined attach procedure based on any of the reasons disclosed herein.

In 850 of FIG. 8, an WTRU 802 may send an attach request message to register the WTRU 802 for MRA operation on two or more RATs (for example, EUTRAN and UTRAN/GERAN) using an EUTRAN (MRA-capable) cell.

New attach types for the attach request for MRA may be added to standard attach types. The new attach types may include one or both of the following: Type 1) for combined EPS/international mobile subscriber identity (IMSI) with GPRS (i.e., register for LTE PS and for UTRAN/GERAN PS/CS), e.g., a "Combined EPS/GPRS/IMSI attach" type; or, Type 2) for combined EPS and GPRS (i.e., register for LTE PS and for UTRAN/GERAN PS), e.g., a "Combined EPS/GPRS attach" type.

A WTRU 802 may use, e.g., one of the above types in the attach request for MRA operation to indicate to the network that it can attach to both RAT networks with desired traffic type domains, e.g., using GPRS/EPS for UTRAN PS and LTE PS or using GPRS/IMSI/EPS for UTRAN PS/CS and LTE PS. See FIG. 23 for additional examples of type information elements.

In addition, if the selected cells of the different RATs are associated with different CSG and/or PLMN, e.g., the PLMN of the EUTRAN cell differs from that of the UTRAN cell, the WTRU 802 may additionally include the UTRAN PLMN identity in the attach request message.

In examples, the WTRU 802 may include in the attach request message 850 a list of PLMN identities from the other RAT, e.g., as derived from a PLMN search and possibly listing all the PLMNs the WTRU 802 can see for the other RAT. In examples, the WTRU 802 selects a PLMN for the other RAT and provides the selection to the MME. In examples, the WTRU 802 provides a priorities list of PLMNs for the other RAT and provides the prioritized list to the MME. The MME may then chose an MSC/VLR based on the prioritized list and if an attach fails, then the MME may chose another MSC/VLR based on the prioritized list to attempt to attach to.

In 852 of FIG. 8, EUTRAN and WTRU 802 authentication and key agreement procedures may be carried out among the MME, the HSS/HLR and the WTRU 802. The attaching WTRU 802 may be thoroughly authenticated.

In 854 of FIG. 8, the mutual root key KASME between the MME and the WTRU 802 may be agreed on such that subsequent security keys for NAS and AS in EUTRAN may be separately derived from the KASME at the WTRU 802 and the MME for the operations on the LTE RAT.

In 856 of FIG. 8, the WTRU 802 attaches to EUTRAN. In examples, attach procedure 856, may be performed as follows. If there are active bearer contexts in the MME 806 for the WTRU 802, which may be the case if the WTRU 802 re-attaches to the same MME 806 without having properly detached before, the MME 806 may then instruct SGW 808, PGW 812, and the PCRF (not illustrated) to delete these bearer contexts. The MME 806 may initiate a location update procedure toward the HSS 814, which may result in the deletion of the MM (mobility management) and bearer contexts from the old MME 806, if need be as well as the deletion of any active bearer of this WTRU 802 from SGW 808, PGW 812, and the PCRF. The MME 806 initiates toward the SGW 806 (serving GW), the PGW 812 (Packet Data Network GW) and the PCRF the activation of the new bearer contexts as required by the attach request message content.

The MME 806 updates the HSS 814 that the WTRU 802 is now under its service and gets the WTRU 802 subscriber information from the HSS 814. The MME 806 then creates a PDN connection for the WTRU 802 towards the SGW 808 or PGW 812 since IP address allocation happens as part of the attach procedure in LTE.

If the attach type includes an IMSI attach, the MME 806 may allocate an LAI, (e.g., by converting from the TAI included in the LTE attach request message), for the WTRU 802. The selected PLMN ID may be included in the new LAI that may be sent to the MSC/VLR. 810. If multiple PLMNs are available for the CS domain, the MME 806 may perform selection of the PLMN for CS domain based on selected PLMN information received from the WTRU 802, current TAI, old LAI and operator selection policies on preferred RAT for CS domain.

In 858 of FIG. 8, the MME 806 may then send a Location Update Request (new LAI, IMSI, MME name, Location Update Type, and an indication for MRA operation) message to the MSC/VLR 810 to prepare the MSC 810 for CS services for the attaching WTRU 802. The MSC/VLR 810 may create an association with the MME 806 by storing the name of the MME 806. The VLR 810 may check the WTRU 802 for its regional subscription or access restrictions for the LA. The MME 806 may select the MSC 810 to send the Location Update Request based on a selected PLMN, which may be received from the WTRU 802, and based on PLMN policies from the WTRU 802.

In 860 of FIG. 8, the MSC 810 may perform a location updating procedure in the CS domain with the HLR/HSS 814. In 862 of FIG. 8, the MSC/VLR 810 may then respond with a location update accept message (with the VLR 810 assigned TMSI for the WTRU 802 to operate in UTRAN CS domain, i.e., in MRA mode) to the MME 806. Optionally, the MSC/VLR 810 may accept the IMSI attach for CS service via MME 806 but not for MRA. The MSC/VLR 810 may not accept MRA based on, for example, subscription information from the HSS 814. Thus, the location update accept message 862 returned to the MME 806 indicates if the IMSI attach is for MRA or for current CS services such as CSFB or SMS-only. This information is also passed to the WTRU 802 in the attach accept message.

If rather than a location update accept message 862, the MSC/VLR 810 sends a location update rejection to the MME 806, then the MME 806 may select another MSC/VLR 810 based on a list of PLMNs for the CS domain received from the WTRU 802. There may not be another MSC/VLR 810 available. The MME 806 may then perform a location update procedure as follows.

If the rejection code is "Roaming is not allowed in the selected PLMN", the MME 806 may reselect the MSC/VLR 810 in another PLMN for CS domain, may allocate a LAI for the selected PLMN and may derive a new MSC/VLR 810 from the LAI as specified in 856 of FIG. 8 and may perform a location update procedure with the new MSC/VLR 810 again.

If the rejection code is "Access is not allowed in the selected location area", the MME 806 may allocate another LAI for the other RAT (i.e., GERAN or UTRAN), may derive the new MSC/VLR 810 from the LAI, and may perform location update with the new MSC/VLR 810 again. Alternatively, the MME 806 may choose another MSC/VLR 810 without performing any LAI allocation.

If the attach type includes a GPRS attach for UTRAN PS, and if multiple PLMNs are available for the PS domain, the MME 806 may perform selection of the PLMN for PS domain based on selected PLMN information received from the WTRU 802, current TAI, old LAI and operator selection policies on preferred RAT for PS domain. The MME 806 may perform the above selection in a corresponding way for CS registration. The MME 806 may then select or find a relevant SGSN 804 for the chosen UTRAN PLMN and send a new message, which may be called "Context Indication", and which may contain one or more of the following the MM Context, the EPS Bearer Contexts, the Serving GW signaling address, TEID, WTRU Information Change Reporting Action, CSG Information Reporting Action, WTRU Time Zone, and ISR Supported. The new message may be used to make the MR-ACCESS association between the two RATs (LTE & UTRAN) on the MME 806 and the SGSN. The SGSN 804 may save the MME ID and address for later MR-ACCESS interaction.

The MME 806 or another controlling entity may derive and pass the corresponding UTRAN security parameters to the SGSN in the new MR-ACCESS association message, "Context Indication," to achieve the one-attach-for-two-RAT goal.

In 864 of FIG. 8, the WTRU 802 and the MME 806 may derive a confidentiality key CK', and an integrity key IK' from the KASME using a one-way key derivation function KDF. The input to the KDF may be the selected NAS uplink COUNT value of the current EPS key security context or a count value specifically for MR-ACCESS. For example, the average of the sum of the downlink and uplink NAS count values rounded up or down for PO parameter may be the input to the KDF function.

In 866 of FIG. 8, the WTRU 802 and MME 806 may derive the value of KSI from the eKSI (i.e., KSI=eKSI). In another example, if there exists an old UTRAN KSI (carried to the MME 806 via the attach request 850) at the WTRU UTRAN security context prior to this attach procedure, then the KSI=old KSI+1 or the KSI=eKSI+1.

In 868 of FIG. 8, the MME 806 may transfer CK', IK' with KSI to the SGSN in, for example, the Context Indication message. The target SGSN may replace one or more of the stored parameters CK, IK, KSI, with CK', IK', and the KSI received from the MME 806. The WTRU 806 may replace one or more stored parameters CK, IK, KSI with CK', IK', KSI in both ME and USIM. STARTps may comply with the rules of 3GPP. The MME 806 may use CK' and IK' to derive the GPRS Kc using a c3 function. The MME 806 may assign the eKSI value (associated with CK' and IK') to the GPRS CKSN. The MME 806 may update the USIM and ME with the GPRS Kc and GPRS CKSN.

In 870 of FIG. 8, the MME 806 may update the HSS/HLR 814 on the status of the SGSN 804 with one or more of SGSN number, SGSN address, IMSI, IMEISV, and update type. The HSS/HLR 814 may also send to the SGSN one or both of the subscription data of the WTRU 802 and the CSG subscription data for the PLMN.

In 872 of FIG. 8, the new SGSN 804 may send a new message, which may be called a "Context Acknowledge" message, to the MME 806 indicating the GPRS attach accept to the MME 806 with UTRAN operating parameters for the WTRU 802 embedded in the context acknowledge message. This may also be part of the MRA association between the two network controlling nodes.

In 874 of FIG. 8, the method may continue with an attach procedure. For example, the attach procedure may include an accept message. In examples, the attach procedure may be performed as follows. The MME 806 sets up a context for the WTRU 802 at the eNodeB (not illustrated), which reconfigures the WTRU 802 with radio bearer for user plane data. The MME 806 coordinates connection establishment between the eNodeB and the SGW 808 for user plane bearer on the S1 interface. The WTRU 802 is then ready to send/receive IP data.

In examples, the attach procedure may be as follows. The MME 806 sends the initial context setup request message including the attached accept message to the eNodeB (not illustrated.) The eNB then reconfigures the WTRU 802 with new bearers according to the instruction from the MME 806 by sending to the WTRU 802 the RRC connection reconfiguration message along with the attach accept message. The eNodeB sends the initial context response message to the MME 806. The WTRU 802 sends a direct rransfer message to the eNodeB, which includes the attach complete message. The attach complete message may include one or more of EPS bearer identity, NAS sequence number, or NAS-MAC. The eNodeB forwards the attach complete message to the MME 806 in an uplink NAS transport message. Upon reception of both messages, the initial context response message and the attach complete message, the MME 806 triggers the modify bearer procedure toward the SGW 808 which triggers the modify bearer method toward the PGW 812. Upon the completion of the method with the reception of the modify bearer response message by the MME 806, the MME 806 notifies the HSS 814 with the APN and the PGW 812 identity if the PGW 812 selected by the MME 806 is different from the one identified by the HSS 814 to the MME 806.

The attach accept message may be updated to support the MRA attach type. For example, new fields for GPRS attach may be added as disclosed in conjunction with FIG. 24 with the contents of the attach accept message discussed in conjunction with FIG. 25.

In examples, the MME 806 may search for the MSC 810 and the SGSN 808 in another PLMN, and may use the other-PLMN or the other-LAI/RAI or other cell identities included in the attach request message 850 for this procedure.

Figure 9:
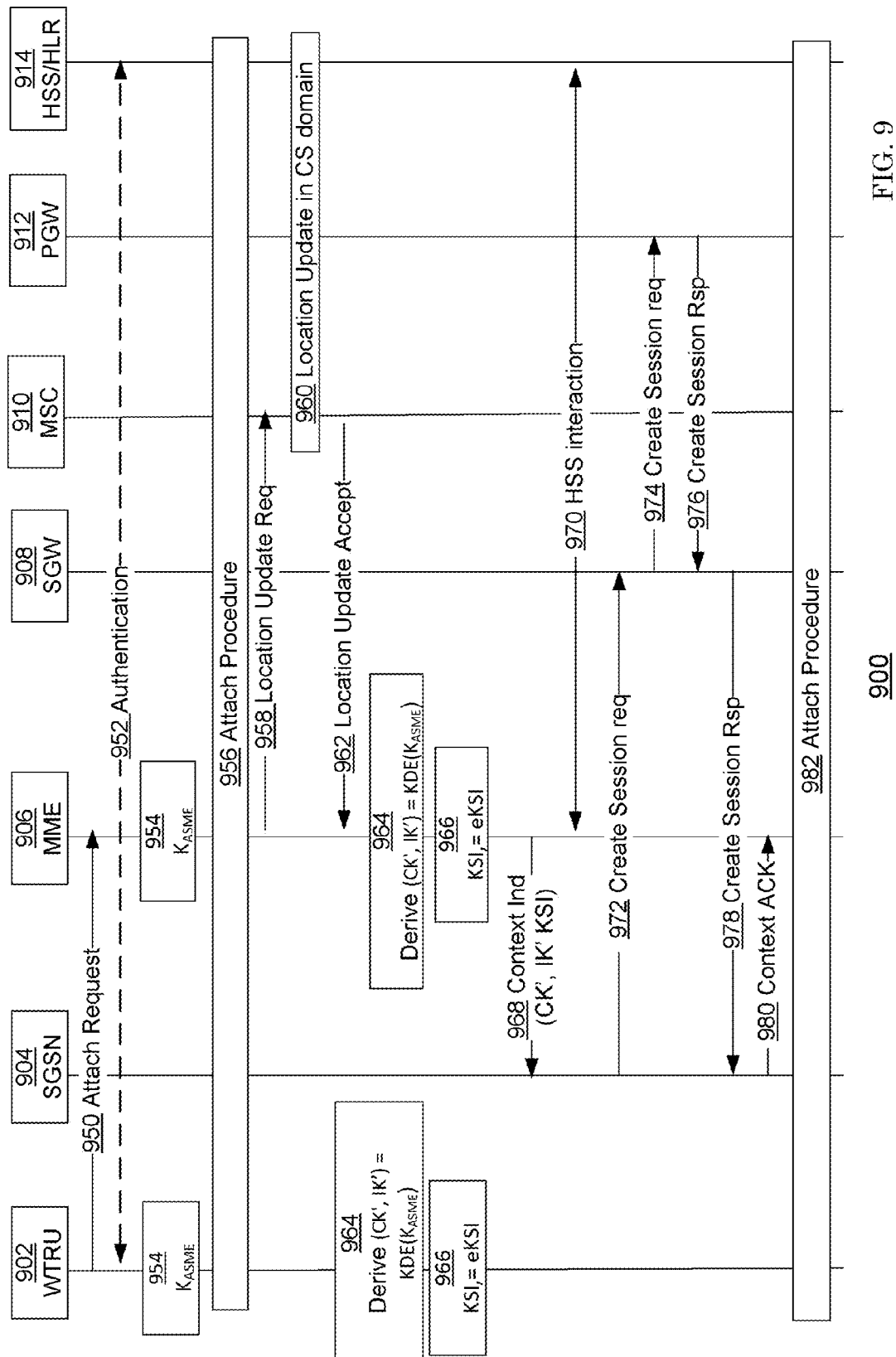
FIG. 9 is schematic illustration of a flow diagram of another example of a combined attach method from an eUTRA (LTE/EPS) RAT where a PDP context is created for the WTRU in the GPRS/UMTS domain and in the EPS domain.

FIG. 9 is schematic illustration of a flow diagram of another example of a combined attach method from an eUTRA (LTE/EPS) RAT where a PDP context is created for the WTRU in the GPRS/UMTS domain and in the EPS domain. The WTRU 902 may attach to two or more different entities of two or more different core networks with two or more different RATs. In the example of FIG. 9, both an EUTRAN and UTRAN are attached to through one attach request method in the EUTRAN network. In the example of FIG. 9, the WTRU 902 may attach to an MME 906 and a MSC/VLR 910. In examples, one or more UTRAN parameters used by the WTRU 902 are included in the attach request message 950 to the EUTRAN. The UTRAN parameters included with the attach request message 950 may include one or more of old UTRAN WTRU-IDs such as the old TMSI or old P-TMSI values, the old UTRAN security values such as the old-KSI value, the current UTRAN area-IDs, found cell-IDs and optionally the other RAT, which is UTRAN in this example, and PLMN-ID. In this example, the WTRU 902 may use one active primary PDP Context for each RAT for MRA operation.

In 950 of FIG. 9, the WTRU 902 may include an attach type with the attach request 950. For example, the attach type may be one described above such as "Combined EPS/GPRS/IMSI attach" or "combined EPS/GPRS attach". The attach request 950 may indicate that the WTRU 902 can attach to both RAT networks and indicate the desired traffic type domains. For example, the attach request 950 may indicate that GPRS/EPS should be used for the UTRAN PS, and LTE PS, respectfully, or that GPRS/IMSI/EPS should be used for UTRAN PS/CS and LTE PS, respectfully. The WTRU 902 may additionally embed an "UTRAN Activate PDP context" request message in the attach request 950. A more detailed example of such type information element definition is disclosed below.

In FIGS. 9, 952, 954, 956, 958, 960, 962, 964, and 966 may be similar to 852, 854, 856, 858, 860, 862, 864, and 866 in FIG. 8.

In FIG. 9, 968 is similar to 868 of FIG. 8. Additionally, the MME 906 may include one or more of the following in the context indication message sent to the SGSN 904: the address of the SGW 908, address of the PGW 912, and the "activate PDP context request". The WTRU 902 may embed an "activate PDP context request" in the attach request 950, when the attach type included in the attach request 950 includes a GPRS attach.

In FIG. 9, 970 may be similar to 849 of FIG. 8. Additionally, the SGSN 904 may update with HSS/HLR 914. The SGSN 904 may store the ID and address of the MME 906.

In 972, 974, 976, and 978 of FIG. 9, the SGSN 904 may activate a PDP context. In 980, the SGSN 904 may embed "attach accept and activation of a PDP context." in the context ack 980. In FIG. 9, 982 may be similar to 874 of FIG. 8. The attach accept message of 982 may include additional carrier UTRAN attach status. In 982, the WTRU 902 may receive an attach accept message from the MME 906. The attach accept message may indicate whether or not the attach procedure for MRA operation is successful. The attach accept may include GPRS registration parameters such as P-TMSI or GPRS security parameters. These parameters may be used by the WTRU 902 to access GPRS services in SGSN 904.

The LTE attach accept message may include one or more UTRAN operating parameters such as the GPRS attach accept message that could be used by the WTRU for subsequent MRA operation. The LTE attach accept message may include an information element related to UTRAN such as a "UTRAN attach status" IE. See FIG. 24 for additional examples of IEs.

In examples, the WTRU 902 may also perform an attach procedure to register with the MME 906, SGSN 904, and MSC/VLR 910. For example, the WTRU 902 can indicate in the attach type 950 that the registration is to be done with the MME 906, SGSN 904, and MSC/VLR 910. The WTRU 902 may include all the necessary parameters as described herein for the different registrations. In examples, the registrations can be carried out in different orders. The registration to the MME 906, for example, then CS registration to the MSC/VLR 910, and then PS registration to the SGSN 904.

In the examples described herein, a WTRU 902 communicates with an MME 906, which then initiates a registration towards an SGSN 904 or MSC/VLR 910. In other examples, a WTRU 902 may perform a combined registration with an MSC/VLR 910 or SGSN 904. For example, the WTRU 902 may initiate a combined attach procedure towards an SGSN 904 and indicate in the attach type that the registration is for MRA and also indicate that the attach be done with the MME 906, the MSC/VLR 910 and SGSN 904. The SGSN 904 may then initiate registration procedures towards the MME 906 and MSC/VLR 910 using the methods explained herein.

The WTRU 902 may receive an unsuccessful response for the combined attach 950. In examples, the combined attach using the eUTRA may be rejected by the by the network controlling entities. In examples, the response may consist of an attach accept message, possibly including one or more UTRAN/RAT/PLMN-specific EMM cause values. In examples, the cause value may be related to MRA operation. In examples, the response is from the UTRAN controlling entities such as SGSN 904 or MSC/VLR 910. In examples, the response is received due to the failure to create an association for MRA operation.

If the WTRU 902 receives an attach unsuccessful response, the WTRU 902 may delete the corresponding UTRAN PMM/MM context. In examples, the WTRU 902 may take one or more of the following actions, which may be based on a received EMM cause value. For EMM cause value: No Suitable Cells In Location Area, the WTRU 902 may not initiate further MRA access with a UTRAN network (such as SGSN or MSC/VLR) or a UTRAN cell in the given area. For EMM cause value GPRS services not allowed in this PLMN, the WTRU 902 may update the list of PLMN for which it determines that MRA operation is possible such that the PLMN in EMM cause may no longer be used for MRA operation. In examples, the PLMN may be removed from a list of PLMNs that support MRA. In examples, the WTRU 902 may not initiate MRA operation with UTRAN PS service in the given PLMN.

For EMM cause value CS domain not available, the WTRU 902 may not attempt a combined attach for MRA operation with CS service in the current PLMN, current location area identity, or in with the current MME 908. For EMM cause value MR-CS associate with UTRAN not supported, the WTRU 902 may retry initiation of MRA operation with a UTRAN cell in the current PLMN or in a corresponding PLMN in case of a RAT-specific PLMN. For the following EMM cause values, EPS services not allowed, PLMN not allowed, and roaming not allowed in this tracking area, the WTRU 902 may update the list of PLMNs for which it determines that MRA operation is possible such that the PLMN in the EMM cause value may no longer be used for MRA operation. In examples, the PLMN may be removed from a list of PLMNs that support MRA. In examples, the EMM cause may trigger the WTRU 902 to perform a cell search. The WTRU 902 may perform a subsequent combined attach method after receiving the failed attach response. In examples, the WTRU 902 may perform an attach method only to the UTRAN network.

For EMM cause code tracking area not allowed, the WTRU 902 may not initiate a subsequent combined attach procedure using the EUTRAN network in the same area. In examples, the WTRU 902 may subsequently initiate a combined attachment in a UTRAN network.

For any of the actions the WTRU 902 takes in response to receiving an EMM cause code, any of the following may be applicable. The WTRU 902 may only perform the action for a limited amount of time; the WTRU 902 may limit the number of retries of the action to a predetermined number; the WTRU 902 may only perform the action while the WTRU 902 remains geographically in the current area; the action may only be performed if the WTRU 902 had autonomously initiated MRA access in contrast to the network requesting the WTRU 902 initiate MRA operation; and the action may only be applicable until switching off the WTRU 902 or the UICC containing the USIM is removed.

Figure 10:
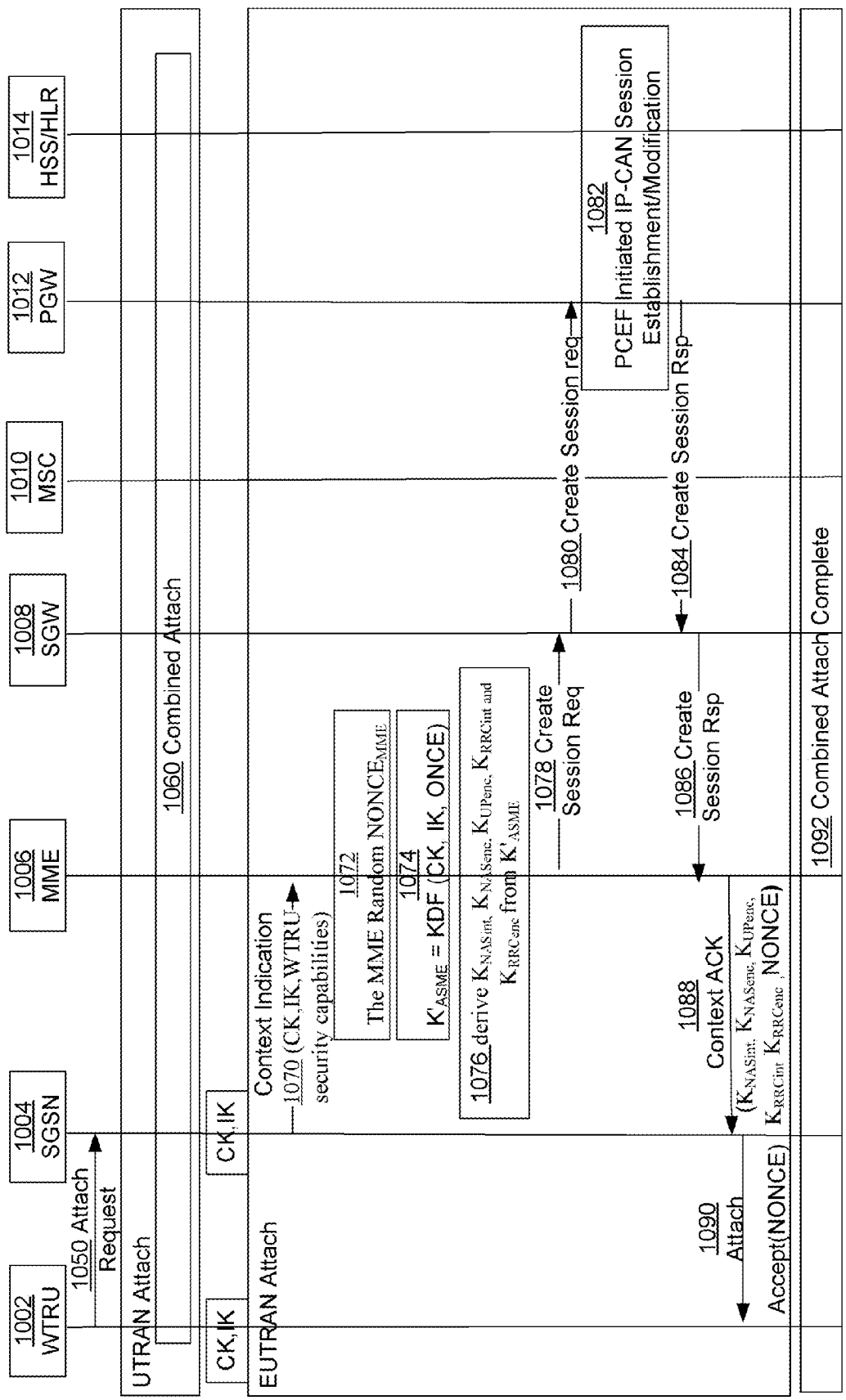
FIG. 10 is a schematic illustration of a flow diagram of an example of a combined attach procedure from a UTRA (GPRS/UMTS/HSPA) RAT where a PDP context is activated in the EPS domain but no in the GPRS/UMTS domain.

FIG. 10 is a schematic illustration of a flow diagram of an example of a combined attach procedure from a UTRA (GPRS/UMTS/HSPA) RAT where a PDP context is activated in the EPS domain but no in the GPRS/UMTS domain. In examples, the WTRU 1002 may use a single attach message 950 to register to a plurality of RATs. In examples, the WTRU 1002 may provide during the registration process some information related to the network resources that may be available for MRA operation at the location of the WTRU 1002 to the network. In examples, the WTRU 1002 may attach to both the EUTRAN and UTRAN through one attach request action in the UTRAN network. This may be accomplished by including EUTRAN parameters used by the WTRU 1002 in the attach request message. Example EUTRAN parameters that may be included in the attach request are found cell-IDs and other RAT such as EUTRAN with PLMN-ID. In the example illustrated in FIG. 10, the WTRU 1002 may use a single active primary PDP context for MRA operation.

In 1050 of FIG. 10, a WTRU 1002 may send an attach request message 1050 to register the WTRU 1002 for MRA operation on both RATs (for example, EUTRAN and UTRAN) using an UTRAN MRA-capable cell. In examples, the WTRU 1002 sends the request message 1050 after identifying at least one suitable UTRAN cell that supports MRA operation, and, in examples, at least one suitable EUTRAN cell that supports MRA operation. Attach types for the attach request 1050 for MRA may be defined. The new attach types may include one or more of the following: a combined GPRS/EPS attach type for combined GPRS/EPS, which may be register for UTRAN PS and for LTE PS; a combined GPRS/IMSI/EPS attach type for combined GPRS/IMSI with EPS, which may be register for UTRAN PS/CS and LTE PS; and a combined IMSI/EPS attach type for combined IMSI/EPS, which may be register for UTRAN CS and LTE PS.

A WTRU 1002 include one of the above attach types in the attach request 1050 for MRA operation to indicate to the network that it can attach to both RAT networks with desired traffic type domains. In examples, the WTRU 1002 may include in the UTRAN attach request message 1050 an EUTRAN PDN connectivity request to establish a default PDN connection as required for a WTRU 1050 attached to a EUTRAN network. See FIG. 28 for additional information element examples.

In 1060 of FIG. 10, the EUTRAN performs an attach procedure. In examples, in 1060 of FIG. 10, the SGSN 1004 and WTRU 1002 perform authentication between one another. The SGSN 1004 notifies HSS/HLR 1014 that the WTRU 1002 is under its service and downloads the subscriber info from the HSS/HLR 1014. The SGSN 1004 then registers the WTRU 1002 towards the MSC/VLR 1010 which also downloads the subscriber info from the HLR 1014.

In examples, in 1060 of FIG. 10, the EUTRAN attach method may be as follows. The SGSN 1004 may exchange an identification request and identification response with an old SGSN, if there is one, and, subsequently, with the WTRU 1002. The SGSN and WTRU 1002 may perform an authentication procedure. The equipment checking function may then be performed.

If there are active PDP contexts in the SGSN 1004 for the WTRU 1002, which may be the case if the WTRU 1002 is re-attaching to the same SGSN 1004 without having properly detached, then the SGSN 1004 deletes these PDP contexts by sending delete PDP context request (TEID) messages to the appropriate GGSNs. The GGSNs acknowledge with delete PDP context response (TEID) messages. The SGSN 1004 may initiate location update procedures toward the HLR 1014 and the an old MSC/VLR 1010 to clean up the old location, which may lead to the deletion of existing PDP contexts in an old SGSN and a GGSNs. The HLR 1014 may send subscription data from the HLR 1014 to the SGSN 1004 through the exchange of insert subscriber data/insert subscriber data ack messages between the HLR 1014 and the SGSN 1004. The SGSN 1004 may then initiate a location update procedure toward the MSC/VLR 1010 and the HLR 1014 to propagate the new location of the WTRU 1002 throughout the communications network.

In 1070 of FIG. 10, the SGSN 1004 may send a context indication message 1070 to forward the context of the WTRU 1002 to the MME 1006. The context indication message may include one or more of the following parameters: the IMSI, mobile equipment (ME) identity, mobile station international subscriber directory number (MSISDN), MM context, the EPS bearer context(s), the serving GW signaling address and the TEID(s), whether ISR supported, WTRU 1002 information change reporting action, CSG information reporting action, the WTRU 1002 time zone, the WTRU 1002 core network capability, and WTRU 1002 specific DRX parameters. In examples, the method occurs once the WTRU 1002 is attached in UTRAN. Continuing with 1070 of FIG. 10, the SGSN 1004 may send the CK, IK, WTRU 1002 security capabilities to MME 1006 such that security keys in UTRAN may be generated.

In 1072 of FIG. 10, the MME 1006 may generate a $NONCE_{MME}$. In 1074 of FIG. 10, the MME 1006 may calculate $K'_{ASME}$=KDF (CK, IK, NONCE). In 1074 of FIG. 10, the MME 1006 may derive $K_{NASint}$, $K_{NASenc}$, $K_{UPenc}$, $K_{RRCint}$ and $K_{RRCenc}$ from $K'_{ASME}$ and may associate those with a Key Set Identifier $KSI_{SGSN}$. In examples, the MME 1006 may select the same PGW 1012 and SGW 1008 as selected by SGSN 1004.

In 1078 of FIG. 10, the MME 1006 may send a create session request to the SGW 1008 to create a PDN bearer. In examples, the MME 1006 may select a different SGW 1008 than the SGW 1008 selected by the SGSN 1004. The MME 1006 may select a different SGW 1008 in order to perform load balancing.

In 1088 of FIG. 10, the MME 1006 may send an acknowledgement context ACK to the SGSN 1004. The MME 1006 may include the $K_{NASint}$, $K_{NASenc}$, $K_{UPenc}$, $K_{RRCint}$ and $K_{RRCenc}$, NONCE and $KSI_{SGSN}$ in the acknowledgement message. In examples, the method may be performed after a PDN bearer has been created.

In 1090 of FIG. 10, the attach accept message 1090 may include additional parameters to support MRA attachment. The additional parameters may include one or more of the following: an EUTRAN attach accept message. See FIG. 33 for additional examples of information elements.

In FIGS. 10, 1080, 1082, 1084, and 1086 may be similar to steps disclosed herein. In examples, combined attach complete 1092 of FIG. 10, may be as follows. The WTRU 1002 sends an attach complete message to the SGSN 1004, which then sends a TMSI reallocation complete message to the MSC/VLR 1010. The combined registration with both the SGSN and MSC is then complete.

In examples, combined attach complete 1092 of FIG. 10, may be performed. In examples, combined attach complete 1092 of FIG. 10, may be as follows. If P-TMSI or VLR TMSI was changed, the WTRU 1002 acknowledges the received TMSI(s) by returning an attach complete message to the SGSN 1004. If MSC/VLR TMSI was changed, the SGSN 1004 confirms the MSC/VLR TMSI re-allocation by sending a TMSI reallocation complete message to the MSC/VLR 1010.

Figure 11:
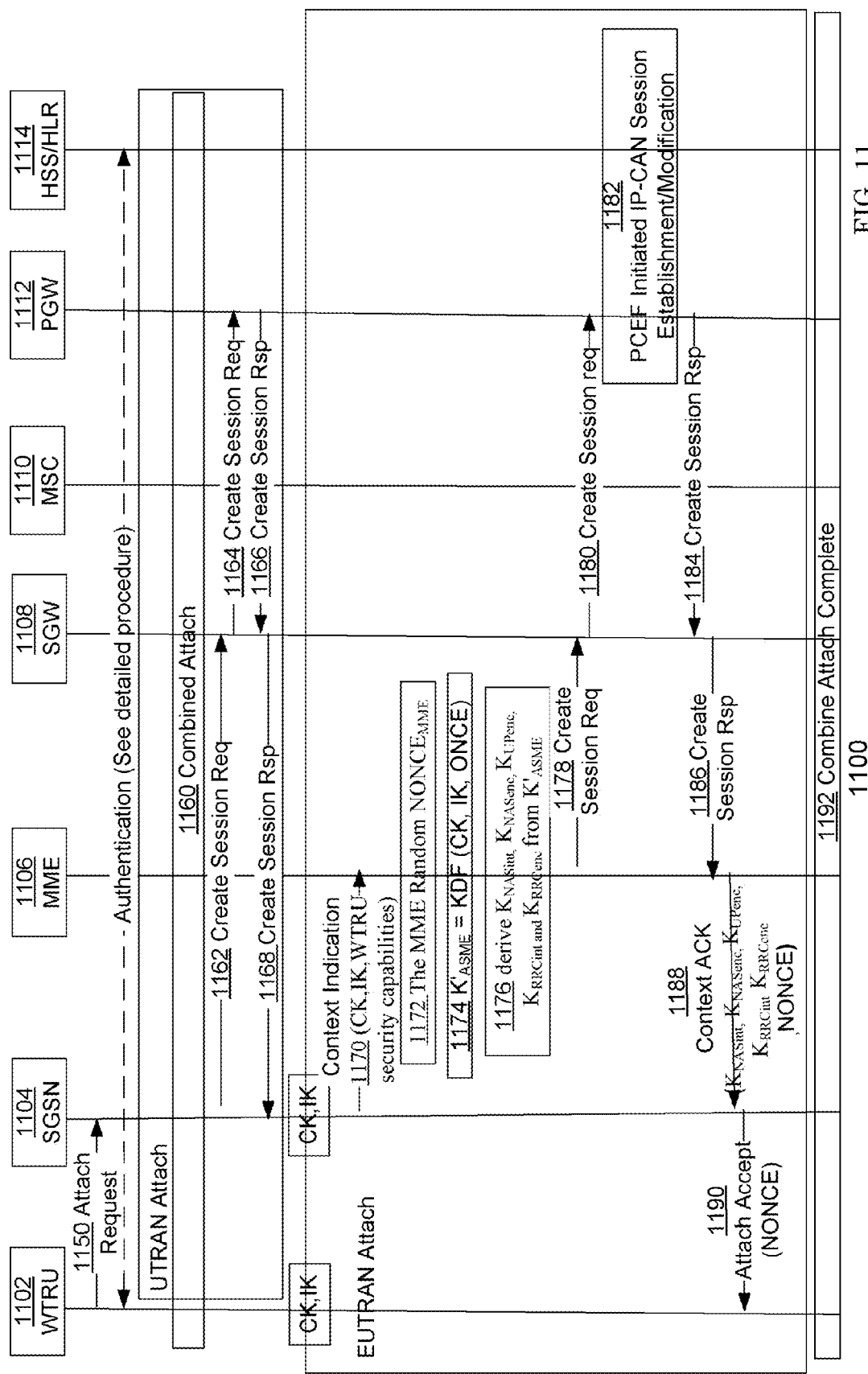
FIG. 11 is a schematic illustration of a flow diagram of another example of a combined attach procedure from a UTRA (GPRS/UMTS/HSPA) RAT where a PDP context is activated in the GPRS/UMTS/HSPA domain in addition to the PDP context activated in the EPS domain.

FIG. 11 is a schematic illustration of a flow diagram of another example of a combined attach procedure from a UTRA (GPRS/UMTS/HSPA) RAT where a PDP context is activated in the GPRS/UMTS/HSPA domain in addition to the PDP context activated in the EPS domain. The WTRU 1102 may attach to both the UTRAN and EUTRAN through one attach request message 1150 action in the UTRAN network. The attach request message 1150 may include one or more of the following EUTRAN parameters: found cell-IDs and the other RAT such as EUTRAN and the PLMN-ID. In this example, the WTRU 1102 may use one active PDP context for each RAT for MRA operation.

In 1150 of FIG. 11, the WTRU 1002 may include a UTRAN activate PDP context request and an EUTRAN PDN connectivity request in the combined attach request 1150.

In examples, combined attach 1160 of FIG. 11, may be performed. In examples, combined attach 1160 of FIG. 11, may be as follows. The SGSN 1104 obtains the WTRU 1102 context from an old SGSN (not illustrated), if there is an old SGSN. The SGSN 1104 notifies the HSS/HLR 1114 that the WTRU 1102 is under its service and downloads the subscriber information of the WTRU 1102 from the HSS/HLR 1114. The SGSN 1104 then registers the WTRU 1102 towards the MSC/VLR 1110 which also downloads the subscriber information of the WTRU 1102 from the HSS/HLR 1114.

In examples, combined attach 1160 of FIG. 11, may be as follows. If there are active PDP contexts in the SGSN 1104 for the WTRU 1102, which may be the case if the WTRU 1102 re-attaches to the same SGSN 1104 without having properly detached before, then the SGSN 1104 deletes these PDP contexts by sending delete PDP context request (TEID) messages to the appropriate GGSNs (not illustrated). The GGSNs acknowledges with delete PDP context response (TEID) messages. The SGSN 1104 may initiate location update procedures toward the HLR 1114 and the old MSC/VLR to clean up an old location. This may result in the deletion of any existing PDP context in old SGSNs and GGSNs, and the sending of the subscription data from the HLR 1114 to the SGSN 1104 through the exchange of insert subscriber data/insert subscriber data ack messages between the HLR 1114 and the SGSN 1104. The SGSN 1104 may then initiate a location update procedure toward the MSC/VLR 1110 and the HLR 1114 in order to propagate the new location of the WTRU 1102 throughout the network.

In 1162 of FIG. 11, the SGSN 1104 may select an SGW 1108 and a PGW 1112. In examples, if a UTRAN activate PDP context request is embedded in the attach request 1150, the SGSN 1104 may initiate the PDP context activation procedure by sending a create session request to SGW 1108.

In 1170 of FIG. 11, the SGSN 1104 may initiate the attach procedure on EUTRAN after the PDP context is activated. In 1190 of FIG. 11, the SGSN 1104 may include an EUTRAN attach accept and an UTRAN activate PDP context accept in the attach accept message 1190. See FIG. 35 for additional examples of information elements.

The WTRU 1102 may receive an attach accept message from the UTRA network. In examples, the attach accept message 1190 indicates whether or not the attach procedure for MRA operation is successful. In examples, the attach accept message 1190 may include one or more EUTRAN operating parameter that are part of an EPS attach accept message. The WTRU 1102 may use the one or more EUTRAN operating parameters for subsequent MRA operation. In examples, the operating parameters may include an information element related to EUTRAN such as an EUTRAN attach status IE.

The WTRU 1102 may receive an unsuccessful response rather than an attach accept 1190 in response to the combined attach request 1150. In examples, the combined attach request 1150 using the UTRA may be rejected by the network controlling entities. In examples, the response may consist of an attach accept message that may include one or more EUTRAN/RAT/PLMN-specific MM cause values. In examples, the cause value may be related to MRA operation. In examples, the response is from the EUTRAN controlling entities. In examples, the response is received due to the failure to create an association for MRA operation.

If the WTRU 1102 receives an unsuccessful response, the WTRU 1102 may delete the corresponding EUTRAN EMM context. In examples, the WTRU 1102 may take at least one of the following actions in response to receiving an unsuccessful response.

If a received MM cause value is EPS services not allowed, PLMN not allowed, or Roaming not allowed in this tracking area, the WTRU 1102 may update the list of PLMN for which it determines that MRA operation is possible such that the WTRU 1102 may remove or change the status of the PLMN referenced in the MM cause. In another example, the WTRU 1102 may not initiate MRA operation with the EUTRAN PS service in the PLMN referenced in the MM cause.

If a received MM cause value is no suitable cell in tracking area, the WTRU 1102 may not initiate further MRA access with the EUTRAN network or a EUTRAN cell in the given area.

If a received MM cause value is GPRS services not allowed, or PLMN not allowed, or roaming not allowed in this location area, the WTRU 1102 may update the list of PLMN for which it determines that MRA operation is possible such that the PLMN referenced in the MM cause value may no longer be used for MRA operation. In example, the referenced PLMN may be removed from the list. In examples, the WTRU 1102 may trigger a cell search procedure to attempt to locate a new cell for MRA operation. In examples, the WTRU 1102 may perform a subsequent combined attach procedure such that the WTRU 1102 may initiate the subsequent combined attach procedure either using the EUTRAN network or the UTRAN network as its primary RAT for MRA operation. Alternatively, the WTRU 1102 may trigger an attachment only in the UTRAN network.

If a received MM cause value is location area not allowed, or no suitable cell in location area, the WTRU 1102 may not initiate a subsequent combined attach procedure using the UTRAN network in the same area. In examples, the WTRU 1102 may subsequently initiate a combined attachment in an EUTRAN network.

For any of the actions the WTRU 1102 takes in response to receiving an MM cause code, any of the following may be applicable. The WTRU 1102 may only perform the action for a limited amount of time; the WTRU 1102 may limit the number of retries of the action to a predetermined number; the WTRU 1102 may only perform the action while the WTRU 1102 remains geographically in the current area; the action may only be performed if the WTRU 1102 had autonomously initiated MRA access in contrast to the network requesting the WTRU 1102 initiate MRA operation; and the action may only be applicable until switching off the WTRU 1102 or the UICC containing the USIM is removed.

In examples, the WTRU 1102 may perform one attach procedure per RAT to enable MRA operation according to at least one of the methods described herein.

Combined attach complete 1192 of FIG. 11 may be any of the examples disclosed in conjunction with 1092 of FIG. 10.

Figure 12:
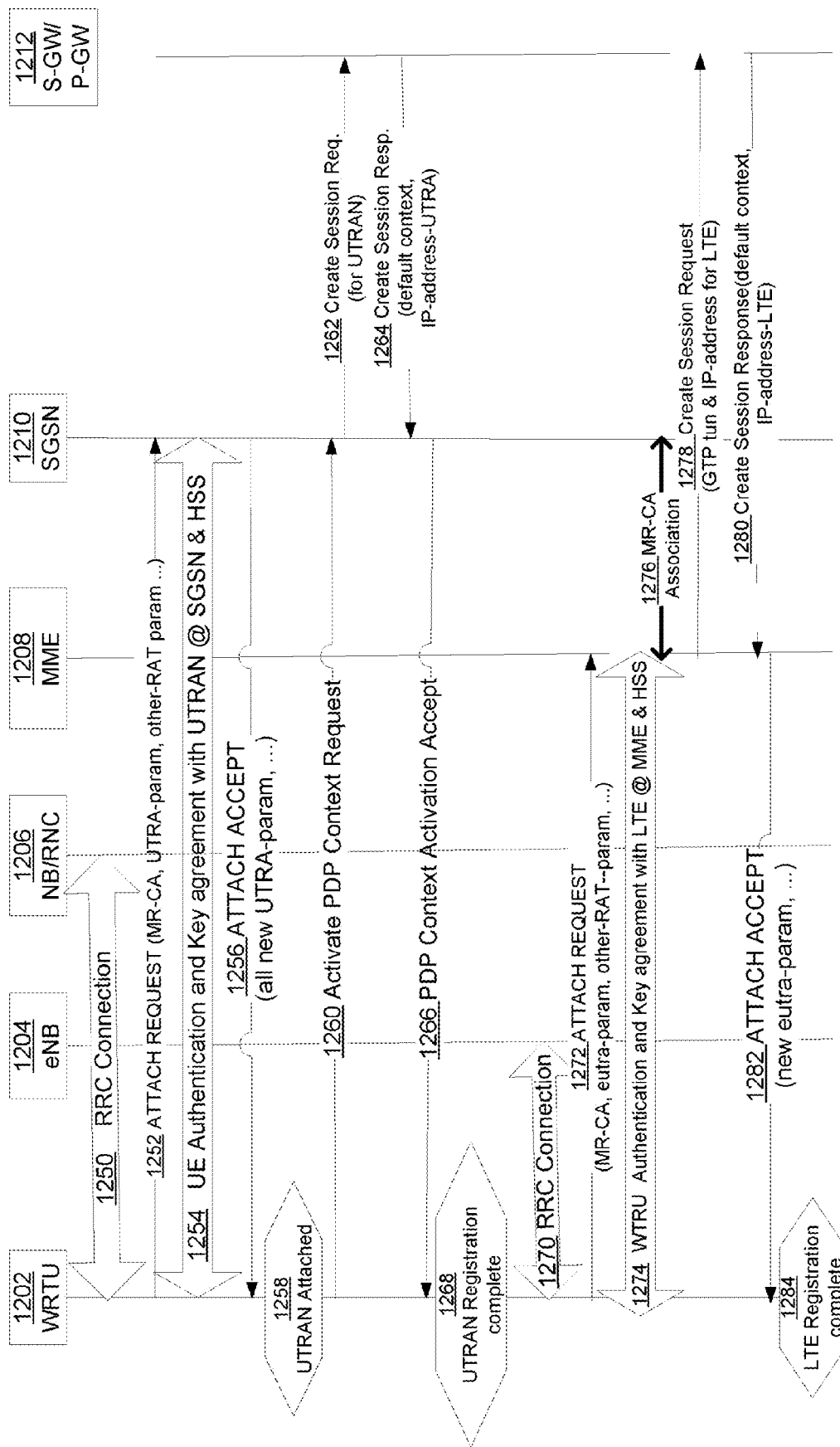
FIG. 12 is a schematic illustration of a flow diagram of an example RAT-specific attach procedure for a sequential operation.

FIG. 12 is a schematic illustration of a flow diagram of an example RAT-specific attach procedure for a sequential operation.

The WTRU 1202 may perform one attach procedure for each RAT. The first attach procedure may be initiated using the radio resources of the RAT as selected by the WTRU 1202. The WTRU 1202 may initiate MRA operation. The attach procedures may occur sequentially, or concurrently. The WTRU 1202 may also indicate in the subsequent attach that it is already attached to a specific domain and may provide some parameters that can be used for identifying the core network nodes. For example, the WTRU 1202 may include GUMMEI or P-TMSI. Note that NAS entities in the core network may also coordinate mobility and session management procedures, messages, and parameters.

For example, the WTRU 1202 may perform the RAT-specific attach method 1200 of FIG. 12 according to at least one of the following.

The WTRU 1202 may perform 1250, 1252, 1254 and 1256 of FIG. 12 for the primary attach according to a regular attach. The WTRU 1202 may include additional attach type for MRA operation in the attach request 1250. For example, the attach type may be one described in conjunction with other figures. In addition, the WTRU 1202 may include additional parameters in the attach request message 1250 such as WTRU information, cell information, or area information applicable to another RAT. The information may be acquired from a cell search, especially the area-ID information of the other RAT, which may be needed for the CN switching node to identify its counter-part on the other RAT. This information may be used by the network controlling nodes to locate the network controlling node of another concerned RAT, for example, an 1210 locating the corresponding MME 1208 for the purpose of establishing a core network association.

In 1260, 1262, 1264 and 1266 of FIG. 12, the UTRAN/3G CN context allocation procedure may perform the WTRU 1202 specific context and IP-address allocation with respect to the gateway node S-GW/P-GW 1212 where the cross-RAT data re-routing is anchored. In embodiments, the trigger for the default context allocation may originate from the network controlling node such as SGSN 1210. For example, a GMM message request PDP context activation message may be received by the WTRU 1202 and the WTRU 1202 may still respond.

In 1268 of FIG. 12, the following may be completed: the UTRAN/3G CN registration via attach, WTRU 1202 authentication and key agreement, WTRU 1202 default context/IP-address allocation. The WTRU 1202 may either remain in the connected mode or the WTRU 1202 may go to idle mode.

In 1272 of FIG. 12, the WTRU 1202 may indicate in the attach request message 1272 that it requests to remain in the connected mode. In embodiments, the WTRU 1202 may request, for example, in the attach request message, that the allocated IP-address is preserved for MRA operation, which may extend the time limit of the 3G WTRU IP-address preservation.

The WTRU 1202 may perform a secondary attach procedure. In embodiments, only when the primary attach is complete, which may include the completion of the related WTRU 1202 context/IP-address allocation process. The secondary attach may be according to 1272, 1274, 1276, 1278, 1280 and 1282 of FIG. 12, and may use the resources of the corresponding RAT. The attach request message 1272 of the second attach may include information related to the first attach accept method. For example, the second attach may include one or more of: the new WTRU 1202 IDs, IP-address, the area-IDs, and security parameters.

In 1274 of FIG. 12, in examples, the WTRU 1202 authentication for the secondary attach, for example with HSS, may be omitted. In examples, the security keys may be generated in other steps (not illustrated) and brought back to the WTRU 1202 via the attach accept message in 1256 of FIG. 12. This may be the case when the attach methods of the respective RATs are performed sequentially.

In 1276 of FIG. 12, the secondary RAT controlling node, which is the MME 1208 in this example, may initiate contact with the primary RAT controlling node, which is the SGSN 1210 in this example, to establish the MRA association. In examples, the SGSN 1210 may respond by sending a message back to the MME 1208.

The core network association for MRA operation may enable both controlling nodes, for example MME 1208 and SGSN 1210, to subsequently receive, process, determine and send commands based on information received regarding WTRU 1202 radio measurement changes, WTRU 1202 serving cell changes, routing changes, tracking area changes, or network load changes. The controlling nodes may monitor the information regarding the WTRU 1202 to coordinate MRA operation for a given WTRU 1202.

Figure 13:
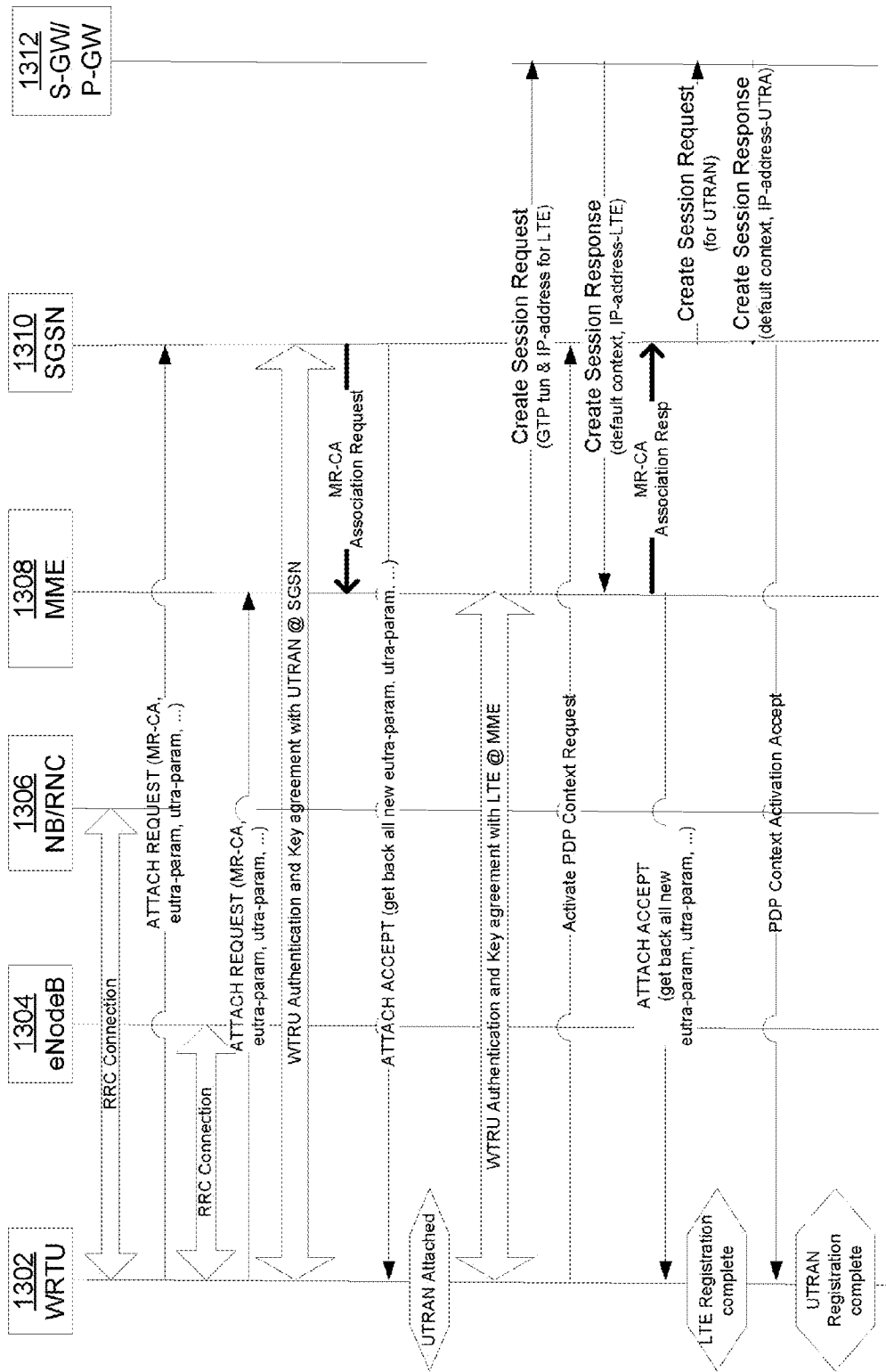
FIG. 13 is a schematic illustration of a flow diagram of an example RAT-specific concurrent attach method.

FIG. 13 is a schematic illustration of a flow diagram of an example RAT-specific concurrent attach method 1300. The WTRU 1302 may perform the RAT-specific attach procedure according to at least one of the following.

The attach procedure on each RAT may be performed independently as shown in FIG. 13. The WTRU 1302 may perform the authentication and security key agreement procedures with the corresponding RAT part of the CN independently. The WTRU 1302 may perform an additional PDP context activation with the UTRAN/3G CN to acquire and preserve a default IP-address. In another example, the SGSN 1310 may trigger the default context allocation by sending a GMM message request PDP context activation to the WTRU 1302 after it sends the attach accept message to the WTRU 1302.

In the attach methods performed on each RAT for MRA operation, the following additional information may be included in the attach request to facilitate a simultaneous attach. The attach-type to indicate the nature of the attach for MRA operation. The information about the other RAT, which may have been acquired from a cell search. The information may include the area-ID information of the other RAT, which is needed for the CN switching node to identify its counter-part on the other RAT. The CN switching node may be MME 1308 or SGSN 1310 for the WTRU 1302.

A network may support MRA operation. MRA operation may include a WTRU 1302 may being attached to a plurality of RATs and, in examples, across different PLMNs. In this case, the network may establish some form of association to support and coordinate MRA operation for a given WTRU 1302. For example, the controlling entities in the core network may perform at least one of the following.

The CN controlling node may initiate an MRA association. For example, the CN may use a sequence of request and response transactions to another CN controlling node. In examples, the CN may initiate the sequence based on receiving an attach request from a WTRU 1302, or in examples, based on receiving a request from a RAN controlling node such as eNodeB for EUTRA, or NodeB or RNC for UTRA. In examples, the controlling node may be identified and located using information included in the WTRU's 1302 initial attach request. For example, the initial attach request may include one or more of the PLMN-ID, RAI, LAI, and Cell-IDs of the cell in the other participating PLMN.

Each CN controlling node 1308, 1310 may receive registration messages. For example, a CN controlling node 1308, 1310 may receive routing, tracking, or location area updates, and may receive measurement reports from the WTRU 1302 over radio resources of the controlling node's corresponding RAT. In examples, a WTRU 1302 may include the area change or measurement results of a plurality of RATs in its normal area update or measurement report for the RAN CN of the RAT.

The CN controlling node 1308, 1310 may determine that MRA operation requires a change in routing path for a WTRU 1302. The CN controlling node 1308, 1310 may command the attached WTRU 1302 via its own RAT command path to establish the NAS context and, in examples, also NAS connection, as well as possibly the RAN connection for the rerouted traffic.

In examples, the CN controlling node 1308, 1310 may page a WTRU 1302 in idle mode using the path of its corresponding RAT, independently of another CN controlling 1308, 1310 node of a different RAT.

In examples, the CN controlling nodes 1308, 1310 agree on which node is responsible for paging the WTRU 1302 for a specific service. This may also be based on network policies or configurations. For example, during a combined registration with an MME 1308 and MSC/VLR, based on at least one of operator policies, network configurations, MME 1308 and MSC/VLR interactions, or messaging.

In examples, each CN controlling node 1308, 1310 initiates the necessary paging procedure. In examples, the MSC/VLR pages the WTRU 1302 in CS domain with appropriate changes. For example, a new CN domain indicator to indicate the CN being PS/MME or PS/SGSN, if there is a PS service available. The availability of the PS service may be based on the MME 1308-MSC/VLR or SGSN 1310-MSC/VLR interactions over the interface that connects the nodes together. In examples, the MME 1308 may page the WTRU 1302 in LTE for CS services. In examples, the SGSN 1310 may page the WTRU 1302 in UTRAN for CS services.

The corresponding CN controlling node 1308, 1310 may determine that either a single PDP context may be used, or in examples, that each PDP contexts will have similar parameter value such as the same IP address for a given WTRU 1302.

In addition, probing actions between involved network controlling nodes 1308, 1310 may be defined for the core network association methods.

A first node, for example SGSN 1310, may send an MRA association request message to the CN switching node, for example MME 1308, on the other RAT. In examples, if the first node receives an attach request from the WTRU 1302, which may be in examples a successfully authenticated WTRU 1302. The CN switching node may be determined based on the WTRU 1302 location area-ID in the attach request. The first node may then be in a pending state, e.g., MRA association pending state.

A second node, for example MME 1308, may receive an attach request or a registration message such as tracking, routing, or location area update, from the same WTRU 1302, which may be a successfully authenticated WTRU 1302. In examples, the second node may have already received the MRA association request from the first node, for example in case of concurrent attach method. In examples, the second node may then send an MRA association response message back to the first node. In examples, the second node may, for example for sequential attach methods, send an MRA association request message to the other node.

Both the first and second nodes may enter a ready state, for example an MRA association ready state. In examples, both nodes enter the ready state when both nodes have received an MRA association response.

The MRA association response may include at least one of a transaction identifier, a timestamp, and/or an indication of accept/reject.

The MRA pending state may be bounded in time, upon which expiration the state of the controlling node may be reverted and the association may be deemed unsuccessful.

In examples, core network association may be triggered as a result of an attach or tracking, routing, location or area update method. The WTRU 1302 may indicate which network to associate with, WTRU 1302 capability, and USIM subscription. The CN may ensure that same PDP context is configured. In examples, if association is not ready or established, then combined attach or separate attach may be rejected.

A RAN controlling node, for example eNodeB for EUTRA or NodeB or RNC for UTRA may initiate a request to the WTRU 1302 to terminate MRA operation over the connected RAT. The RAN controlling node may initiate the request to terminate in response to a handover failure for another RAT for a given WTRU 1302. In examples, a RAN controlling node for example eNodeB for EUTRA or NodeB or RNC for UTRA may initiate a request to the core network to terminate MRA operation and to remove the MRA association in response to a handover failure for one or more RATs for a given WTRU 1302. Termination of MRA operation may include initiation of a detach procedure for the concerned RATs.

In one method, the WTRU 1302 may implicitly detach, if it has not had communication with the MME 1308 for a predetermined period of time. In examples, the WTRU 1302 may change the state of each of the concerned RATs to deregistered, detached, or an equivalent state. In examples, the WTRU 1302 may remove any dedicated configuration for the radio resources of each concerned RAT when it deregisters or detaches.

Figure 14:
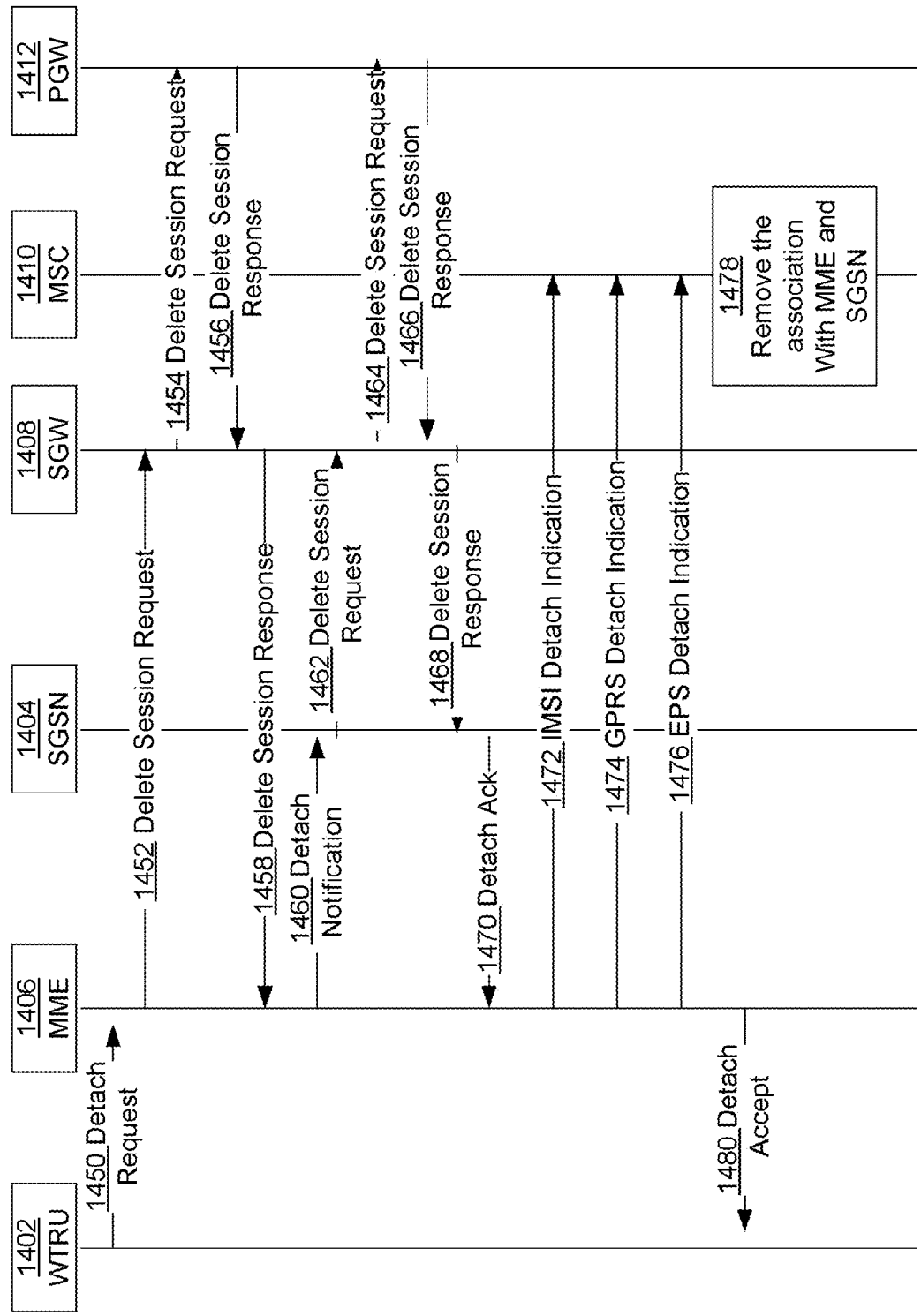
FIG. 14 is a schematic illustration of a flow diagram of an example WTRU-initiated combined detach method from an eUTRA (LTE/EPS) RAT.

FIG. 14 is a schematic illustration of a flow diagram of an example WTRU-initiated combined detach method 1400 from an eUTRA (LTE/EPS) RAT. In 1450 of FIG. 14, the WTRU 1402 may initiate a detach method to detach itself from the core network by transmitting a combined detach request, for example, on the connection of the LTE RAT. In 1452 of FIG. 14, the WTRU 1402 may send a NAS message such as a detach request to the MME 1406, the detach request 1452 may include one or more parameters such as GUTI and switch off. In examples, the detach request 1452 may include a detach type indication such as combined EPS/GPRS detach or combined EPS/GPRS/IMSI detach. The type indication may depend on the WTRU's 1402 condition and type of attach to the network. See FIG. 26 for additional examples of IEs.

The MME 1408 may deactivate the active EPS bearers in the SGW 1408 for the WTRU 1402. In examples, the MME 1408 may deactivate the active EPS by, for example, the MME 1408 sending a delete session request (LBI) per PDN connection to the SGW 1408 and PGW 1412, and the PGW 1412 responding by sending a delete session response as shown in 1452, 1454, 1456 and 1458 of FIG. 14.

In 1460 of FIG. 14, the MME 1406 may send a detach notification, for example a cause message to the associated SGSN 1404. In examples, the detach notification may be sent to the SGSN 1404 when the WTRU 1402 is also GPRS attached and for which the detach request included a detach type that is either combined EPS/GPRS detach or combined EPS/GPRS/IMSI detach. In examples, the cause may indicate a complete detach from the network.

In 1462 of FIG. 14, the SGSN 1404 may deactivate the active PDP contexts in the SGW 1408 for the concerned WTRU 1402. In examples, this is achieved by, for example, the SGSN 1404 sending a delete session request (LBI) per PDN connection to the SGW 1408 and PGW 1412, and receiving a delete session response in 1468 of FIG. 14.

In 1470 of FIG. 14, the SGSN 1404 may send a detach acknowledge message to the MME 1408. In 1472, the MME 1406 may send an IMSI Detach Indication (IMSI) message 1472 to the MSC/VLR 1410, if, for example, the concerned WTRU 1402 was IMSI attached and the detach type indicates combined EPS/IMSI or combined EPS/GPRS/IMSI.

In 1474 of FIG. 14, the MME 1406 may send a GPRS detach indication message to the MSC/VLR 1410 to disassociate the MSC 1410 with the SGSN 1404, if, for example, the WTRU 1402 was GPRS attached and the detach type indicates combined EPS/GPRS or combined EPS/GPRS/IMSI.

In 1476 of FIG. 14, the MME 1406 may send an EPS detach indication message 1476 to the MSC/VLR 1410 to disassociate the MSC 1410 with the MME 1406, if, for example, the WTRU 1402 was EPS attached and the detach type indicates combined EPS/GPRS" or EPS only or EPS/GPRS/IMSI.

In 1480 of FIG. 14, the WTRU 1402 may receive a detach accept message from the MME 1406. In examples, the WTRU 1402 may change the state of each of the concerned RAT to a deregistered, detached, or equivalent state. The order of 1472, 1474, and 1476 of FIG. 14 may vary.

Figure 15:
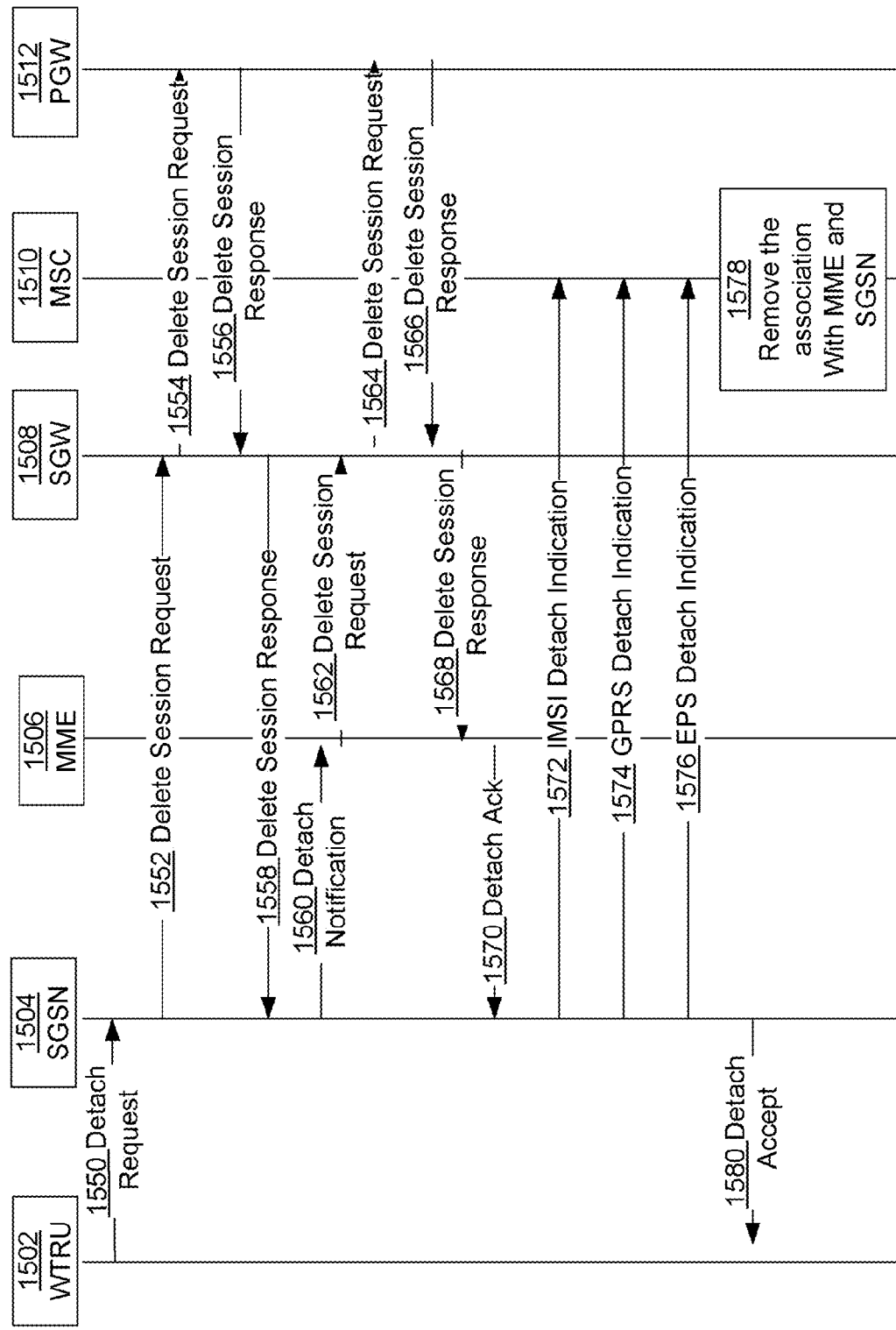
FIG. 15 is schematic illustration of a flow diagram of an example WTRU initiated combined detach method a UTRA (GPRS/UMTS/HSPA) RAT.

FIG. 15 is schematic illustration of a flow diagram of an example WTRU initiated combined detach method a UTRA (GPRS/UMTS/HSPA) RAT.

The WTRU 1502 may initiate a detach method to detach itself from the core network by transmitting a combined detach request 1550, for example, on the connection of the UTRAN RAT.

In 1550 of FIG. 15, the WTRU 1502 may send a NAS message such as a detach request 1550 to the SGSN 1504. The detach request 1550 may include one or more parameters such as detach type, P-TMSI, P-TMSI Signature, or Switch Off. In examples, the detach request 1550 may include a detach type indication such as combined EPS/

GPRS detach, combined EPS/IMSI detach, or combined EPS/GPRS/IMSI detach. The type indication may depend on the WTRU's 1502 condition and type of attach to the network. A more detailed example of such IE is disclosed below.

In 1552 of FIG. 15, the SGSN 1504 may deactivate the active PDP contexts in the GGSNs regarding the WTRU 1502, in the case of GPRS detach. This may be achieved by the SGSN 1504 sending a delete session request 1552 to the SGW 1508 and PGW 1512, and the PGW 1512 sending a delete session response as shown in 1552, 1554, 1556 and 1558 of FIG. 15.

In 1560 of FIG. 15, the SGSN 1504 may send a detach notification cause message to the associated MME 1506 for a WTRU 1502 that is also EPS attached, if, for example, the detach type is either EPS/GPRS detach, EPS/GPRS/IMSI, or EPS/IMSI detach. In examples, the cause may indicate complete detach for the WTRU 1502.

In 1562 of FIG. 15, the MME may deactivate the active PDP contexts in the MME 1506 for the concerned WTRU 1502. In examples, this may be achieved by the MME 1506 sending a delete session request (LBI) 1562 per PDN connection to the SGW 1508 and PGW 1512, and receiving a delete session response in 1568 of FIG. 15.

In 1570 of FIG. 15, the MME 1506 may send a detach acknowledge message to the SGSN 1504.

In 1572 of FIG. 15, the SGSN 1504 or MME 1506 may send an IMSI detach indication (IMSI) message 1572 to the MSC/VLR 1510, if, for example, WTRU 1502 was IMSI attached. In examples, the SGSN 1504 sends IMSI detach indication message 1572 if the detach type indicates combined EPS/IMSI, combined EPS/GPRS/IMSI, or EPS/IMSI.

In 1574 of FIG. 15, the SGSN 1504 or MME 1506 may send a GPRS detach indication message 1574 to the MSC/VLR 1510 to disassociate MSC 1510 with the SGSN 1504, if, for example, the WTRU 1502 was GPRS attached. In examples, the SGSN 1504 may send a GPRS detach indication message 1574 if the detach type indicates combined EPS/GPRS or combined EPS/GPRS/IMSI.

In 1576 of FIG. 15, the SGSN 1504 or MME 1506 may send an EPS detach indication (IMSI) message 1576 to the MSC/VLR 1510 to disassociate MSC 1510 with MME 1506, if WTRU 1502 was EPS attached. The SGSN 1504 or MME 1506 may send an EPS detach indication (IMSI) message 1576 to the MSC/VLR 1510, if the detach type indicates combined EPS/GPRS or EPS/GPRS or EPS/IMSI.

In 1580 of FIG. 15, the SGSN 1504 may send a detach accept message to the WTRU 1502. If the switch off bit in the detach type IE indicates that detach is not due to a switch off situation, the SGSN 1504 may send a detach accept to the WTRU 1502. Note that the methods described in conjunction with FIG. 15 may also apply to the case when the WTRU 1502 is performing a detach procedure for both a PS CN entity and also the MSC/VLR 1510.

Thus, a WTRU 1502 may initiate a combined detach method 1500 to the MME 1506 that also indicates a detach request to the MSC/VLR 1510. The MME 1506 may forward the detach indication to the MSC/VLR 1510. The WTRU 1506 may also perform a combined detach method with an MSC/VLR 1510 and the WTRU 1502 indicates detachment for both CS and PS-MME or PS-SGSN. The MSC/VLR 1510 then forwards the detach indication towards the appropriate CN node, for example MME 1506 or SGSN 1504.

In some examples, the MME 1506 may implicitly detach a WTRU 1502 if it has not had communication with the WTRU 1502 for a predetermined period of time. In examples, the MME 1506 initiates a procedure to remove the association for MRA operation in the core network for the concerned RATs. In another method, the WTRU 1502 may receive a combined detach request from the MME 1506, for example on the connection of the LTE RAT to detach itself from the core network.

Figure 16:
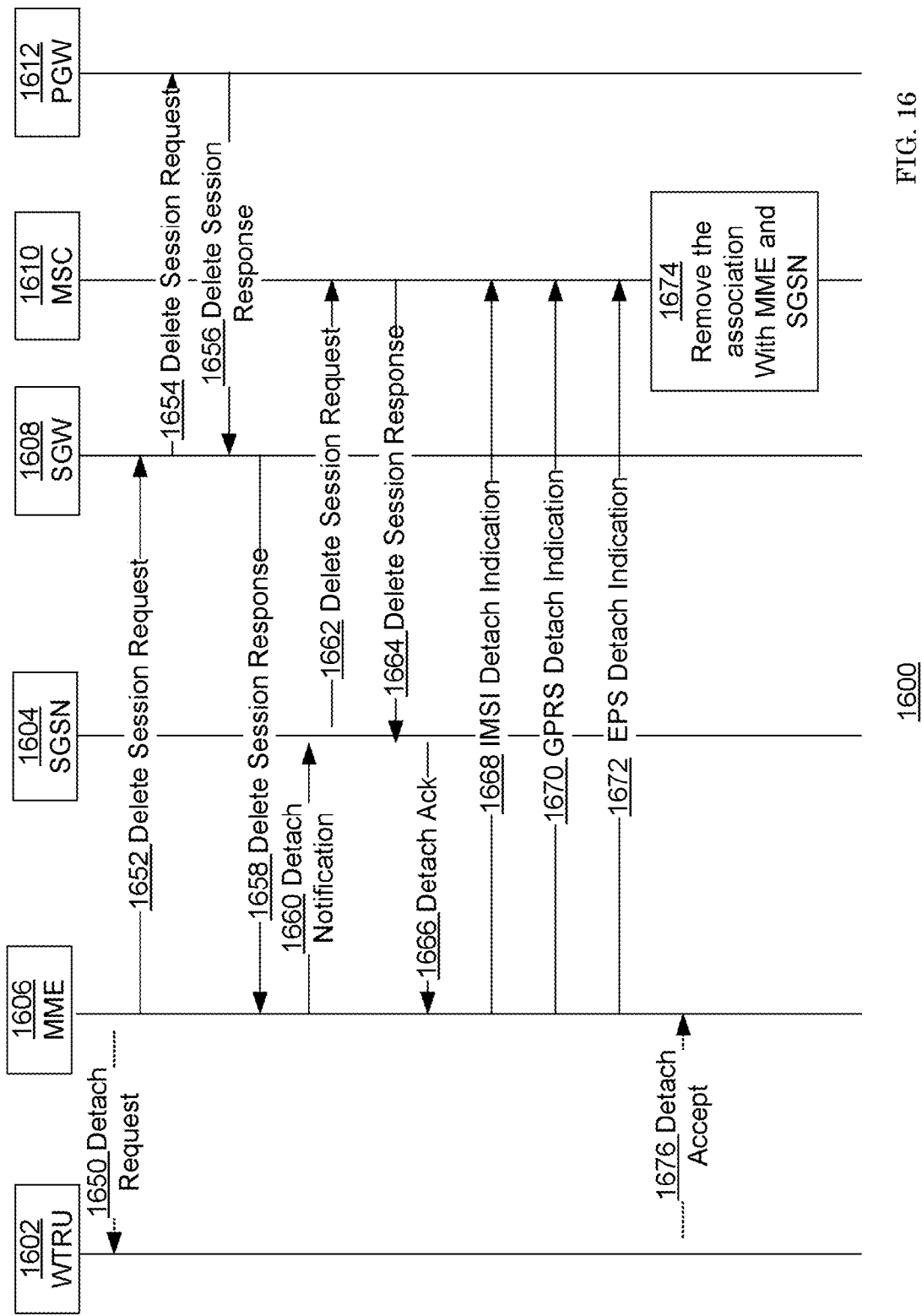
FIG. 16 is a schematic illustration of a flow diagram of an example mobility management entity (MME)-initiated combined detach method.

FIG. 16 is a schematic illustration of a flow diagram of an example mobility management entity (MME 1606)-initiated combined detach method 1600.

In 1650, the WTRU 1602 may receive a detach request message 1650 from the MME 1606. In examples, the WTRU 1602 may receive a detach request message 1650 from the MME 1606 only if the WTRU 1602 is in ECM-CONNECTED state. The MME 1506 initiated detach method may be either explicit, for example by O&M intervention, or implicit. In 1652-1672 may be similar as for the WTRU 1602 initiated detach procedure described in conjunction with FIGS. 14 and 15. In 1676, the WTRU 1602 may send a detach accept message 1676 to the MME 1606 any time after 1650. In examples, the WTRU 1602 may send a detach accept message 1676 to the MME 1606 only if the WTRU 1602 receives the detach request message 1650 from the MME 1606 in 1650. The eNodeB (not illustrated) may forward this NAS message to the MME 1606. The WTRU 1602 may change the state of each of the RATs associated with MRA to a deregistered, detached or equivalent state.

In examples, the WTRU 1602 may remain attached to UTRAN (or MSC/VLR if it was registered with it) when the MME 1606 sends the detach request 1650 to the WTRU 1602. The MME 1606 may also indicate to the SGSN 1604 and/or MSC/VLR 1610 that it is detaching the WTRU 1602 by, for example, sending the detach notification message 1660 to the SGSN and/or MSC/VLR. After the detach method 1600 is completed, the WTRU 1602 may power up the RAT for which it is still attached (if this is not already powered up) and continue its operation on that RAT.

In some examples, the SGSN 1604 may implicitly detach a WTRU 1602 if it has not had communication with the WTRU for a predetermined period of time. In examples, the SGSN 1604 initiates a method to remove the association for MRA operation in the core network for the MRA associated RATs. In some examples, the WTRU 1602 may receive a combined detach request from the SGSN 1604, for example on the connection of the UTRAN RAT to detach itself from the core network.

Figure 17:
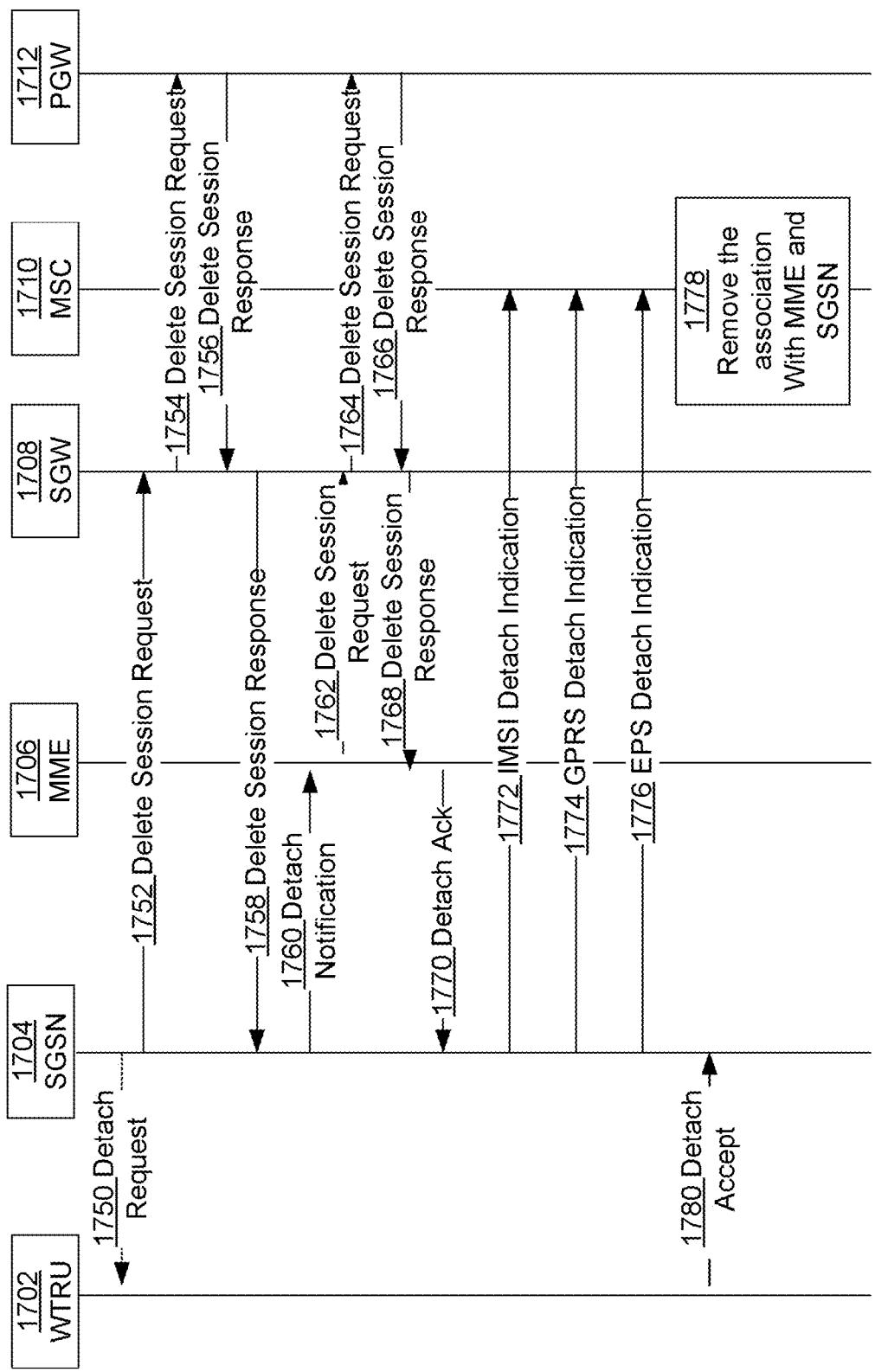
FIG. 17 is a schematic illustration of a flow diagram of an example serving general packet radio service (GPRS) support node (SGSN)-initiated combined detach method.

FIG. 17 is a schematic illustration of a flow diagram of an example serving general packet radio service (GPRS) support node (SGSN)-initiated combined detach method 1700. In 1750, the WTRU 1702 may receive a detach request message 1702 from the SGSN 1704. The detach request message 1702 may include a detach type. The SGSN 1704 may only send the detach request message 1750 if the WTRU 1702 is in a connected state. The SGSN 1704 initiated detach method 1700 may be either explicit, for example by O&M intervention, or implicit. In FIG. 17, 1752 through 1778 may be similar as for the WTRU 1702 initiated detach procedure described in conjunction with FIGS. 14 and 15. In 1780, the WTRU 1702 may send a detach accept message 1780 to the SGSN 1704 any time after 1750. In examples, the WTRU 1702 may send a detach accept message 1780 to the SGSN 1704 only if the WTRU 1702 receives the detach Request message 1750 from the SGSN 1704 in the step 1750. In examples, the WTRU 1702 may change the state of one or more of RATs associated with MRA to a deregistered, detached, or equivalent state.

The WTRU 1702 may remain attached in EUTRAN or MSC/VLR if it was registered with it when the SGSN 1704 sends the detach request 1750 to the WTRU 1702. The SGSN 1704 may also indicate to the MME 1706 and/or MSC/VLR 1710 that it is detaching the WTRU 1702, by, for example, sending the detach notification message 1760 to one or both of the MME 1706 and MSC/VLR 1710. After the detach method 1700 is completed, the WTRU 1702 may power up the RAT for which it is still attached, if this is not already powered up, and continues its operation on that RAT.

In examples, the HLR (not illustrated) may detach a WTRU 1702 based on some operator policies or subscription information. In examples, the HLR initiates a procedure to remove the association for MRA operation in the core network for one or more RATs associated with MRA. In examples, the WTRU 1702 may receive a combined detach request from the SGSN 1704 as a result of an indication to do so from the HLR.

Figure 18:
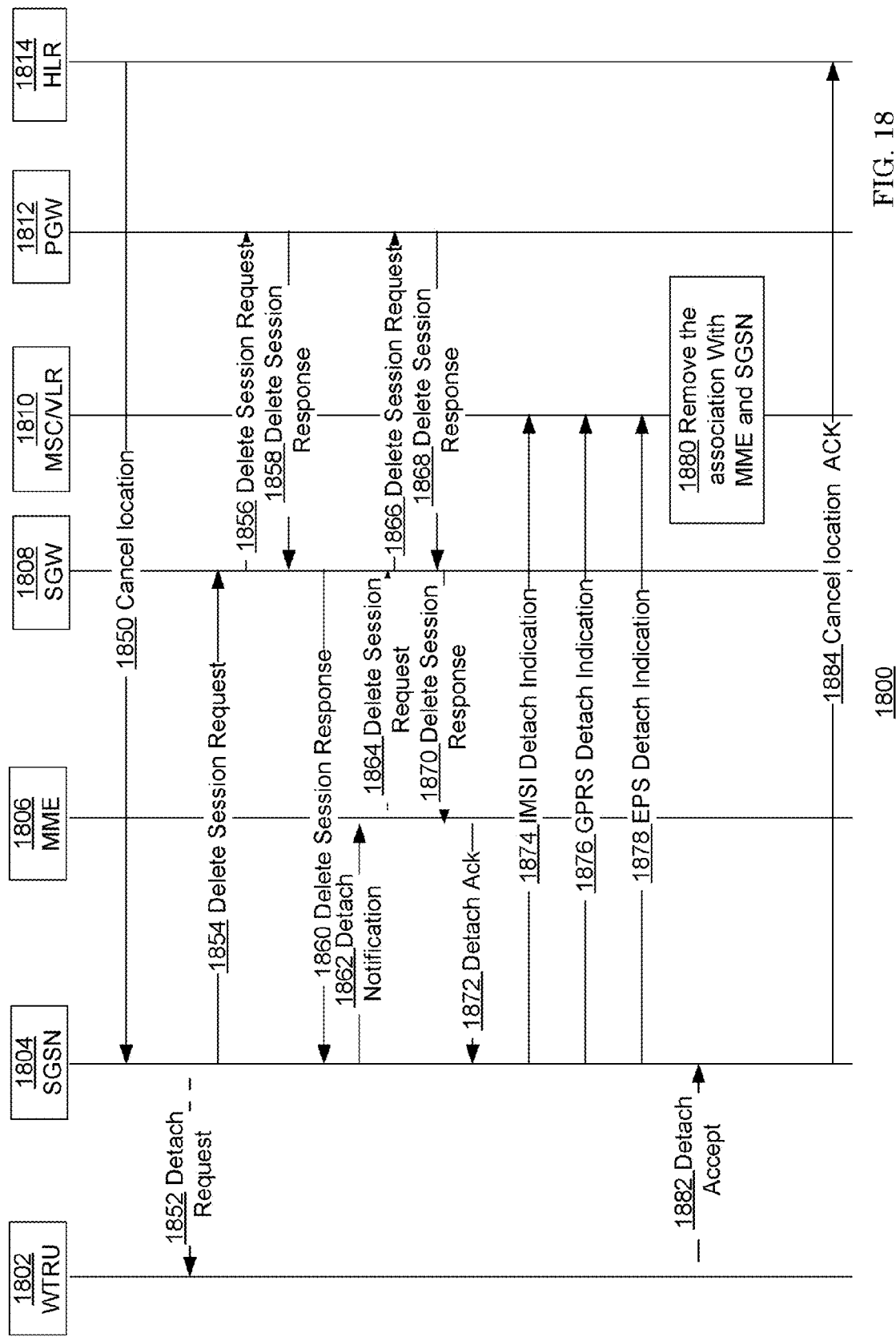
FIG. 18 is a flow diagram of an example home location register (HLR)-initiated combined detach method.

FIG. 18 is a flow diagram of an example home location register (HLR)-initiated combined detach method 1800. In 1850 of FIG. 18, the HLR 1814 may send a cancel location, which may be an IMSI cancellation type, message 1850 to the SGSN 1804 with cancellation type set to subscription withdrawn to request the immediate deletion of a subscriber's MM and PDP contexts of the WTRU 1802 from the SGSN 1804.

In 1852 of FIG. 18, the WTRU 1802 may receive a detach request message 1852 from the SGSN 1804. The SGSN 1804 informs the WTRU 1802 that it has been detached by sending a detach request, which may have a detach type, to the WTRU 1802.

In FIG. 18, 1854 through 1882 may be similar as for the SGSN 1804 initiated detach method. In 1884 of FIG. 18, the SGSN 1804 may confirm the deletion of the MM and PDP contexts with a cancel location ack (IMSI) message 1884.

In examples, method 1800 may similarly be used when a WTRU 1802 is registered with an MME 1806 or an MSC/VLR 1810. Thus, MME 1806 or an MSC/VLR 1810 may also receive the cancel location message from the HSS/HLR 1814. Similar actions may also be taken for the MME 1806 and an MSC/VLR 1810. For example, detaching the WTRU 1802 and sending a detach notification to other CN nodes, for example a MME 1806 and/or SGSN 1804.

Figure 19:
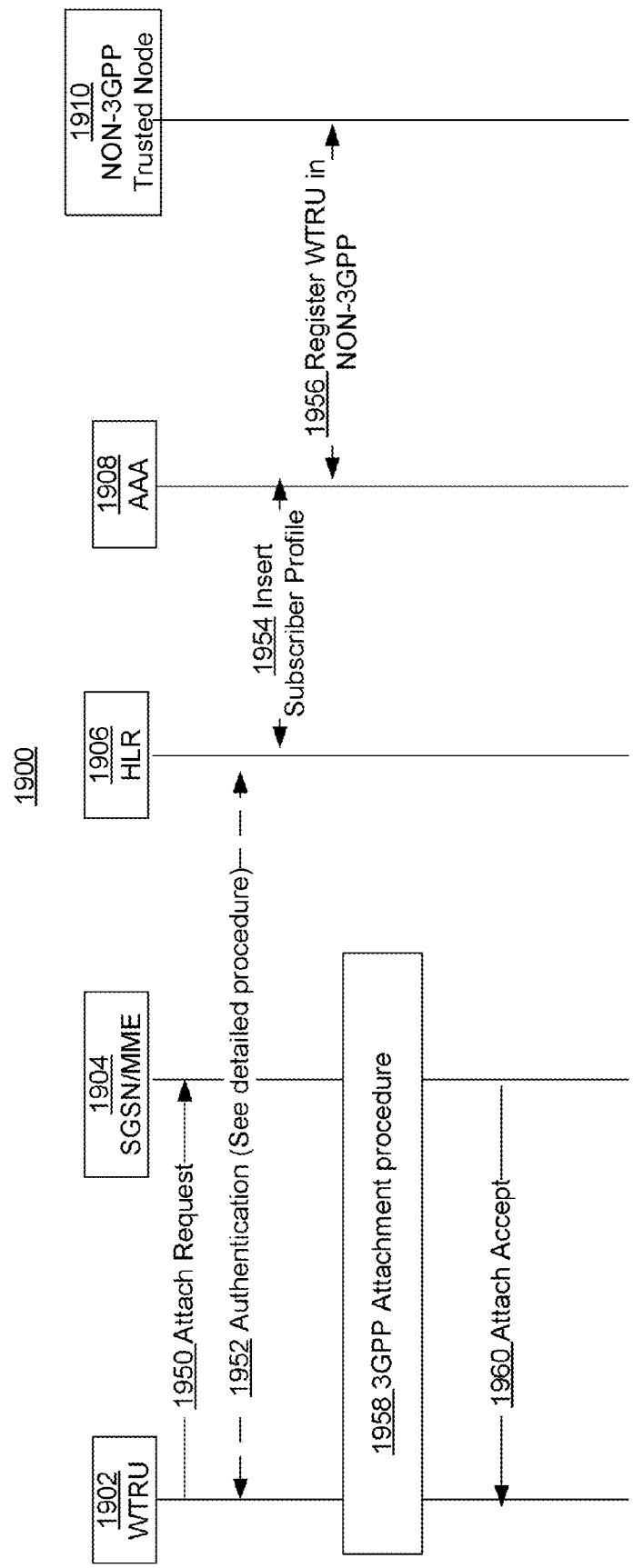
FIG. 19 is schematic illustration of a flow diagram of an example of a combined attach request method from either a UTRA (GPRS/UMTS/HSPA) RAT or an EUTRA (EPS/LTE) RAT leading to an attachment of the WTRU to both a 3GPP network and a non-3GPP network.
Figure 20:
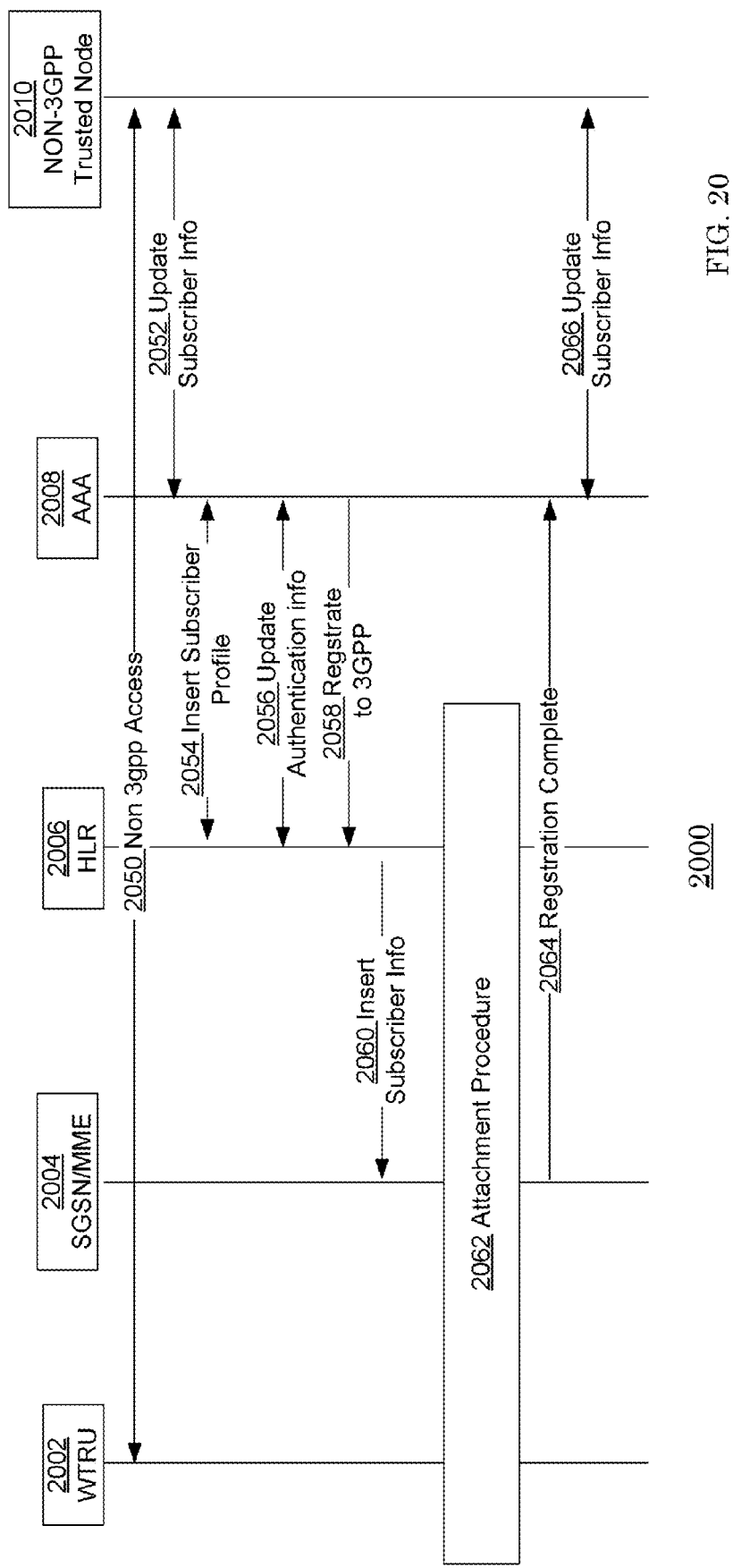
FIG. 20 is schematic illustration of a flow diagram of an example of a combined attach request method from a non-3GPP RAT leading to an attachment of the WTRU to both 3GPP and non-3GPP network.
Figure 21:
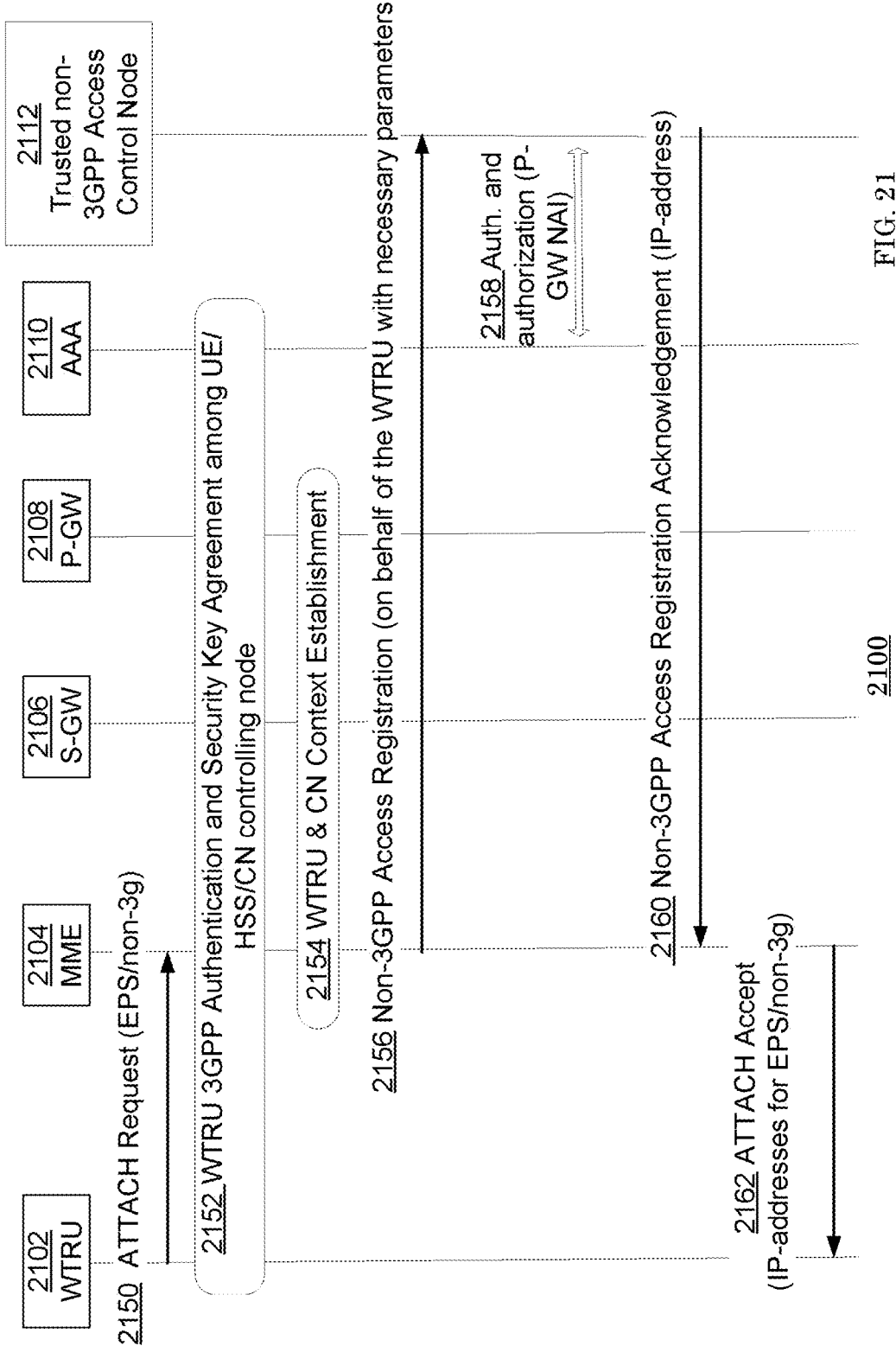
FIG. 21 is a schematic illustration of a flow diagram of another example of a combined attach method leading to an attachment of the WTRU to both a 3GPP network and a non-3GPP network.

FIGS. 19, 20, and 21 disclose single attach methods for the dual RAT access for a RAT in 3GPP network and a RAT in a non-3GPP network. Because the cross connection between a 3GPP network controlling node and a non-3GPP network controlling node is not always guaranteed, the following approaches, i.e., going through the HSS/authentication, authorization and accounting (AAA) system to the non-3GPP site is disclosed in FIGS. 19, 20, and 21, where the attach request starts from a 3GPP cell and 3GPP network, then communicates with a non-3GPP network.

FIG. 19 is schematic illustration of a flow diagram of an example of a combined attach request method 1900 from either a UTRA (GPRS/UMTS/HSPA) RAT or an EUTRA (EPS/LTE) RAT leading to an attachment of the WTRU to both a 3GPP network and a non-3GPP network. In 1950 of FIG. 19, the WTRU 1902 sends an attach request 1950 to the 3GPP network 1904 with attach type of combined attach to 3GPP/non-3GPP network. In 1952 of FIG. 19, the 3GPP network 1904 triggers a WTRU 1902 authentication and security procedure. The WTRU 19902 may be registered to a server such as a 3GPP AAA Server 1954 and the AAA registers the WTRU in the non-3GPP network 1956, as shown in 1950, 1952, 1954, and 1956 of FIG. 19. In FIG. 19, 1958 may be a 3GPP attachment procedure.

FIG. 20 is schematic illustration of a flow diagram of an example of a combined attach request method 2000 from a non-3GPP RAT leading to an attachment of the WTRU to both 3GPP and non-3GPP network. In 2050 of FIG. 20, the WTRU 2002 is registered in a non-3GPP system 2010 and the non-3GPP system 2010 updates its gateway/trusted node with the WTRU's 2002 subscriber information. The gateway/trusted node 2010 may update the AAA server 2008 with the WTRU's 2002 subscriber information. The AAA server 2008 may then update the HLR 2006 with the WTRU's 2002 subscriber information. Then, the AAA server 2008 may trigger the WTRU's 2002 registration to the HLR 2006. Based on the WTRU's 2002 subscriber data and location, the HLR 2006 or AAA server 208 may send insert subscriber information to the MME/SGSN 2004, depending on the access technology WTRU 2002 support and WTRU's 2002 subscriber information. The MME/SGSN 2004 may then trigger 2062, which may perform an attachment method.

In examples, attach procedure 2062 of FIG. 20, may be performed. In examples, attach procedure 2062 of FIG. 20, may be as follows. The MME 2004 updates the HSS that the WTRU 2002 is now under its service and gets the subscription information of the WTRU 2002 from the HSS. The MME 2004 then creates a PDN connection for the WTRU 2002 towards the SGW/PDN GW, since IP address allocation is part of the attach procedure in LTE.

In examples, attach procedure 2062 of FIG. 20, may be as follows. If there are active PDP contexts in the SGSN 2004 for the WTRU 2002, which may be present if the WTRU 2002 re-attaches to the same SGSN 2004 without having properly detached from the SGSN 2004, then the SGSN 2004 deletes these PDP contexts by sending delete PDP context request (TEID) messages to the appropriate GGSNs. The GGSNs acknowledge with delete PDP context response (TEID) messages. The SGSN 2004 may initiate location update procedures toward the HLR 2006 and the old MSC/VLR to clean up an old location. The location update procedure may result in the deletion of any existing PDP context in the old SGSN and the appropriate GGSNs. The HLR 2006 may send subscription data from the HLR 2006 to the SGSN 2004 through the exchange of insert subscriber data/insert subscriber data ack messages between the HLR 2006 and the SGSN 2004. The SGSN 2004 may then initiate a location update procedure toward the VLR and the HLR 2006 to propagate the new location of the WTRU 2002 throughout the communications network.

After the 3GPP attachment is completed, the MME/SGSN 2004 may send a registration complete to the AAA server 2006 as shown in 2064 of FIG. 20. In 2066 of FIG. 20, the AAA server 2006 may update the non-3GPP node with the 3GPP attachment information, which may include one or more of TAI, LAI, RAI, TMSI, and IP address.

In case the non-3GPP controlling node is reachable in the network by a 3GPP controlling node, then the dual mode attach may be performed by one controlling node requesting the other on behalf of the WTRU 2002 to enable the WTRU 2002 across RAT access in the following sequence as disclosed below in FIG. 21, which illustrates the 3GPP controlling node requesting the non-3GPP controlling node.

FIG. 21 is a schematic illustration of a flow diagram of another example of a combined attach method 2100 leading to an attachment of the WTRU to both a 3GPP network and a non-3GPP network. In 2150 of FIG. 21, the WTRU 2102 after detecting both a 3GPP cell and a non-3GPP cell, initiates a dual RAT network registration 2150 from a 3GPP RAT/Cell, for example an LTE cell, by sending a dual mode attach request 2150 with an attach type EPS/non-3g.

In 2152 of FIG. 21, when the 3GPP-CN controlling node, for example MME 2104, receives the dual mode attach request, it first authenticates the WTRU 2102 together with the HSS (not illustrated) in the 3GPP domain and may generate security keys. In 2154 of FIG. 21, WTRU 2102 and CN 2104 context is established with the gateway nodes, for example S-GW 2106 or P-GW 2108, or SGSN/GGSN (not illustrated). In 2120 of FIG. 21, based on the non-3GPP RAT information found by the WTRU 2102 in the non-3GPP cell, the 3GPP-CN controlling node 2104 then may send a non-3GPP access registration to the non-3GPP local network control node, for example a trusted non-3GPP access node 2112, with necessary WTRU 2102 and the non-3GPP cell information.

In 2158 of FIG. 21, the non-3GPP controlling node 2112 may exchange authentication and authorization information, which may include information of the WTRU 2102 and information of the P-GW, with the HSS/AAA 2110 and gets the non-3GPP access authorization parameters back for the WTRU 2102.

In 2160 of FIG. 21, the non-3GPP controlling node 2112 may then send an acknowledgement message back to the 3GPP controlling node 2104 notifying the success of the cross-RAT registration. In 2162 of FIG. 21, the 3GPP controlling node 2104 may then send the attach accept message back to the WTRU 2102 with the operating parameters for the 3GPP network and the non-3GPP network.

Figure 22A:
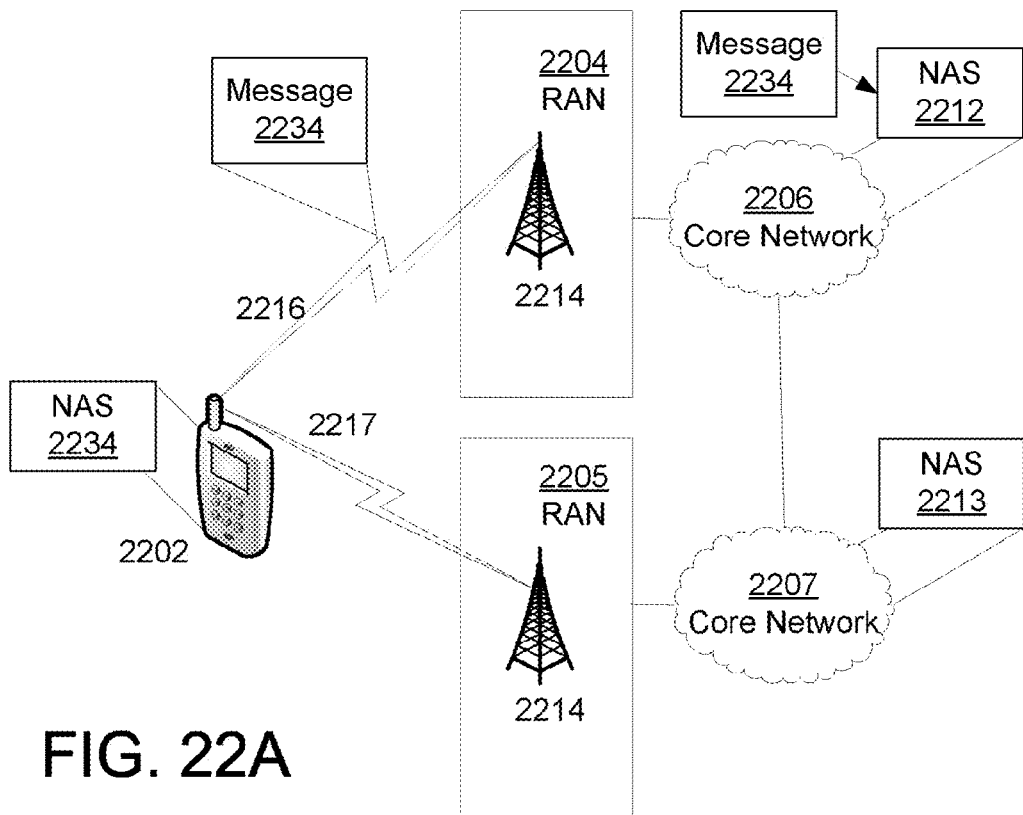
FIGS. 22A and 22B schematically illustrate different methods for performing session management.
Figure 22B:
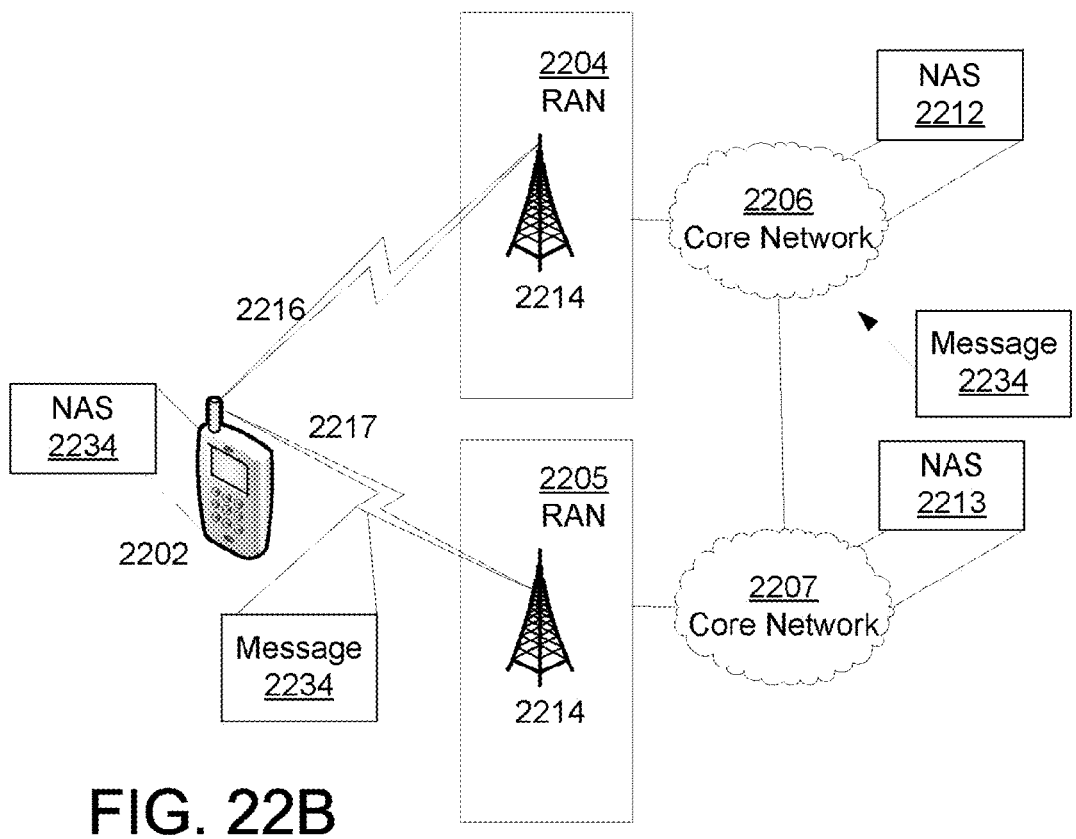

FIG. 22 schematically illustrates different methods for performing session management. Illustrated in FIG. 22A is a RAT-specific session management method where a message 2234A is sent from WTRU 2202 to a NAS level entity 2212, which may be a SGSN of a UMTS system 2204, 2206. The message 2234 may be sent over the air interface 516. Illustrated in FIG. 22B is proxy-based session management where message 2234 is sent from the WTRU 2202 to a NAS entity 2213, which may be an MME of a LTE system 2214, 2207. The message 2234 may then be sent from the NAS entity 2213 to the NAS 2212, which may be an SGSN of a UMTS system. The message 2234 may include session management information for NAS 2212.

The WTRU 2202 may perform at least one of the following for mobility management. The WTRU 2202 may monitor the network for MRA support. The WTRU 2202 may receive indications about support of MRA in registration messages, such as one or more of attach accept, attach reject, TAU accept, TAU reject. The WTRU 2202 may receive an explicit indication of network support for MRA in other NAS messages or via OMA DM or OTA.

The WTRU 2202 may indicate its MRA capability in the registration procedure to a network. The WTRU 2202 may provide an indication of its support for MRA operation upon registration to the network. For example, the WTRU 2202 may indicate its support for MRA in one or more of the following registration messages: attach Request, GMM attach request, location area update (LAU) request, routing area update (RAU) request, and tracking area update (TAU) request. In examples, this indication may be included as part of the radio access capability IE or network capability IE, or any other new IE that may be defined for this purpose.

In examples, the WTRU 2202 may provide this indication via other NAS messages. For example, the indication for MRA support may be provided in the EMM Information. The WTRU 2202 may indicate MRA support upon a change of WTRU 2202 setting such as that MRA operation is now supported or activated in the WTRU 2202, or is now deactivated or not supported in the WTRU 2202. For example, indications of support of MRA sent by the WTRU 2202 may be upon a change of support for MRA. For example, a WTRU 2202 may indicate to the network whenever its MRA operation support changes from not supported or deactivated to supported or activated, or changes from supported or activated to not supported or deactivated.

The WTRU may register to the core network (CN) domain for a plurality of concerned RATs that may be MRA-capable RATs. For example, RATs that may have been determined by the WTRU as MRA-capable. For example, if the WTRU is using LTE and UMTS for MRA operation, then the WTRU may register to both MME and SGSN. In examples, the WTRU may also register to other nodes such as the MSC/VLR. The WTRU may perform such a registration to more than one CN node upon the activation or indication of MRA support. Alternatively, such a registration may be done even if the WTRU remains in idle mode in both RATs, or in at least one of the concerned RATs. For example, the WTRU, upon power on, may register to the necessary CN entities (such as MME, SGSN, and MSC/VLR) even if MRA operation will not be used immediately after power on.

In examples, CN entities such as HSS, HLR, MME, SGSN, or MSC/VLR, may have one indication for every WTRU (e.g., in the subscription profile of the WTRU) to indicate whether or not MRA operation can be provided for the WTRU. For example, upon attaching, the HSS may forward an indication of whether or not MRA operation may be supported for a WTRU in the Location Update ACK message that is sent by the HSS to the MME. Other network entities such as SGSN, HSS, MSC/VLR, and HLR, may send similar messages indicating that the WTRU may or may not be supported for MRA operation. In examples, a WTRU may be permitted MRA operation for only certain services such as PS or CS only; PS in LTE, and PS in UMTS only; PS in LTE and PS in non-3GPP only; or, PS in LTE and PS in UTRAN and CS in UTRAN only.

In examples, the following may be subscription information for the WTRU: MRA operation is only allowed for one IP address, and MRA operation is only allowed for traffic that is obtained via a connection to a specific APN.

The mobility management methods disclosed above may be used for different types of RATs and different CN entities. For example, a method disclosed for a WTRU in an LTE system with the WTRU and an MME entity communicating, may also be used by a WTRU in an UTRAN system with the WTRU and an SGSN entity communicating.

Registration methods are disclosed for a WTRU to perform registration on one or more of networks, RATs, or CN entities. The WTRU may register on different CN entities that belong to different RATs in order to use MRA services. A new registration type may be defined by the WTRU that indicates to the network that MRA is required.

In examples, the WTRU may perform an attach procedure over LTE or another network type by sending an attach request message with a new attach type IE, such as EPS attach with MRA. Alternatively, the WTRU may use an existing attach type such as EPS attach and include additional IE in the message such as WTRU's support for MRA. In examples, the WTRU may send a new attach type such as "EPS/SGSN attach" or "EPS/SGSN/IMSI attach" to indicate dual registration to the MME/SGSN or the triple registration to the MME/SGSN/MSC, respectively. Other network entities and other network types may be used.

In examples, the CN entity that receives the message from the WTRU, for example an MME entity, may register the WTRU in one or more other CN entities for performing MRA. The CN entity may register the WTRU in one or more other CN entities in response to the WTRU's subscription indicating the WTRU is allowed MRA operation. In examples, the WTRU may be registered to CN entities by the WTRU directly or by a CN entity in response to the WTRU registering with one or more CN entities.

In examples, the MME sends an attach accept message that indicates that the WTRU's registration to an LTE network has been successful. A NAS message, or other type of message, may be sent to the WTRU indicating the WTRU should perform registration to certain other systems over another RAT, such as UMTS, GERAN, or with certain entities such as SGSN or MSC/VLR, or with non-3GPP accesses. The message indicating that the WTRU should register with another network entity or another network over another RAT may be sent based on network operator policy, subscription information (either locally at the MME or fetched by the MME from the HSS), location or load/congestion information.

In examples, the MME, or other network entity, performs a registration to the required CN such as a SGSN or MSC/VLR on behalf of the WTRU. The MME may then perform a registration procedure towards the SGSN using the S3 interface, or another interface that may connect these two network entities. The MME or other network entity may use a new message type or an existing message type. The MME or other network entity indicates to the recipient entity that the type of registration of the WTRU is an MRA registration so that the WTRU is expected to simultaneously operate over at least two RATs.

In examples, one of the network entities may be a master entity that is responsible for the WTRU's main registration or contexts. Network entities such as the MME and the SGSN or the MSC/VLR may coordinate and agree as to which entities will be responsible for the WTRU's main registration or contexts. In examples, the master entity may be the initiating node, or the CN entities may determine a master entity based on operator policies or other conditions that may be defined locally in these entities. In examples, the master node may be determined based on network condition, for example, when resources of a particular network are low, the master entity may be assigned to a different network.

In examples, the network entity, such as the MME, provides the other CN entities with the context information for the WTRU MRA operation. For example, the MME may provide the EPS bearer contexts to the SGSN and indicate the number of PDN connections, type of PDN connections, for example, IPv4 or IPv6, and the number of default bearers. In examples, the MME may send information regarding one or both of the PDN GW and the SGW. For example, the MME may include the addresses of the PDN GW and SGW, tunnel endpoint ID for new bearers to be setup, and any other information that may be relevant for the MRA operation of the WTRU. In examples, the MME may also inform other CN entities about the MRA of the WTRU. For example, the MME may send in a message to one or both of the PDN GW and SGW that a WTRU may operate in MRA mode. The SGSN, the PDN GW, or the SGW, or other network entities, may use the indication that a WTRU may operate in MRA mode to perform other actions for the WTRU. For example, a PDN GW may store for the WTRU context information for both a MME/SGW and a SGSN, so that the PDN GW. As another example, during the WTRU registration procedure, the MME may when it creates a new default bearer, instruct the SGW/PGW to prepare additional default bearers resources and bearer contexts for the WTRU through different RAT types such as SGSN or RNC, depending on the WTRU MRA capabilities. In examples, the SGW/PGW may use a single default bearer and establish multiple dedicated bearers and multiple secondary PDP contexts.

In examples, a CN entity, for example SGSN, receiving instructions to prepare for WTRU MRA operation from a CN entity in a core network, may accept or reject the registration based on one or more of the network operator policy such as subscription information, which may be retrieved either locally or remotely, location information, load, or congestion information.

If the other network entity, for example SGSN, receiving instructions to prepare for WTRU MRA operation, accepts the registration, the other network entity, for example SGSN, send a message to the sending network entity, for example, MME. In examples, the message sent to the sending network entity may be a new message type or an existing message type with a new cause or an IE. The other network entity, SGSN in this example, may also include information to the sending network entity, the MME in this example, regarding an address for tunnel endpoints for control or user plane. The other entity, in this example SGSN, may in the response message to the sending entity, in this example MME, provide information regarding the WTRU. The information regarding the WTRU may include one or more of S-TMSI, routing area identity, or location area identify, which may be obtained from a MSC/VLR.

In examples, if the other entity, in this example SGSN, rejects the registration based on operator or subscription policies, then the other entity may send a message to the sending entity indicating the rejection of the registration, which may include an appropriate cause. In examples, the sending entity, which in this example is MME, or the WTRU may re-attempt the registration based on some, e.g., timer that guards registration re-attempts.

The WTRU may receive an attach accept message that indicates that the combined procedure has been accepted by both the sending network entity, in this example the MME, and the receiving entity, in this example the SGSN. In examples, the message may use a new value for the attach result or update result) IE, the attach accept message may add new IE to the existing attach accept message. In examples, the WTRU is provided with a common NAS mobility management identity for both CNs and an identity for two PS domains and one for the CS domain. In examples, the WTRU is provided with independent identifiers per CN or RAT. For example, the WTRU may be provided with an S-TMSI per LTE operation, an P-TMSI per GPRS operation, and a TMSI as per CS domain operation.

In examples, the WTRU is provided with a common periodic update timer and upon its expiry the WTRU performs a periodic update registration to the necessary CN domains. The periodic update may be a combined periodic update which triggers combined registration or updates from a primary CN entity, which may be the CN entity that received the combined periodic update or register message, to the another CN entity that the WTRU is registered with such as SGSN and/or MS C/VLR.

In examples, the WTRU may perform independent updates to the individual CN entities using existing methods. In examples, a periodic update or registration message to one CN entity includes an indication of the registration status of the WTRU with other CN entities along with one or more of identification information of the CN entities such as RAI, P-TMSI, GUTTI, S-TMSI, and TMSI.

In examples, the WTRU may first register with one CN or RAT and when an event that triggers MRA operation occurs, the WTRU may then register on another RAT or CN. In examples, the WTRU may use tracking/routing/location area update messages as registration messages.

In examples, an MRA WTRU might be in idle mode on a given RAT while in connected mode on another RAT. The transition between idle mode and connected mode in each RAT may happen independently of each other. In examples, the WTRU may not be permitted to be in idle mode on one RAT while in connected mode on another RAT. In examples, when a WTRU goes into idle mode on a RAT, a timer with a predetermined time may be started to prevent the WTRU from staying in idle mode for more than a predetermined period of time without communicating over the RAT. The timer may be started in the WTRU, the core network, or the RAN.

In examples, the WTRU, the RAN, or the core network may transition from MRA mode of operation to single RAT mode of operation. In examples, the WTRU, the RAN or the core network may request that the WTRU transition from MRA mode to single RAT access mode.

In examples, a WTRU may be registered on several domains or with several CN entities, for example MME and MSC/VLR, and may only power up the RATs when there are parallel or simultaneous sessions running on each RAT or when sessions are controlled by different CN entities. For example, a WTRU that is registered to both an MME and an MSC/VLR and is operating in MRA, and may use only MRA if there are both PS and CS services needed at the same time. For example, a WTRU in a LTE CN may perform CSFB when there is a CS call, but not use the PS for LTE. As another example, a WTRU with a PS session in LTE and a CS session in GERAN/UTRAN may operate in MRA, and thus may be using both a RAT to LTE and a RAT to GERAN/UTRAN.

In examples, triggers apply to either a WTRU or a network entity, or both. In examples, the triggers may initiate an MRA operation, or may terminate an MRA operation. In examples, the trigger may initiate a method for the WTRU to enter MRA operation which may include the WTRU registering on the core networks.

In examples, if the WTRU's subscription is such that there's a maximum bit rate that may be provided over one RAT, and there is an additional service request, for example, session management requests that require any QoS class or additional resources, then a trigger may activate for the WTRU to enter MRA operation. In examples, the type of service requested that triggers the trigger may determine the RAT for MRA operation. For example, if a PS service is requested, then a RAT that provides PS service such as LTE may be activated for MRA operation. As another example, if the WTRU has an LTE RAT active, then a request for MO or MT CS services, for example SMS, SS, voice calls, may trigger the activation/initiation of MRA over a RAT that provides CS.

A user may request MRA operation. For example, a user may request MRA operation over a user interface, or the user may change a setting of the WTRU that triggers MRA operation. In examples, the settings of the WTRU may be changed via OMA DM or OTA, which may trigger MRA operation.

In examples, the WTRU may receive an explicit indication to operate in MRA from any network entity in the system, for example, any RAN entity such as RNC, eNodeB, NodeB, or a CN entity, for example, MME or SGSN.

In examples, a trigger to enter MRA operation may be triggered upon receipt by the WTRU of an indication that system supports MRA. In examples, if the WTRU receives an indication that the network supports MRA operation, the WTRU may determine whether or not the user of the WTRU wants to enter MRA. In examples, the WTRU indicates to the user when the network does not support MRA.

In examples, a trigger to enter MRA operation may be triggered as a result of the WTRL requesting a PDN connection to a particular APN or for a particular service (MO or MT). In examples, a trigger to enter MRA operation may be triggered after a request for an PDN connectivity, when a predetermined number of PDN connections have already been setup on one RAT.

In examples, when the WTRU is VPLMN roaming, the VPLMN may activate MRA upon indication from HPLMN that this is allowed for the VPLMN in question.

In examples, lack of support of a service may trigger a trigger to activate MRA. For example, lack of CSFB support may activate MRA for a WTRU so that it can still have both PS and CS services via LTE and UTRAN/GERAN respectively. As another example, lack of IMS or VoIP support in LTE (indicated in NAS or RRC messages) may trigger a trigger to activate MRA so that the WTRU can still get voice services via the CS domain of GERAN/UTRAN.

In examples, a request to place a CS emergency call while a WTRU is in LTE may trigger a trigger for MRA operation to be activated to service the emergency call.

FIG. 23 schematically illustrates a table that illustrates an EPS attach type information elements (IE) for Combined ATTACH Procedure with the introduction of two new Information Element (IE). In examples, an EPS attach type information element (IE) for a combined detach procedure may be defined to include combined EPS/GPRS/IMSI attach 2310, and combined EPS/GPRS attach 2320. The new combined attach information elements 2310, 2320 could be represented as bits 011 and 100, respectively.

FIG. 24 schematically illustrate a table that illustrates a modified EPS attach accept message for a combined attach procedure. The EPS attach accept message 2410 encapsulates the new IE "UTRAN Attach Status". In examples, the attach accept message 2410 is a combined attach method where a single PDP context activation is used.

FIG. 25 schematically illustrates a table that illustrates a GPRS/UMTS Attach Status Information Element (IE) as discussed in conjunction with the modified EPS attach accept message illustrated in FIG. 24. The content of this GPRS/UMTS Attach Status Information Element (IE) is may be the same as the usual GPRS/UMTS attach accept message content defined. In examples, the IE may also be a transparent container to the EPC network nodes such as MME with a final destination to the WTRU. The GPRS/UMTS core network node such as SGSN may include additional information beside the GPRS/UTRAN attach accept message. The IE might also include additional information to be processed and use by the EPC nodes such as MME. In examples, an attach accept message from one system, for example EPS, GPRS/UMTS, or non-3GPPS system, may be encapsulated in the attach accept message sent to the WTRU by the other system, for example EPS, GPRS/UTRAN, or non-3GPP network, and can be encapsulated as a transparent container to the system sending the final attach accept message to the WTRU. Transparent container may meant that the network entities may not have to interpret or understand the content of the message but may pass the message through the network.

FIG. 26 schematically illustrates a table that illustrates another example of a modified EPS attach accept message content. Illustrated in FIG. 26 is UTRAN Attach Status 2610 and UTRAN activation of a PDP Context 2620 IE. Both 2610 and 2620 are information elements (IEs) and both may be encapsulated in transparent containers addressed to the WTRU. UTRAN Attach Status 2610 may be for GPRS/UMTS.

FIG. 27 schematically illustrates a GPRS/UMTS PDP context message content as an example of the modified EPS attach accept message illustrated in FIG. 26.

FIG. 28 schematically illustrates GPRS/UMTS attach accept message content that is same as the one depicted in FIG. 25. In examples, message content for UTRAN attach accept message content may be defined in accordance with the methods and apparatuses disclosed herein.

FIG. 29 schematically illustrates a modified table of information elements (IE) for a detach type IE used in an EPS detach request message for a combined detach procedure. The following additional IEs are defined: "Combined EPS/GPRS detach" 2910, "Combined EPS/GPRS/IMSI detach" 2920, "Combined EPS/GPRS detach" 2930, and "Combined EPS/GPRS/IMSI detach" 2940. In examples, the additional IEs may be used for examples disclosed herein.

FIG. 30 schematically illustrates a table of GPRS/UMTS attach type IEs used in a GPRS/UMTS attach request message for a combined attach. In examples, new GPRS attach type information elements can be defined for a combined detach procedure. The following additional IEs have been introduced: "Combined GPRS/EPS attach" 3010, "Combined GPRS/IMSI/EPS attach" 3020, and "Combined IMSI/EPS attach" 3030. In examples, the new GPRS attach types may be used for examples disclosed herein.

FIG. 31 schematically illustrates a modified table of GPRS/UMTS attach accept message content for a combined attach procedure. In examples, new GPRS attach accept messages for combined attach could be defined. For example, EUTRAN Attach Accept 3110 and NONCE 3120 with a type reference of bit string (128) and Presence of O may be defined. The new GPRS attach accept message for combined attach could be added to table attach accept message. The new GPRS attach accept message may be used in examples disclosed herein.

FIG. 32 schematically illustrates a table for EPS attach accept message content as introduced in FIG. 31. In examples, a new EUTRAN attach accept message content for a combined detach procedure could be defined in accordance with the apparatuses and methods disclosed herein.

FIG. 33 schematically illustrates another example of a table of GPRS/UMTS attach accept message content for a combined attach procedure. In examples, an EUTRAN Attach Accept 3310 is an IE representing the result of the GPRS/UMTS context activation result. NONCE may be 3320. The defined IEs may be used in examples disclosed herein.

FIG. 34 schematically illustrates a table for GPTS/UMTS activate PDP context accept message content as introduced in FIG. 33. The content is same as the content of the table in FIG. 27.

FIG. 35 schematically illustrates a table for EPS Attached Accept message as introduced in FIG. 33. In examples, the content is same as that of the table in FIG. 32.

FIG. 36 schematically illustrates a table for a GPRS/UMTS detach type of information element for a combined detach. Six additional IEs have been introduced: "Combined GPRS/IMSI detach" 3610, "Combined EPS/IMSI detach" 3620, "Combined EPS/GPRS/IMSI detach" 3630, "Combined EPS/GPRS detach" 3640, "Combined EPS/IMSI detach" 3650, and "Combined EPS/GPRS/IMSI detach" 3660. The new detach type information elements may be added to table detach message for combined detach procedure. The new detach type information elements may be used with examples as disclosed herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A wireless transmit/receive unit (WTRU) configured to perform a multi-radio access technology (RAT) access (MRA) operation, the WTRU comprising:
a WTRU non-access stratum (NAS) entity configured to communicate with a first NAS entity of a first core network and a second NAS entity of a second core network, wherein a first RAT is connected to the first core network and a second RAT is connected to the second core network;
a radio resource control (RRC) entity configured to control a first connection using the first RAT and a second connection using the second RAT; and
a transceiver configured to send a registration message to the first core network using the first RAT, wherein the registration message includes a request for registration with the first core network of the first RAT and a request for registration with the second core network of the second RAT.

2. The WTRU of claim 1, wherein the first RAT and the second RAT are different ones of: long term evolution (LTE), (LTE-A), universal mobile telecommunication system (UMTS), UMTS terrestrial radio access frequency division duplex (UTRA-FDD), wideband channel division multiple access (WCDMA), UMTS terrestrial radio access time division duplex (UTRA-TDD), UMTS terrestrial radio access time division duplex high chip rate (UTRA-TDD HCR), UMTS terrestrial radio access time division duplex low chip rate (UTRA-TDD LCR), high speed packet access (HSPA), high-speed downlink packet access (HSDPA), high-speed uplink packet access (HSUPA), global system for mobile communications (GSM), enhanced data rates for GSM evolution (EDGE), 802.11b, 802.11a, 802.11g, 802.11n, 802.16a, 802.16e, 802.20, code division multiple access (CDMA) 2000 1x, CDMA2000, and evolution-data optimized (EV-DO).

3. The WTRU of claim 1, wherein the WTRU is further configured to select a first cell for the first RAT based on a signal received from the first core network, wherein the signal is one of a broadcast signal or a dedicated signal, and wherein the signal comprises information regarding cells of the first core network that support MRA operation.

4. The WTRU of claim 1, wherein MRA operation is triggered by one or more of the following: the WTRU requesting a connection to an access point name (APN), the WTRU requesting a predetermined Quality of Service (QoS), the WTRU requesting a connection to a particular Internet Protocol (IP) address, the WTRU requesting voice service, the WTRU requesting data service, the WTRU requesting short message service (SMS) service, or by the WTRU specifying a new establishment cause as a result of one of the following: an overload condition, an event matching an operator policy trigger, or an indication stored in a subscriber profile.

5. The WTRU of claim 1, wherein the sent registration message is an ATTACH message that serves to attach the WTRU to the first NAS entity of the first core network and the second NAS entity of the second core network.

6. The WTRU of claim 1, wherein the first RAT operates on one or more frequencies, and the second RAT operates on one or more different frequencies.

7. The WTRU of claim 1, wherein the WTRU NAS entity is configured to communicate with a second WTRU NAS entity to coordinate delivery of packet switched (PS) data.

8. The WTRU of claim 1, wherein the RRC entity is further configured to control a first instance of an RRC to manage the first RAT, and to control a second instance of an RRC to manage the second RAT.

9. A method, performed by a wireless transmit/receive unit (WTRU), for multi-radio access technology (RAT) access (MRA) operation, the method comprising:

communicating, by a WTRU non-access stratum (NAS) entity, with a first NAS of a first core network and a second NAS entity of a second core network, wherein a first RAT is connected to the first core network and a second RAT is connected to the second core network;

controlling, by a radio resource control (RRC) entity, a first connection using the first RAT and a second connection using the second RAT; and sending a registration message to the first core network using the first RAT, wherein the registration message includes a request for registration with the first core network of the first RAT and a request for registration with the second core network of the second RAT.

10. The method of claim 9, wherein the registration message is an ATTACH message and the sending the registration message serves to attach the WTRU to the first NAS entity of the first core network and to the second NAS entity of the second core network.

11. The method as in claim 10, wherein the attaching of the WTRU to the first NAS entity and the attaching of the WTRU to the second NAS entity are performed simultaneously.

* * * * *